(12) United States Patent
Asterjadhi et al.

(10) Patent No.: US 9,713,087 B2
(45) Date of Patent: Jul. 18, 2017

(54) TRIGGERED TARGET WAKE TIME OPERATION

(71) Applicant: QUALCOMM Incorporated, San Diego, CA (US)

(72) Inventors: Alfred Asterjadhi, San Diego, CA (US); Simone Merlin, San Diego, CA (US); Bin Tian, San Diego, CA (US); George Cherian, San Diego, CA (US); Gwendolyn Denise Barriac, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/008,409

(22) Filed: Jan. 27, 2016

(65) Prior Publication Data

US 2016/0219510 A1    Jul. 28, 2016

Related U.S. Application Data

(60) Provisional application No. 62/278,366, filed on Jan. 13, 2016, provisional application No. 62/260,155, (Continued)

(51) Int. Cl.
*H04B 1/38*   (2015.01)
*H04W 52/02*  (2009.01)
(Continued)

(52) U.S. Cl.
CPC ....... *H04W 52/0216* (2013.01); *H04L 5/0007* (2013.01); *H04W 28/0221* (2013.01); (Continued)

(58) Field of Classification Search
CPC . H04W 52/02; H04W 8/245; H04W 52/0216; H04M 1/72519
(Continued)

(56) References Cited

U.S. PATENT DOCUMENTS 9,084,144 B2 * 7/2015 Ramamurthy ...... H04W 28/065
2009/0097428 A1 * 4/2009 Kneckt ............ H04W 52/0216
                                                            370/311
(Continued)

FOREIGN PATENT DOCUMENTS

DE    112013000133 T5    8/2014
WO    2014182252 A1    11/2014

OTHER PUBLICATIONS

Fischer M (Broadcom): "LB200-Clause-9_41, 11-14-0396-02-00ah-lb200-Clause-9-41", IEEE Draft, 11-14-0396-02-00Ah-LB200-Clause-9-41, IEEE-SA Mentor, Piscataway, NJ USA, vol. 802.11ah, No. 2, Mar. 20, 2014, pp. 1-43, XP068069074, [retrieved on Mar. 20, 2014] the whole document.
(Continued)

*Primary Examiner* — Danh Le
(74) *Attorney, Agent, or Firm* — Arent Fox

(57) ABSTRACT

A method, an apparatus, and a computer-readable medium for wireless communication are provided. In an aspect, an apparatus may be configured to determine whether to switch to an active mode, a power save mode, or a TWT power save mode. During the TWT power save mode, the apparatus may enter an awake state during TWT service periods and may enter a doze state outside of the TWT service periods. The apparatus may transmit a message to a second wireless device based on the determination.

44 Claims, 18 Drawing Sheets

Related U.S. Application Data filed on Nov. 25, 2015, provisional application No. 62/245,941, filed on Oct. 23, 2015, provisional application No. 62/244,682, filed on Oct. 21, 2015, provisional application No. 62/126,403, filed on Feb. 27, 2015, provisional application No. 62/109,024, filed on Jan. 28, 2015.

(51) Int. Cl.
*H04L 5/00* (2006.01)
*H04W 28/02* (2009.01)
*H04W 72/00* (2009.01)

(52) U.S. Cl.
CPC ... *H04W 52/0212* (2013.01); *H04W 52/0235* (2013.01); *H04W 52/0274* (2013.01); *H04W 72/005* (2013.01); *Y02B 60/50* (2013.01)

(58) Field of Classification Search
USPC ............... 455/574, 550.1, 418; 370/311
See application file for complete search history.

(56) References Cited

U.S. PATENT DOCUMENTS

| | | | |
|---|---|---|---|
| 2013/0227269 A1* | 8/2013 | Ting | G06F 21/45 713/100 |
| 2013/0294394 A1* | 11/2013 | Kneckt | H04W 74/0816 370/329 |
| 2014/0112226 A1 | 4/2014 | Jafarian et al. | |
| 2014/0112229 A1 | 4/2014 | Merlin et al. | |
| 2014/0219148 A1* | 8/2014 | Zhao | H04W 52/0229 370/311 |
| 2014/0369258 A1* | 12/2014 | Lin | H04W 4/14 370/328 |
| 2015/0085775 A1* | 3/2015 | Choi | H04W 74/0808 370/329 |
| 2016/0219512 A1 | 7/2016 | Asterjadhi et al. | |
| 2016/0219522 A1 | 7/2016 | Asterjadhi et al. | |

OTHER PUBLICATIONS

Fischer M (Broadcom) : "HLB200-clause-9 41; 11-14-0396-03-00ah-1b200-clause-9-41H, IEEE Draft; 11-14-0396-03-00AH-LB200-Clause-9-41," IEEE-SA Mentor, Piscataway, NJ USA, Mar. 20, 2014, vol. 802.11ah, No. 3, pp. 1-43, XP068069075, [retrieved on Mar. 20, 2014].

International Search Report and Written Opinion—PCT/US2016/015465—ISA/EPO—Apr. 8, 2016 (151780U3WO).

Park M (Intel Corp) : "Proposed TGah Draft Amendment"; IEEE P80211 Wireless LANs; IEEE-SA Mentor, Piscataway, NJ USA, doc.: IEEE 802.11-13/0500R0, May 10, 2013, pp. 1-330, XP068054010.

* cited by examiner

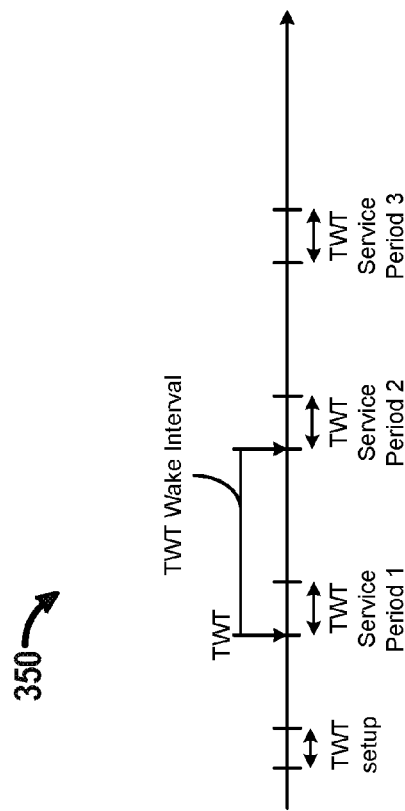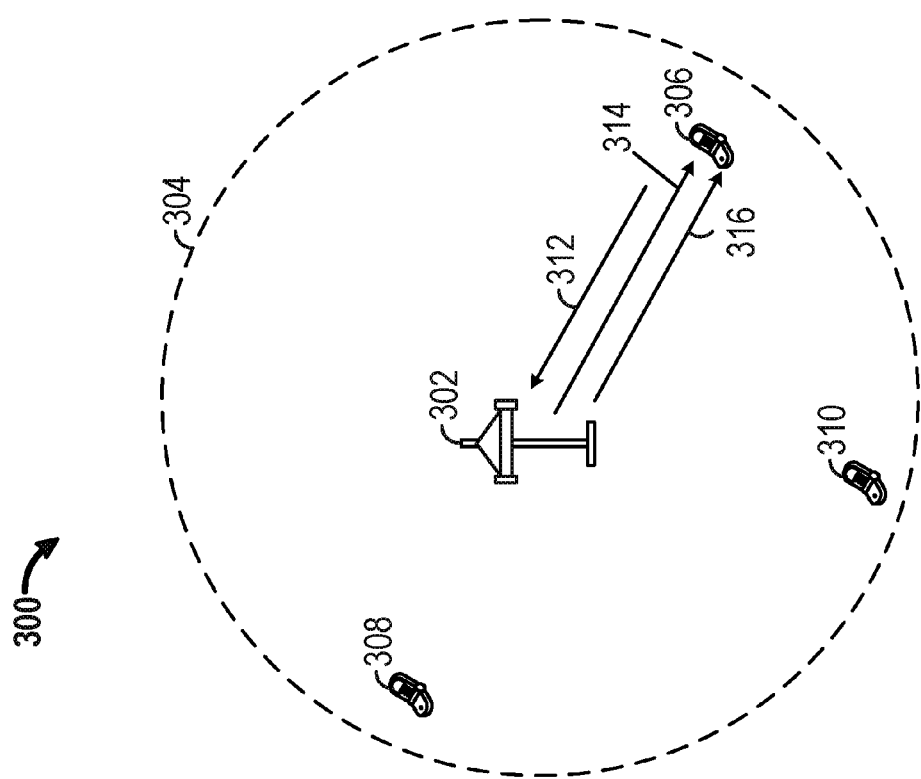
FIG. 3

TRIGGERED TARGET WAKE TIME OPERATION

CROSS-REFERENCE TO RELATED APPLICATION(S)

This application claims the benefit of U.S. Provisional Application Ser. No. 62/109,024, entitled "TRIGGERED TARGET WAKE TIME OPERATION" and filed on Jan. 28, 2015, U.S. Provisional Application Ser. No. 62/126,403, entitled "TRIGGERED TARGET WAKE TIME OPERATION" and filed on Feb. 27, 2015, U.S. Provisional Application Ser. No. 62/244,682, entitled "TRIGGERED TARGET WAKE TIME OPERATION" and filed on Oct. 21, 2015, U.S. Provisional Application Ser. No. 62/245,941, entitled "TRIGGERED TARGET WAKE TIME OPERATION" and filed on Oct. 23, 2015, U.S. Provisional Application Ser. No. 62/260,155, entitled "TRIGGERED TARGET WAKE TIME OPERATION" and filed on Nov. 25, 2015, U.S. Provisional Application Ser. No. 62/278,366, entitled "TRIGGERED TARGET WAKE TIME OPERATION" and filed on Jan. 13, 2016, which is expressly incorporated by reference herein in its entirety.

BACKGROUND

Field

The present disclosure relates generally to communication systems, and more particularly, to triggered target wake time operation.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer-readable medium, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

One aspect of this disclosure provides an apparatus (e.g., a station or an access point) for wireless communication. The apparatus may be configured to transmit a first message that includes a first trigger field to a second wireless device. The first trigger field may indicate whether the first message includes a request for a trigger message (or frame) to be sent by the second wireless device at a start of one or more target wake times (TWTs) of one or more TWT service periods. In an aspect, the TWT may be referred to as the target trigger time (TTT), or any other time reference. The apparatus may be configured to receive a second message from the second wireless device. The second message may include a second trigger field based on the first message, and the second trigger field may indicate whether the second wireless device will transmit the trigger message at the start of the TWT service period. In certain embodiments, the second message may be sent to the first wireless device without receiving a first message. In certain embodiments, the message may be multicast or broadcast.

Another aspect of this disclosure provides an apparatus (e.g., a station or an access point) for wireless communication. The apparatus may be configured to receive, from a second wireless device, a first message that includes a first trigger field. The first trigger field may indicate whether the first message includes a request for a trigger message to be sent by the first wireless device at a start of a TWT service period. The apparatus may be configured to determine a TWT schedule based on the received first message. The apparatus may be configured to transmit a second message to the second wireless device. The second message may include the TWT schedule and a second trigger field based on the determined TWT schedule. The second trigger field may indicate whether the apparatus will transmit the trigger message at the start of the TWT service period.

Another aspect of this disclosure provides an apparatus (e.g., a station or an access point). The apparatus may be configured to determine a TWT schedule. The apparatus may be configured to broadcast a message that includes the TWT schedule to a number of wireless devices. The message may include a broadcast indicator that indicates the TWT schedule is a broadcast TWT schedule.

Another aspect of this disclosure provides an apparatus (e.g., a station or an access point). The apparatus may be configured to receive from a second wireless device a message that includes a TWT schedule. The message may include a broadcast indicator that indicates the TWT schedule is a broadcast TWT schedule. The apparatus may be configured to determine one or more TWTs for the first wireless device based on the TWT schedule.

Another aspect of this disclosure provides an apparatus (e.g., a station or an access point). The apparatus may be configured to determine whether to switch to an active mode, a power save mode, or a TWT power save mode. During the TWT power save mode, the apparatus may enter an awake state during TWT service periods and may enter a doze state outside of the TWT service periods. The apparatus may be configured to transmit a message to a second wireless device based on the determination of whether to switch modes.

Another aspect of this disclosure provides an apparatus (e.g., a station or an access point). The apparatus may be configured to receive a message from a second wireless device that indicates an intention of the second wireless device to switch to an operating mode. The operating mode may be one of an active mode, a power save mode, or a TWT power save mode. During the TWT power save mode, the second wireless device may enter an awake state during TWT service periods and may enter a doze state outside of the TWT service periods. The apparatus may be configured to store the operating mode associated with the second wireless device. The apparatus may be configured to transmit to the second wireless device an acknowledgment of the operating mode switch.

BRIEF DESCRIPTION OF THE DRAWINGS

FIG. 3 is an exemplary diagram of a wireless network implementing solicit TWT scheduling and an exemplary timing flow diagram for TWT operation.

DETAILED DESCRIPTION

Figure 1:
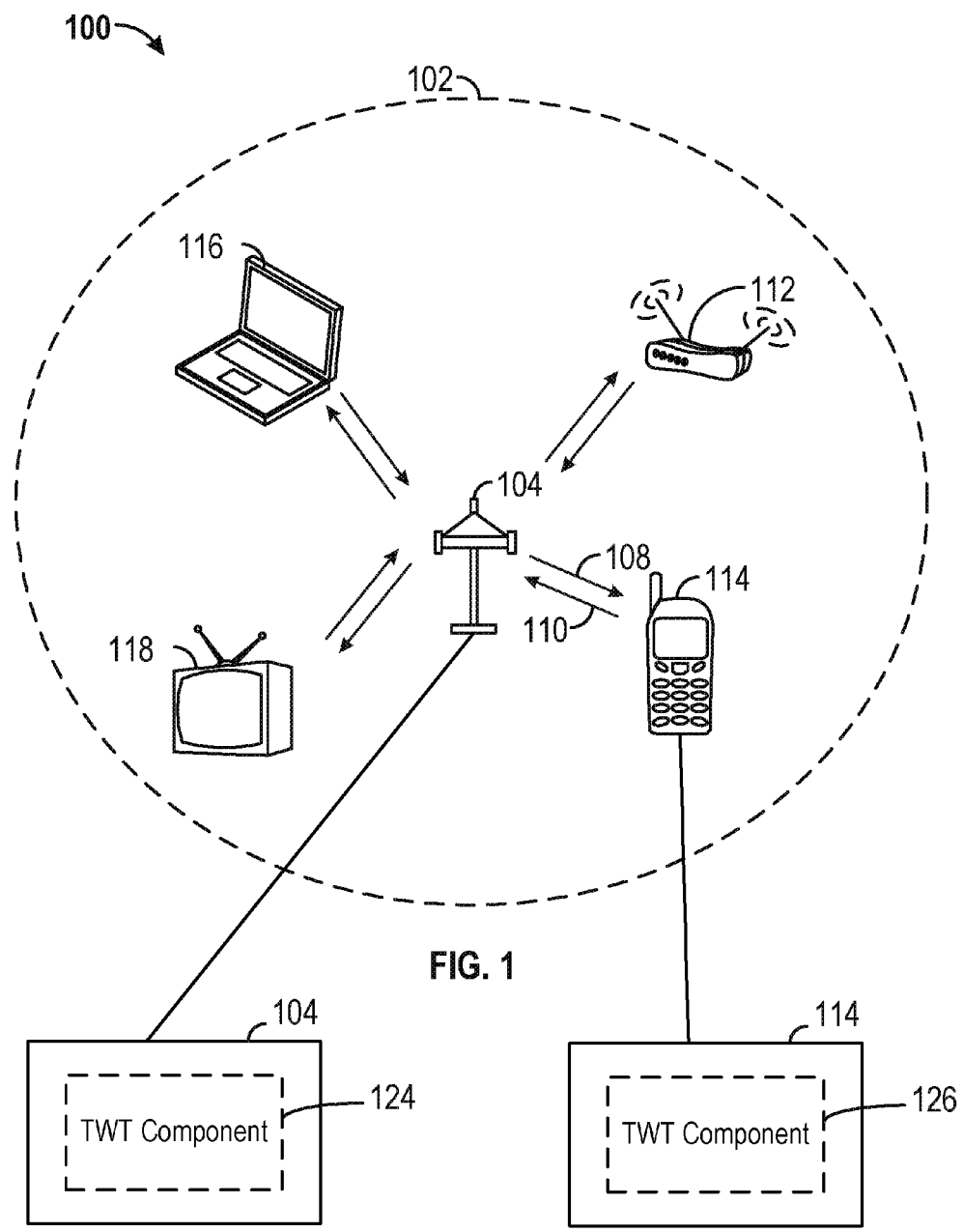
FIG. 1 shows an example wireless communication system in which aspects of the present disclosure may be employed.

Various aspects of the novel systems, apparatuses, computer-readable medium, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations, a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations, the station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of a list of" items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM or orthogonal frequency-division multiple access (OFDMA) techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system. In an aspect, the wireless communication system 100 may support MIMO transmissions, including single-user MIMO and multi-user MIMO. The wireless communication system 100 may also support multi-user OFDMA, etc.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, either from the beacon or probe response frames, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more components for performing various functions. For example, the AP 104 may include a TWT component 124 to perform procedures related to TWT operations/scheduling. In an aspect, TWT component referred to herein may be a scheduling component. In one example, the TWT component 124 may be configured to receive, from a second wireless device, a first message that includes a first trigger field. The first trigger field may indicate whether the first message includes a request for a trigger message to be sent by the first wireless device at a start of a TWT service period. The TWT component 124 may be configured to determine a TWT schedule based on the received first message. The TWT component 124 may be configured to transmit a second message to the second wireless device. The second message may include the TWT schedule and a second trigger field based on the determined TWT schedule. The second trigger field may indicate whether the AP 104 will transmit the trigger message at the start of the TWT service period (or during the TWT service period). In an aspect, the AP 104 may transmit one or more trigger messages during the TWT service period. The trigger message is a frame that may enable the one or more intended recipients to transmit messages or frames to the transmitter of the trigger message after a determined period of time after the trigger message is received (e.g, after a short interface space (SIFS)), for example, as an immediate response to the trigger message in which the frames may be sent in single user (SU) mode or multi-user (MU) mode. In another example, the TWT component 124 may be configured to determine a TWT schedule and to broadcast a message that may include the determined TWT schedule to one or more wireless devices. The message may include a broadcast indicator that indicates the TWT schedule is a broadcast TWT schedule. In yet another example, the TWT component 124 may be configured to receive a message from a second wireless device that indicates an intention of the second wireless device to switch to an operating mode that is one of an active mode, a power save mode, or a TWT power save mode. During the TWT power save mode, the second wireless device may enter an awake state during TWT service periods and may enter a doze state outside of the TWT service periods. In this example, the TWT component 124 may be configured to store the operating mode associated with the second wireless device and to transmit to the second wireless device an acknowledgment of the operating mode switch.

In another aspect, the STA 114 may include one or more components for performing various functions. For example, the STA 114 may include a TWT component 126 to perform procedures related to TWT operation/scheduling. In one example, the TWT component 126 may be configured to transmit a first message that includes a first trigger field to a second wireless device. The first trigger field may indicate whether the first message includes a request for a trigger message to be sent by the second wireless device at a start of a TWT service period or during a TWT service period. The TWT component 126 may be configured to receive a second message from the second wireless device. The second message may include a second trigger field based on the first message, and the second trigger field may indicate whether the second wireless device will transmit the trigger message at the start of the TWT service period. In another example, the TWT component 126 may be configured to receive from a second wireless device a message that includes a TWT schedule. The message may include a broadcast indicator that indicates the TWT schedule is a broadcast TWT schedule. The TWT component 126 may be configured to determine one or more TWTs for the first wireless device based on the TWT schedule. In another example, the TWT component 126 may be configured to determine whether to switch to an active mode, a power save mode, or a TWT power save mode. During the TWT power save mode, the STA 114 may enter an awake state during TWT service periods and may enter a doze state outside of the TWT service periods. In this example, the TWT component 126 may be configured to transmit a message to a second wireless device based on the determination.

In Wi-Fi networks, an AP often serves multiple STAs within a BSS as illustrated in FIG. 1. When STAs (e.g., STAs 112, 114, 116, 118) have data to transmit or receive, STAs exchange UL/DL frames with the AP (e.g., in a multi-user context). The UL/DL frames refer to UL only, DL only, or both. To perform data transmission or reception, STAs may need to receive a trigger frame from the AP to enable the UL/DL exchange. A trigger frame may contain a set of resource allocations for the UL/DL exchange. To receive the trigger frame, a STA may need to be in an awake mode/state for unknown periods of time to wait for a trigger frame. Potentially long and frequent periods spent waiting for a trigger frame increases power consumption of the STA. As such, a need exists to reduce power consumption by lowering the airtime needed for UL/DL frame exchanges. One solution is to implement a target wake time (TWT) scheduling protocol in which devices (e.g., STAs or APs) may be scheduled to sleep and wake up at specific times to perform UL/DL exchanges and trigger frames may be scheduled for transmission at predetermined or negotiated times. When a STA or an AP is not scheduled to be awake to receive trigger frames, for example, the STA or the AP can be in sleep mode (or power save mode) to conserve power. The TWT scheduling protocol is beneficial to any scheduling mechanism that may be negotiated between devices or dictated by one device to schedule intervals of time during which to exchange information between two or more devices. While the above description is related to power consumption aspects, other benefits of scheduling are obvious to one skilled in the art, such as contention reduction, hidden node mitigation, interference management, etc.

To facilitate improved power management protocols and techniques for Wi-Fi networks, three main topics are provided below. The first topic relates to a solicit TWT protocol that enables a first wireless device to negotiate with a second wireless device to determine an individual TWT schedule that will indicate when the first wireless device will wake up to communicate with the second wireless device. The second topic relates to a broadcast TWT protocol in which a first wireless device, such as for example an AP, may determine a TWT schedule for one or more wireless devices (e.g., multiple STAs). The TWT schedule in a broadcast TWT protocol may not be negotiated. Instead, other wireless devices that want to communicate with the first wireless device will wake up according to the times provided in the broadcasted TWT schedule. The other wireless devices may also communicate with the first wireless device according to the parameters provided by the first wireless device. Both the solicit TWT and broadcast TWT protocols may use implicit or periodic TWT schedules (in which a first TWT may be explicitly indicated in a message and additional TWTs may be implied from the first TWT and other parameters contained in the message) and explicit or aperiodic TWT schedules (in which all TWTs associated with the TWT schedule may be explicitly indicated in the message, and a message for any subsequent TWTs may be delivered during a TWT service period that precedes the subsequent TWT). Finally, the third topic relates to devices switching between different modes of operation (e.g., active mode, a passive or power save mode, and/or a TWT power save mode) to save power. In particular, as further described below, the TWT power save mode is a mode of operation designed to reduce power consumption for wireless devices operating in accordance with a TWT agreement or schedule.

Figure 2:
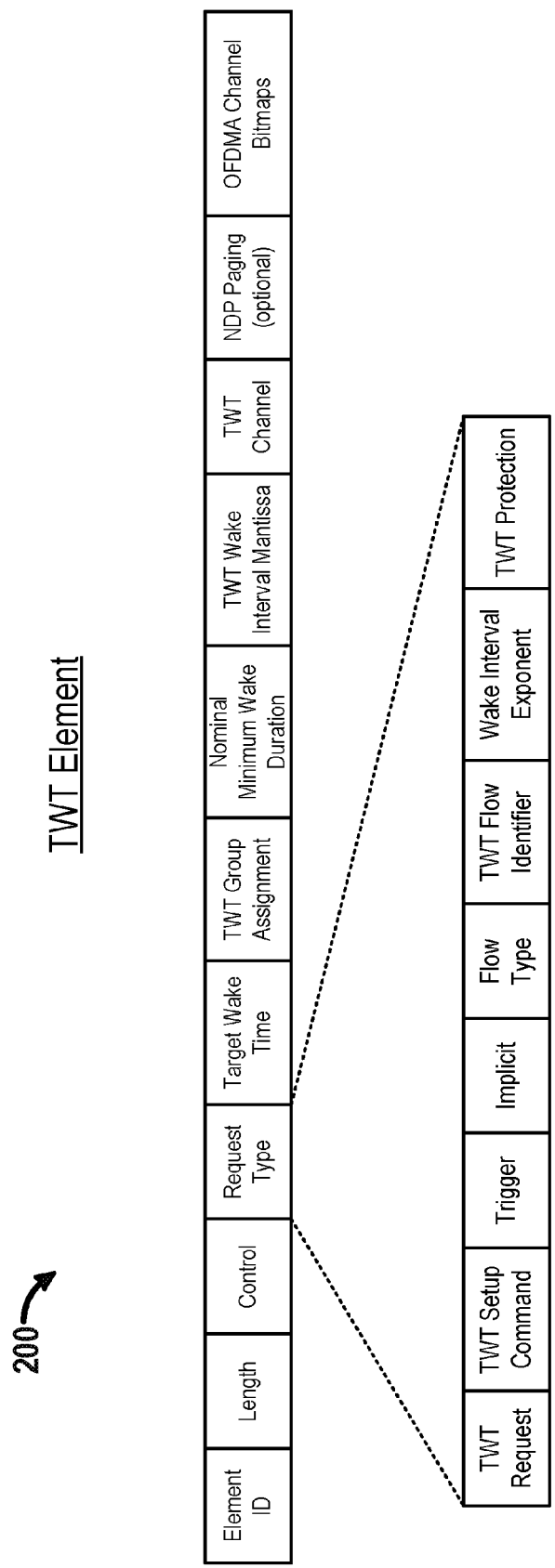
FIG. 2 is an exemplary diagram of a target wake time element for supporting target wake time and trigger frame scheduling.

In an aspect, to enable wireless devices to negotiate and/or transmit TWT schedules, a signaling mechanism that identifies the different parameters associated with TWT scheduling is needed. FIG. 2 provides one exemplary diagram of a TWT element for TWT scheduling. In the exemplary diagram, one or more of the fields shown in the figure may be optionally present, depending on the parameters being delivered. As an example, in TWT setup the TWT element may not contain the TWT group assignment field, the NDP paging field and/or the OFDMA channel bitmaps field. Other fields may also not be present in the exchanged TWT element. Other variations of the TWT element inline with the teachings herein are also provided in subsequent figures.

FIG. 2 is an exemplary diagram of a TWT element 200 for supporting target wake time and trigger frame scheduling. To enable a TWT scheduling, an AP and a STA, for example, may negotiate a target wake time using a TWT element that provides the necessary signaling between devices to schedule one or more target wake times and their corresponding parameters. The TWT element may be transmitted in an individually addressed management frame that can be of type action, action no ack, (re)association request/response, probe request response, etc., when the TWTs are negotiated between the first wireless device and the second wireless device, e.g., during a TWT setup phase. In another embodiment, for a broadcast TWT, the TWT element may be transmitted in a broadcast management frame that can be of type Beacon, or TIM Broadcast frame, etc. In this embodiment the TWT element provides non-negotiated schedules (e.g., broadcast TWT schedules) as described further below.

In an aspect, the STA requesting the TWT schedule may be referred to as the TWT requester, and the AP responding to the request may be known as the TWT responder. In this embodiment, the TWT schedule and parameters are provided during the TWT setup phase and renegotiation/ changes of TWT schedules are signaled via individually addressed frames that contain the updated TWT parameters. These frames can be management frames as described above, control frames or data frames that carry a field containing the updated TWT schedule and its related parameters. In another aspect, two STAs may negotiate a TWT schedule and one STA may be the TWT requester and the other STA may be the TWT responder.

Referring to FIG. 2, in the TWT element 200, an element ID (e.g., 1 octet in length) may indicate that an information element is a TWT element. A length field (e.g., 1 octet) may indicate the length of the TWT element 200 starting from the control field until the end of the TWT element (e.g., the end of the OFDMA channel bitmaps field). The TWT element 200 may include a target wake time field (e.g., 8 octets or less), a TWT group assignment field (e.g., 9, 3, 2, or 0 octets), a nominal minimal wake duration field (e.g., 1 octet), a TWT wake interval mantissa (e.g., 2 octets), a TWT channel field (e.g., 1 octet), an NDP paging field (e.g., 0 or 4 octets) and/or an OFDMA channel bitmaps field (e.g., 0, 1, 2 to 8 Octets). In certain embodiments, the length field may indicate a length of a TWT element that carries multiple groups or instances of these fields (e.g., multiple groups of the fields from at least one of the Control, Request Type, ..., up to the OFDMA channel bitmaps field as shown in the TWT element 200). In such embodiments, the TWT element 200 may contain TWT parameters for one or more TWT negotiations or indications as described herein. Each of the TWT negotiations contained in the TWT element may be identified by a unique TWT flow identifier. In certain embodiments, the one or more groups of fields may be related to non-negotiated TWTs (e.g., broadcast TWTs) as described further below.

Referring to FIG. 2, a request type field (e.g., 2 octets) may indicate a type of TWT request. The request type field may include multiple fields (or subfields). The fields may include a TWT request field (e.g., 1 bit), a TWT setup command field (e.g., 3 bits), a trigger field (e.g., 1 bit), an implicit field (e.g., 1 bit), a flow type (e.g., 1 bit), a TWT flow identifier (e.g., 3 bits), a wake interval exponent (e.g., 5 bits), and/or a TWT protection field (e.g., 1 bit).

The TWT request field may indicate whether the TWT element 200 represents a request. If TWT request field has a value of 1, then the TWT element 200 may represent a request to initiate TWT scheduling/setup. Otherwise, if the TWT request field has a value of 0, then the TWT element 200 may represent a response to a request to initiate TWT scheduling/setup (solicit TWT), an unsolicited TWT (which is a response to initiate a TWT scheduling which is conceptually similar to the solicited TWT with the exception that the TWT requester STA did not send a TWT request to solicit this TWT response), and/or a non-negotiable TWT scheduling message (or a broadcast TWT message). In the case of the non-negotiable TWT (broadcast TWT), one or more of the above mentioned fields (including the TWT request field) may not be present in the TWT element as discussed further below).

The TWT setup command field may indicate the type of TWT command. In a TWT request, the types of TWT commands may indicate the following: request TWT (the TWT field contains zeros because the TWT responder specifies the TWT value; e.g., field set to 0), suggest TWT (the TWT requester suggests a TWT value; e.g., field set to 1), and demand TWT (the TWT requester demands a TWT value; e.g., field set to 2). In a TWT response, the types of TWT commands may include TWT grouping (the TWT responder suggests TWT group parameters that are different from the suggested or demanded TWT parameters of the TWT requester; e.g., field set to 3), accept TWT (the TWT responder accepts the TWT request with the TWT parameters indicated; e.g. field set to 4), alternate TWT (the TWT responder suggests TWT parameters that are different from the parameters suggested or demanded by the TWT requester; e.g., field set to 5), dictate TWT (the TWT responder demands TWT parameters that are different from the parameters suggested or demanded by the TWT requester; e.g., field set to 6), or reject TWT (the TWT responder rejects the TWT setup; e.g. field set to 7).

In a TWT response, the TWT command may indicate an unsolicited response (e.g., the TWT responder may demand the recipient to follow the TWT schedule contained in the element), a broadcast TWT (the TWT responder is scheduling the TWT for any STA that is reading the element), etc. In particular, for an unsolicited response, the TWT element

200 may include a value of dictate TWT in the TWT command field and the TWT request field may be set to 0. The unsolicited TWT is an individually addressed frame that is intended for a specific STA (whereas a broadcast TWT may be for multiple STAs and may be carried in a broadcast frame such as, for example, a beacon. Further, the unsolicited TWT may typically involve a frame exchange in which the STA receiving the unsolicited TWT may respond with an ACK, whereas broadcast TWTs may not be acknowledged.

In an aspect, a TWT responder, who receives a TWT request from a TWT requester and whose value of the TWT wake interval is equal to the TWT requester's listen interval, may respond to the TWT request with either an accept TWT or a reject TWT in the TWT command field. In the case of an accept TWT, the accept TWT may include the value of the allocated first target beacon transmit time in the TWT wake time field and the value of the listen interval between consecutive target beacon transmit times (TBTTs) in the TWT wake interval mantissa and the TWT wake interval exponent fields. In this aspect the TWT request/TWT response mechanism may be used by the requesting STA to identify which of the broadcast frames that contain the broadcast TWT schedule (e.g., beacon frames) it will wake to receive. In certain embodiments, a value of the TWT flow identifier may be reserved for this purpose (negotiation of TBTTs) to differentiate it from a TWT setup that negotiates TWT schedules). As an example, either the value 0 or 7 of the TWT flow identifier may be used for this purpose (negotiation of TBTTs). In this aspect, either of these values shall not be used for the purpose of negotiating TWT schedules.

If sent in a TWT request, the trigger field may indicate whether a request for a target wake time includes a request for a trigger frame to be sent by the TWT responder at the start or during the TWT service periods that correspond to the requested TWT schedule. In an aspect, the trigger frame may be transmitted up to the duration of the TWT service period that corresponds to the scheduled TWT and one or more trigger frames may be scheduled by the TWT responder. If sent in a TWT response, the trigger field may indicate whether a response to a request for a target wake time indicates whether one or more trigger frames will be sent at a scheduled TWT. The one or more trigger frames may be sent within the boundaries of the TWT service period duration that correspond to the requested TWT schedule. For example, in a TWT request, if the trigger field has a value of 0, then the TWT request may not request a trigger frame, but if the trigger field has a value of 1, then the TWT request may request a trigger frame. In a TWT response, if the trigger field has a value of 0, then no trigger frame will be sent, but if the trigger field has a value of 1, then at least one trigger frame may be transmitted at or during a scheduled TWT service period. In certain embodiments, the trigger field may be included in any of the fields in the TWT element or in any other fields of other elements used for providing scheduling information.

The implicit field may indicate whether the next TWT is implicitly calculated or explicitly signaled. For example, if the implicit field has a value of 1, then the next TWT is implicitly calculated by the TWT requester (and TWT responder) during a TWT service period of a scheduled TWT (in certain embodiments as identified by the TWT flow identifier). For example, the subsequent or next TWT may be determined based on the value of the TWT (e.g., as indicated in the TWT element 200) of the current TWT service period plus a multiple of the TWT wake interval (e.g., TWT period=TWT wake interval mantissa*$2^{wake\ interval\ exponent}$, such that next TWT=current TWT+TWT period). This allows periodic scheduling of the TWTs, which is simple and flexible for normal operations. In an aspect, a wireless device that has an implicit TWT schedule (or agreement) with another wireless device may not generate a block acknowledgment TWT frame (BAT) frame, a TWT acknowledgment (TACK) frame, or a short TWT acknowledgment (STACK) frame for subsequent TWT start times associated with the same TWT schedule. If the implicit field has a value of 0, then the next TWT may be explicitly signaled by the TWT responder during a TWT service period. The TWT responder may transmit a BAT or TACK or STACK frame, each of which is a control response frame that may contain next TWT information.

In certain embodiments, the TWT responder may transmit a TWT information frame (e.g., an action frame or action no ack frame) that contains similar TWT information. The frames may include a partial time stamp (containing a partial value of the TSF timer of the TWT responder) and a next TWT that indicates when the next TWT is scheduled (e.g., the next TWT is scheduled in 2 or 5 seconds from the start of the TWT of the current TWT service period).

In another configuration, within an implicit TWT agreement, either the TWT responder or TWT requester may transmit a TWT information frame for rescheduling the next TWT. The TWT information frame may include a response requested subfield set to 0 and the next TWT request subfield set to 0. In an aspect, the TWT information frame may indicate a nonzero next TWT in the next TWT subfield when the TWT information frame is transmitted by the TWT responder. In another aspect, the TWT information frame may include indicate a suspension of the TWT agreement (or all TWT agreements) when the next TWT subfield is not present and the TWT information frame is transmitted by the TWT requester. In another aspect, the TWT information frame may indicate a resumption of the previously suspended TWT agreement (or all TWT agreements) when the next TWT subfield is present and the TWT information frame is transmitted by the TWT requester. In this aspect, the next TWT subfield may include the next TWT, selected from the previously negotiated implicit TWT, at which the implicit TWT agreement is resumed. In another embodiment, an indication in any frame transmitted by the TWT requester to the TWT responder may provide such indication. As an example, a subfield in the MAC header (e.g., within the high efficiency (HE) variant of the high throughput (HT) Control field) of a frame transmitted to the TWT responder may indicate a suspension of the TWT agreement(s) if set to 1 and may indicate a resumption of the TWT agreement(s) if set to 0, or vice versa.

The TWT flow type may indicate the type of interaction between the TWT requester and the TWT responder at the TWT. In an aspect, the TWT requester may set the TWT flow type. For example, a value of 0 in the TWT flow type may indicate an announced TWT in which the TWT requester announces itself at the start of a TWT SP by transmitting a power save poll (PS-Poll) frame or an automatic power save delivery (APSD) trigger frame to signal the awake state of the TWT requester to the TWT responder before a frame is sent from the TWT responder to the TWT requester. In an aspect, the TWT responder may not send frames to a TWT requester without knowing the power state of the TWT requester in order to avoid transmitting to the TWT requester when the TWT requester is in a doze state. In another example, a value of 1 in the flow type may indicate an unannounced TWT. In an unannounced TWT, the TWT requester may not need to announce itself. The TWT responder may assume that the TWT requester is awake. The TWT responder may transmit one or more DL frames to the TWT requester at the TWT without waiting to receive a PS-poll or an APSD trigger frame from the TWT requester.

In another aspect, a TWT responder may set the TWT flow type to 0 to indicate that the TWT responder may transmit a frame to the TWT requester at a TWT without waiting to receive a PS-Poll or APSD trigger frame from the TWT requester. In another aspect, the TWT responder may set the TWT flow type to 1 to indicate that the TWT responder may not transmit a frame to the TWT requester within the TWT service period until the TWT responder has received a PS-Poll or APSD trigger frame from the TWT requester.

The TWT flow identifier may contain a 3-bit value. In one aspect, for solicit TWTs or unsolicited TWTs (e.g., TWT elements contained in individually addressed frames), the TWT flow identifier may identify specific information for a TWT request uniquely from other requests made between the same TWT requester and the TWT responder pair. In certain aspects, as described above, a value of the TWT flow identifier may be reserved for the purpose of negotiation the TBTTs for broadcast TWT operation, e.g., a value 0 or value 7). In another aspect, such as for a TWT element that carries information for one or more TWT parameter sets, each of which includes information related to one or more TWT SPs that are broadcast TWT SPs (e.g., a broadcast TWT element that is carried in a broadcast frame (or in general group addressed frame)), the TWT flow identifier may indicate the types of flows that may be allowed in response to a scheduled trigger frame during the TWT service periods when the trigger field of the TWT element is set to 1 and the type of flows that may be allowed during the TWT SPs when the trigger field of the element is set to 0. In one example, when the TWT flow identifier is 0, wildcard or random OFDMA allocation access from unassociated STAs may be allowed. In another example, when the TWT flow identifier is 1, wildcard or random OFDMA allocation access from associated STAs may be allowed. In another example, when the TWT flow identifier is 2, scheduled access for associated STAs in power save mode may be allowed. In another example, when the TWT flow identifier is 3, voice traffic may be allowed. In yet another example, when the TWT flow identifier is 4, video traffic may be allowed, etc. In another example, a value of the TWT flow identifier may indicate that (T)DLS (direct link setup or tunneled direct link setup) traffic is allowed (e.g., frames exchanged between STAs (e.g., neither of which is the STA that sent the trigger frame when the trigger field of the TWT element is 1). In certain aspects, the above described functionalities of the TWT flow identifier may be incorporated in a different subfield within the TWT element. In other embodiments, such as when the TWT service period that is not a broadcast TWT service period, the TWT flow identifier subfield may contain a value that identifies the specific information associated with the TWT request uniquely from other requests made between the same TWT requester and TWT responder pair.

The TWT protection field may indicate whether a TWT is protected or unprotected. A TWT requester may set the TWT protection field to 1 to request the TWT responder to provide protection for the set of TWT service periods corresponding to the requested TWT ID by allocating one or more restricted access windows (RAWs) that restrict access to the medium during the TWT service periods corresponding to the TWTs. In certain embodiments, a TWT protection field equal to 1 indicates a request or response to commit (e.g., shall) using network allocation vector (NAV) protection mechanisms to protect the access to the medium during the corresponding TWT service periods. A TWT requester sets the TWT protection field to 0 if the TWT protection by RAW allocation is not requested for the corresponding TWTs. For an unprotected TWT, the TWT responder may protect the TWT service periods using a NAV protection mechanisms (or other similar mechanisms). That is, each STA may include a NAV and may increase the NAV and delay transmitting while other STAs are transmitting.

In certain aspects, the TWT responder that has set the TWT protection field to 1 may send a NAV setting frame approximately at the start of the TWT service periods that correspond to the particular scheduled TWT. For example, the NAV setting frame can be a CTS message. In these aspects, any STA that receives the frame and is not scheduled to access the medium during the TWT service period that is covered by the NAV duration of the NAV setting frame shall set their NAV and not access the medium for the specified amount of time. On the other hand, any STA that receives the frame and is scheduled to access the medium during the TWT service period should ignore the NAV settings dictated by the CTS to self frame (in certain embodiments STAs can reset their NAV counters even though the counters were set by other received frames).

In an aspect, the NAV or the NAV setting frame may be ignored by STAs that are accessing the medium during the TWT service period (e.g., for certain frames only such as multi-user or single user, short packet size, etc.)

In a TWT request, the TWT wake interval may be the average time that the TWT requester expects to elapse between successive TWT service periods. In a TWT response, the TWT wake interval may be the average time that the TWT responder expects to elapse between successive TWT service periods. When transmitted by a TWT requester, the TWT field may contain a positive integer which corresponds to a time at which the TWT requester requests to wake, or a value of zero when the TWT setup command field contains the value corresponding to the command "Request TWT." When transmitted by a TWT responder, the TWT field may contain a value that corresponds to a time at which the TWT responder requests the TWT requester to wake. The TWT group assignment field may provide information to a TWT requester about the TWT group to which the TWT requester is assigned. The nominal minimum wake duration field may indicate the minimum amount of time that the TWT requester expects that the TWT requester needs to be awake in order to complete the frame exchange associated with the TWT flow identifier for the period of the TWT wake interval, where the TWT wake interval is the average that the TWT requester expects to elapse between successive TWT service periods. The TWT wake interval mantissa may be set to the value of the mantissa of the TWT wake interval value in microseconds, base 2.

When transmitted by a TWT requester, the TWT channel field may contain a bitmap (or other information) indicating which channel or channels the TWT requester wants to use as temporary primary channels or as channels to be used for DL and/or UL MU transmissions (MU OFDMA or MIMO) during the TWT service period that corresponds to the scheduled TWT. When transmitted by a TWT responder, the TWT channel field may contain a bitmap (or other information) indicating which channels the TWT requester is allowed to use as temporary channel or channels or as channels to be used for DL and/or UL MU transmissions (MU OFDMA or MIMO) during the TWT service period. In certain embodiments, the channel width of each of the channels identified by the bits in the TWT channel bitmap may be 20 MHz. As such, in one configuration, the TWT channel field may indicate the channel and the channel width that the TWT requester or the TWT responder expects to be used for exchanging frames during a TWT service period. A single user physical layer convergence procedure (PLCP) protocol data unit (PPDU) exchanged between devices during a TWT service period may not exceed the negotiated channel width. A PLCP service data unit (PSDU) contained in MU PPDUs, for example, may be transmitted within the negotiated channel(s) and may not exceed the width of the negotiated channel. For example, if the negotiated channel has an upper bit equal to 1, then MU PSDUs exchanged during the TWT service period may be located in the upper 20 MHz of a 160 MHz channel. This configuration enables STAs to dynamically negotiate operating primary channel/width and also indicate which MU resource is preferred. If STAs prefer not to use this signaling, then the STAs may set the TWT channel field to the BSS primary channel and set the channel width to the width of the BSS primary channel. In another configuration, the TWT channel field may be set to 0 and indicate nothing.

In another aspect, the TWT element 200 may additionally include an OFDMA channel bitmaps field. In certain embodiments this field may provide a bitmap of subchannels for the channels indicated in the TWT channel field. The OFDMA channel bitmaps field may contain a bitmap of subchannels. In one aspect, the OFDMA channel bitmaps field may contain one or more bitmaps (one for each of the bits set to 1 in the TWT channel field) each of which may be associated with one channel indicated in the TWT channel bitmap. Each bitmap may contain 8 bits each of which may identify one subchannel (e.g., an OFDMA channel) of channel width 2.5 MHz, or less) of the 20 MHz channel of the corresponding bit in the TWT channel bitmap. The number of OFDMA channel bitmaps may be equal to the number of non-zero bits in the TWT channel field preceding the OFDMA channel bitmaps field. The n-th OFDMA channel bitmap field may be a mapping of the subchannels of the n-th channel located at the n-th position in the TWT channel bitmap. Note that for exemplary purposes, some values of channel widths and field sizes are described, any value can be used for covering different bandwidths, channels, and subchannel units. As such, greater flexibility may be added by defining OFDMA channel bitmaps for each of the TWT channels indicated in the TWT channel field. An OFDMA channel bitmap enables a TWT requester to indicate a preference for which channel to be allocated during the UL/DL multi-user operation in the TWT channel and eventually in the OFDMA channel bitmaps. The TWT responder can agree with the TWT requester's suggestion or suggest other channels or a subset of the indicated channels in a TWT response.

As discussed above, the TWT element 200 may be transmitted in different types of frames. The frames may be individually addressed or group addressed frames. In one aspect, the TWT element 200 may be transmitted in an action frame (e.g., either an action ACK or action no ack frame) or other frame types such as an association request/response and/or probe request/response frames. In other aspects, the TWT element 200 may be transmitted in a beacon frame or in another management frame. In an aspect, the aforementioned parameters or fields in the TWT element 200, including the TWT, the TWT Wake Interval Mantissa, and the TWT channel parameters, may be negotiated between devices during TWT setup, which may be performed using individually addressed frames exchanged between the TWT requester and TWT responder. In another aspect, the bit lengths of each field/subfield described above are provided for exemplary purposes and are not intended to limit the scope of the TWT element 200.

Solicited TWT Scheduling

FIG. 3 includes an exemplary diagram 300 of a wireless network implementing solicit TWT scheduling and an exemplary timing flow diagram 350 for TWT operation. The diagram illustrates an AP 302 broadcasting or transmitting within a BSS 304. STAs 306, 308, 310 are within the BSS 304 and are served by the AP 302. The STAs 306, 308, 310 and the AP 302 may perform TWT scheduling.

In one configuration, the STA 306 and the AP 302 may negotiate the TWT scheduling. In this configuration, the STA 306 may act as the TWT requester and initiate TWT setup with the AP 302 (although STA 306 and the AP 302 may also reverse roles). During TWT setup, the STA 306 may transmit a first message 312 (e.g., an action frame, association frame, or another frame) to the AP 302, which may act as the TWT responder. The first message 312 may include a TWT element (e.g., the TWT element 200 illustrated in FIG. 2). The first message 312 may include a first element ID identifying the TWT element 200. The first message 312 may include a first TWT request field having a value of 1 to indicate that the TWT element is a TWT request. The first message 312 may include a first trigger field with a value of 0 if the STA 306 does not request a trigger frame to be sent by the AP 302 at the start of or during a TWT service period. In another aspect, the first message may include a first trigger field with a value of 1 if the STA 306 includes a request for a trigger message to be sent by the AP 302 at the start of or during the one or more TWT service periods that correspond to the requested TWT schedule. In another aspect, the STA 306 may set a first TWT setup command to "Request TWT" to enable to AP 302 to set a TWT for the STA 306. In another aspect, the STA 306 may set the first TWT setup command to "Suggest TWT" to indicate a suggested/requested TWT to the AP 302. In addition, the STA 306 may set the other parameters of the TWT request to indicate other parameters for the request. For example, the STA 306 may set the implicit field to 1 to indicate a request for an implicit TWT schedule (e.g., periodic) or to 0 to indicate an explicit TWT. In an aspect, the STA 306 may set the implicit field to 1 and the NDP paging indicator subfield of the element to 0. The STA 306 may set the flow type to indicate announced TWT (e.g., the TWT requester intends to be the first to send a frame (e.g., PS-Poll or APSD trigger frame) following the trigger frame) or unannounced TWT (e.g., the TWT responder is to assume the STA be in awake state and to send other frames to the STA in DL). The STA 306 may also indicate a preferred channel and/or preferred subchannels in the TWT channel field for use during the scheduled TWT. In an aspect, the STA 306 may further indicate preferred OFDMA subchannels in an OFDMA subchannel bitmap field within the first message 312.

After receiving the first message 312 from the STA 306, the AP 302 may determine whether to schedule one or more target wake times based on the first message 312. The AP 302 may determine whether to schedule TWTs for the STA 306 based on the number of STAs and/or the amount of data traffic within the BSA 304. For example, if the AP 302 detects a large number of STAs (e.g., 4) in the BSS 304, the AP 302 may improve channel contention by spreading out the wake up times of STAs if the STAs are operating in single user (SU) mode or concentrate the STAs wake up times if they are operating in multi-user (MU) mode. By contrast, if the AP 302 detects a small number of STAs (e.g., 1 or 2), the AP 302 may schedule the target wake times closely so that resources are not wasted and data rates may be high. However, the AP 302 may want to improve power save of the STAs in which case the AP 302 may account for the STAs' suggestions of the TWT allocations etc. Similarly, if the AP 302 determines that the medium is busy, the AP 302 may spread out the wake up times of the STAs to reduce traffic. If the medium is not busy, the AP 302 may schedule the target wake times closely. In an aspect, if the AP 302 determines that the medium is not busy and the first message 312 includes a suggested TWT, the AP 302 may determine to accept the TWT requested in the first message 312. In another aspect, if the medium is busy, the AP 302 may determine to provide a scheduled TWT that is different from the suggested/requested TWT of the STA 306. In yet another aspect, the AP 302 may determine not to schedule a TWT for the STA 306. In addition the AP 302 may allocate multiple STAs with similar requests in terms of traffic schedule, pattern, quality of service (QoS) requirements, power save requirements, feedback in the same TWT schedule so that the AP 302 can exchange traffic with the STAs using MU transmissions that are triggered by trigger frames.

After receiving the first message 312, the AP 302 may determine whether to send one or more trigger frames to the STA 306 based on the value of the first trigger field included in the first message 312. If the value of the first trigger field in the first message 312 is 0, then the AP 302 may determine not to send a trigger frame at the start of or during the TWT service period. If the value of the first trigger field in the first message 312 is 1, then the AP may determine to send one or more trigger frames at the start of or during the one or more TWT service periods based on the medium status (e.g., amount of traffic), the number of STAs in the BSA 304, and/or any other TWT requests from other STAs. The AP 302 may transmit a second message 314 to the STA 306. The second message 314 may be a TWT response to the TWT request (e.g., the first message 312) transmitted by the STA 306 (solicit TWT setup). In another embodiment, the second message 314 may be a TWT response that may be sent without receiving any TWT requests by the STA 306 (unsolicited TWT setup). The second message 314 may include a second trigger field based on the first message 312. The second trigger field may indicate whether the AP 302 will transmit one or more trigger frames at a scheduled TWT of the TWT service period. For example, if the first trigger field in the first message 312 has a value of 0, then the second trigger field in the second message 314 may have a value of 0. But if the first trigger field in the first message 312 had a value of 1, then the second trigger field in the second message 314 may have a value of 1 if the AP 302 determines to transmit one or more trigger frames at one or more scheduled TWTs of one or more TWT service periods. The scheduled TWT may be the same as a requested TWT in the first message 312. The scheduled TWT may also be a different TWT determined by the AP 302. In another aspect, the scheduled TWT may be a suggested TWT by the AP 302 such that the STA 306 may suggest a different TWT later (e.g., the STA 306 may renegotiate by transmitting another TWT request). Assuming the AP 302 schedules one or more trigger frames during one or more TWT service periods (e.g., TWT service periods 1, 2), the STA 306 may be able to send data to or receive data from the AP 302 upon receiving the one or more trigger frames. Upon receiving the second message 314, the STA 306 may determine whether the second trigger field has a value of 0 or 1. If the second trigger field has a value of 1, the STA 306 may wait for one or more trigger frames to be sent at a scheduled TWT and begin an UL/DL exchange upon receiving the trigger frame. Alternatively, even if the trigger field has a value of 1, the negotiation process may continue, and the STA 306 may negotiate for a different scheduled TWT by transmitting another message to the AP 302 requesting a different TWT (e.g., via unicast frames). Aside from negotiating the TWT, other parameters of TWT operation may also be negotiated (e.g., the TWT wake interval, the TWT channel, etc.). If the second trigger field has a value of 0, the STA 306 may wake up at the scheduled TWT indicated in the second message 314 but not know what to expect from the AP 302 during the TWT service period. For example, when the second trigger field has a value of 0, the AP 302 may or may not send a trigger frame at the start of the TWT service period (e.g., TWT service period 1).

Although the STA 306 has been the TWT requester in the aforementioned disclosure, in another configuration, the AP 302 may be the TWT requester and the STA 306 may be the TWT responder. In yet another configuration, the TWT setup and negotiation may occur between two STAs, such as the STAs 306, 308. STAs may perform TWT negotiation with each other when engaged in device-to-device communication such as in Tunneled Direct Link Setup (TDLS).

In an aspect, after TWT setup and negotiation, the STA 306 may not transmit a frame to the AP 302 during a trigger-enabled TWT service period (e.g., a TWT service period during which the AP 302 has indicated its intention to transmit a trigger frame by setting the trigger field of the TWT element exchanged during the TWT setup to 1) except when the frame is solicited by a trigger frame from the AP 302. However, if the STA 306 has data to transmit outside of a TWT SP, then the STA 306 may contend for the medium using lower priority enhanced distributed channel access (EDCA) parameters with respect to other STAs. Lower priority may be achieved, for example, by using EDCA parameters allocated to MU STAs or to TWT STAs. Such EDCA parameters may be associated with lower access categories such as access category best effort (AC_BE) or access category background (AC_BK), as opposed to the higher priority access categories such as access category video (AC_VI) or access category voice (AC_VO). In an aspect, the EDCA parameters may include a minimum contention window (CWMIN), a maximum contention window (CWMAX), an arbitration inter-frame spacing number (AIFSN), and/or a transmit opportunity (TXOP). The AC_BE and AC_BK access categories may have less favorable CWMIN, CWMAX, TXOP, and/or AIFSN values for medium contention.

Also, after the STA 306 negotiates an individual TWT session, the STA 306 may remain awake for at least an AdjustedMinimumTWTWakeDuration (e.g., a minimum time duration associated with a TWT service period) following the TWT start time to wait for a trigger message 316 from the AP 302. In another aspect, when the STA 306 transmits the frame during a trigger enabled TWT service period based on the trigger message 316, the STA 306 may be granted special medium access privileges (e.g., the STA 306 does not contend for the medium based on EDCA access categories or parameters when the transmitted frame is a response to a trigger frame).

In another aspect, after the STA 306 has negotiated an individual TWT session with the AP 302, the STA 306 may need not to read a beacon frame from the AP 302 because the STA 306 may not be expected to follow a broadcast TWT, which will be further discussed below.

In essence, the TWT operation as described offers several benefits. TWT operation improves channel contention because the wake times of STAs are either spread out for SU mode or concentrated within the same period of time to exchange frames in MU mode. STAs may wake up during scheduled target wake times and go to sleep outside of a TWT service period. TWT operation also reduces power expenditure because DL/UL frame exchange airtime is reduced.

Additionally, although the aforementioned signaling has been discussed with respect to the TWT element (e.g., the TWT element 200 in FIG. 2), similar signaling may be utilized in a RAW parameter set (RPS). For example, an RPS may include one or more RAW start time fields and a trigger field. The trigger field in the RPS may indicate whether a trigger frame is to be transmitted at the start of the RAW.

Although FIG. 2 and the aforementioned description disclose a single TWT in the TWT element 200, the TWT element 200 may include one or more TWTs by adjusting the value of the length field of the TWT element 200. Thus, different TWT flows may be associated with different device target wake times. Furthermore, the TWT element 200 may schedule additional TWTs on a periodic basis. For example, a next scheduled TWT may be implicitly calculated when the implicit field, as discussed above, is set to 1. The next scheduled TWT may be calculated based on the scheduled TWT plus a multiple of the TWT wake interval. In this aspect, a scheduled TWT may be associated with multiple later occurring scheduled TWTs, and the scheduled TWT may be associated with a corresponding TWT service period and with multiple later occurring TWT service periods associated with the later occurring scheduled TWTs.

Figure 4:
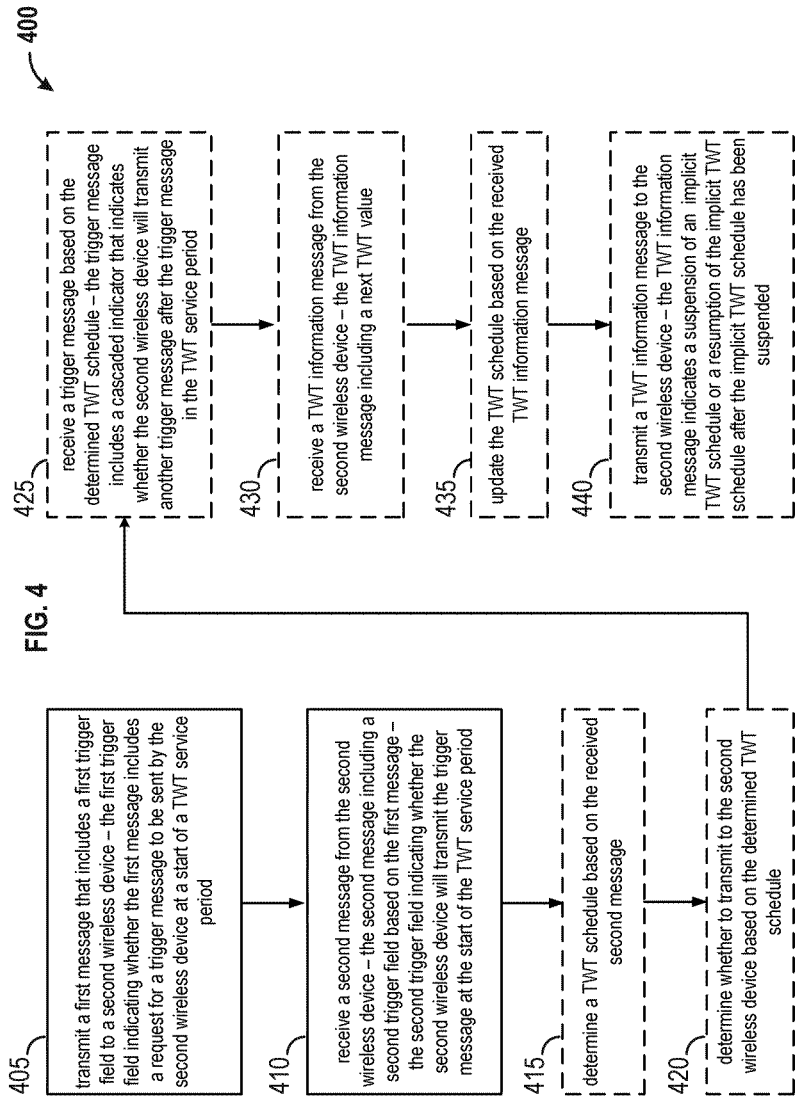
FIG. 4 is a flowchart of an example method of requesting TWT scheduling.

FIG. 4 is a flowchart of an example method 400 of requesting TWT scheduling. The method 400 may be performed using an apparatus (e.g., the AP 302, the STA 306, or the wireless device 1302, infra, for example). Although the method 400 is described below with respect to the elements of wireless device 1302 of FIG. 13, infra, other components may be used to implement one or more of the steps described herein.

At block 405, the apparatus may transmit a first message that includes a first trigger field to a second wireless device. The first trigger field may indicate whether the first message includes a request for a trigger message to be sent by the second wireless device at a start of a TWT service period For example, referring to FIG. 3, the apparatus may be the STA 306, and the second wireless device may be the AP 302. The STA 306 may transmit the first message 312 that includes the first trigger field to the AP 302. The first trigger field has a value of 1, indicating that the first message 312 includes a request for a trigger frame to be sent by the AP 302. In this example, the first trigger field having a value of 1 is (or indicates) a request for a trigger frame. The first message 312 also includes a suggested TWT of a TWT service period. In another example, the requested TWT may be a null value, indicating that no specific time is requested for TWT and that the AP 302 is free to select a scheduled TWT time. In an aspect, the first message 312 may include a TWT channel field that indicates a channel and a channel width that the STA 306 may use for communicating with the AP 302 during the TWT service period.

At block 410, the apparatus may receive a second message from the second wireless device. The second message may include TWT parameters and a second trigger field based on the first message, and the second trigger field may indicate whether the second wireless device will transmit the trigger message at the start of the TWT service period. For example, referring to FIG. 3, the STA 306 may receive the second message 314 from the AP 302. The second message 314 may include one or more fields (TWT parameters) in a TWT element and a second trigger field based on the first message 312. The second trigger field may have a value of 1, indicating that the AP 302 will transmit the trigger frame at a scheduled TWT of the TWT service period. In an aspect, the scheduled TWT value is later than the requested TWT value in the first message 312. Moreover, the first message 312 may include an OFDMA bitmap that indicates one or more OFDMA channels and channel widths, associated with the channels indicated in the TWT channel, for communicating with the STA 306.

At block 415, the apparatus may determine a TWT schedule based on the received second message. The apparatus may determine the TWT schedule by determining whether the TWT schedule is an implicit TWT schedule or an explicit TWT schedule based on the received second message and by determining one or more TWTs associated with the TWT schedule based on the received second message. For example, referring to FIG. 3, the STA 306 may determine whether the second message 314 indicates an implicit or explicit TWT schedule based on whether the implicit field is set to 1 (implicit TWT) or to 0 (explicit TWT). If the TWT schedule is implicit, then the STA 306 may determine one or more TWTs associated with the TWT schedule based on a TWT value included in the second message 314 and based on a TWT wake interval mantissa and a wake interval exponent included in the second message 314. By contrast, if the TWT schedule is an explicit TWT schedule, then the STA 306 may determine one or more TWTs based on the TWTs included in the second message 314.

At block 420, the apparatus may determine whether to transmit to the second wireless device based on the determined TWT schedule. In one configuration, the apparatus may determine whether to transmit by determining to transmit during the TWT service period only when a trigger message is received from the second wireless device or by determining to transmit outside of the TWT service period based on EDCA parameters associated with a best effort access category (AC_BE) or a background access category (AC_BK). For example, referring to FIG. 3, the STA 306 may determine whether to transmit to the AP 302 based on the determined TWT schedule. If the STA 306 wants to transmit during a TWT service period associated with the determined TWT schedule, then the STA 306 may wait for the trigger message 316 from the AP 302 before transmitting to the AP 302. If the STA 306 transmits during the TWT service period based on the trigger message 316, the STA 306 may not need to contend for the medium using EDCA. If the STA 306 does not receive the trigger message 316, then the STA 306 may refrain from transmitting during the TWT service period. In another aspect, if the STA 306 has data for transmission outside of the TWT service period, then the STA may transmit based on an EDCA contention for lower priority EDCA parameters associated with a best effort access category.

At block 425, the apparatus may receive a trigger message based on the determined TWT schedule. The trigger message may include a cascaded indicator that indicates whether the second wireless device will transmit another trigger message after the trigger message in the TWT service period. For example, referring to FIG. 3, the STA 306 may receive the trigger message 316 based on the determined TWT schedule. The trigger message 316 may include a cascaded indicator set to 0 that indicates the AP 302 will not transmit another trigger message in the TWT service period.

At block 430, the apparatus may receive a TWT information message from the second wireless device. The TWT information message may include a next TWT value. For example, referring to FIG. 3, the STA 306 may receive a TWT information message from the AP 302. In an aspect, the TWT schedule may be an implicit TWT schedule, and the TWT information message may indicate a different next TWT than what is implied based on the TWT schedule. In another aspect, the TWT schedule may be an explicit TWT schedule indicated by the second message 314, and the TWT information message may indicate a next TWT value that is different from the TWT values indicated in the second message 314.

At block 435, the apparatus may update the TWT schedule based on the received TWT information message. For example, referring to FIG. 3, the STA 306 may store and associate the new next TWT value with the determined TWT schedule.

At block 440, the apparatus may transmit a TWT information message to the second wireless device. The TWT information message may indicate a suspension of an implicit TWT schedule or a resumption of the implicit TWT schedule after the implicit TWT schedule has been suspended. For example, referring to FIG. 3, if the TWT agreement between the STA 306 and the AP 302 is an implicit TWT schedule, and the STA 306 no longer has data to transmit, then the STA 306 may transmit a TWT information message to the AP 302 signaling a suspension of the implicit TWT schedule. Subsequently, when the STA 306 has data to transmit, the STA 306 may transmit a second TWT information message to the AP 302 to indicate a resumption of the suspended TWT schedule.

Although the aforementioned examples describe a STA as an apparatus performing the steps in the method 400, an AP may also perform the steps of the method 400. That is, the AP may be the TWT requester and the STA may be the TWT responder. In another aspect, STAs may be engaging in device-to-device communications, and one STA may be the TWT requester and another STA may be the TWT responder.

Figure 5:
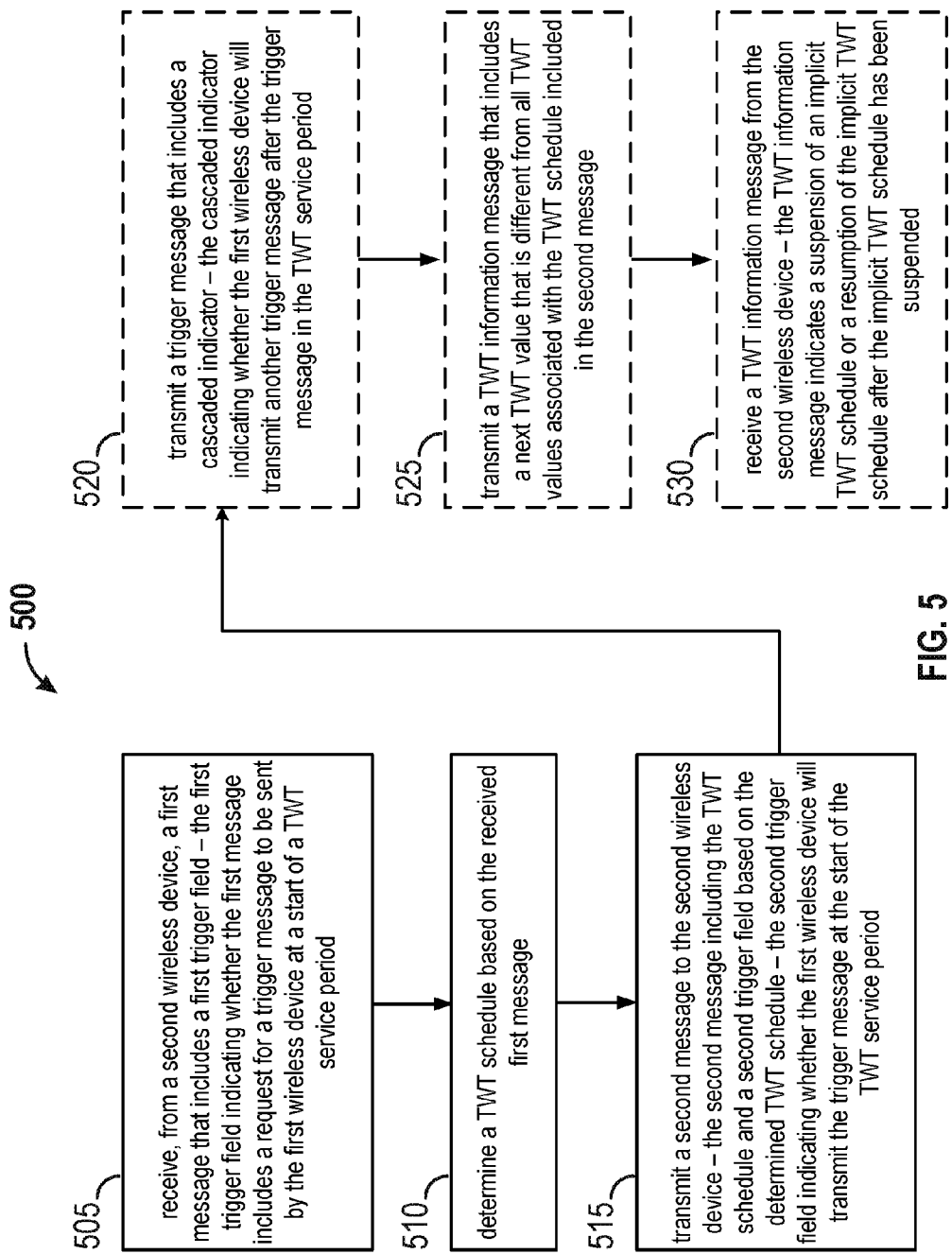
FIG. 5 is a flowchart of an example method of responding to a request for, or transmitting information related to, TWT scheduling.

FIG. 5 is a flowchart of an example method 500 of responding to a request for, or of transmitting information related to, TWT scheduling. The method 500 may be performed using an apparatus (e.g., the STA 306, the AP 302, or the wireless device 1302, infra, for example). Although the method 500 is described below with respect to the elements of wireless device 1302 of FIG. 13, infra, other components may be used to implement one or more of the steps described herein.

At block 505, the apparatus may receive, from a second wireless device, a first message that includes a first trigger field. The first trigger field may indicate whether the first message includes a request for a trigger message to be sent by the apparatus at a start of a TWT service period. For example, referring to FIG. 3, the apparatus may be the AP 302 and the second wireless device may be the STA 306. The AP 302 may receive the first message 312 from the STA 306. The first message 312 may include a first trigger field set to 1, indicating that the first message 312 requests a trigger frame to be sent by the AP 302. The first message 312 may further include at a requested TWT for the STA 306.

At block 510, the apparatus may determine a TWT schedule based on the received first message. The apparatus may determine the TWT schedule by determining if the first trigger field in the first message includes a request for the trigger message and by scheduling one or more TWTs for the second wireless device if the trigger field includes the request for the trigger message. For example, referring to FIG. 3, the AP 302 may determine whether to send a trigger frame to the STA 306 by determining that the first message 312 includes the first trigger field set to 1 and by scheduling a TWT for the STA 306. The scheduled TWT may be for an implicit TWT. In an aspect, the AP 302 may determine the TWT based on the expected traffic on the wireless medium.

At block 515, the apparatus may transmit a second message to the second wireless device. The second message may include the TWT schedule and a second trigger field based on the determined TWT schedule. The second trigger field may indicate whether the apparatus will transmit the trigger message at the start of the TWT service period. In one example, referring to FIG. 3, the AP 302 may transmit the second message 314 to the STA 306. The second message 314 may include the TWT schedule and a second trigger field having a value of 1 based on the determination to send a trigger frame to the STA 306. The second message 314 may also indicate that the trigger frame will be transmitted at the scheduled TWT, which is different from the requested TWT in the first message 312.

At block 520, the apparatus may transmit a trigger message that includes a cascaded indicator. The cascaded indicator may indicate whether the apparatus will transmit another trigger message after the trigger message in the TWT service period. For example, referring to FIG. 3, the AP 302 may transmit the trigger message 316 that includes a cascaded indicator. The cascaded indicator may be set to 1 and indicate that the AP 302 will transmit another trigger message within the same TWT service period as the trigger message 316.

At block 525, the apparatus may transmit a TWT information message that includes a next TWT value that is different from all TWT values associated with the TWT schedule included in the second message. For example, referring to FIG. 3, the AP 302 may transmit a TWT information message that includes a next TWT value that is different from the TWT values associated with the implicit TWT schedule included in the second message 314. Alternatively, if the TWT schedule is an explicit TWT schedule, the AP 302 may transmit a TWT information message that includes a next TWT value that is different from the TWT values associated with the explicit TWT schedule.

At block 530, the apparatus may receive a TWT information message from the second wireless device. The TWT information message may indicate a suspension of an implicit TWT schedule or a resumption of the implicit TWT schedule after the implicit TWT schedule has been suspended. For example, referring to FIG. 3, the AP 302 may receive a TWT information message from the STA 306. The TWT information message may indicate that the STA 306 wants to suspend the implicit TWT schedule. In another example, if the implicit TWT schedule has already been suspended, the AP 302 may receive a TWT information message from the STA 306 indicating a request to resume the implicit TWT schedule.

Although the aforementioned examples describe an AP as an apparatus performing the steps in the method 500, a STA may also perform the steps of the method 500. That is, the AP may be the TWT requester and the STA may be the TWT responder. In another aspect, STAs may be engaging in device-to-device communications, and one STA may be the TWT requester and another STA may be the TWT responder.

Broadcast TWT Scheduling

Figure 6:
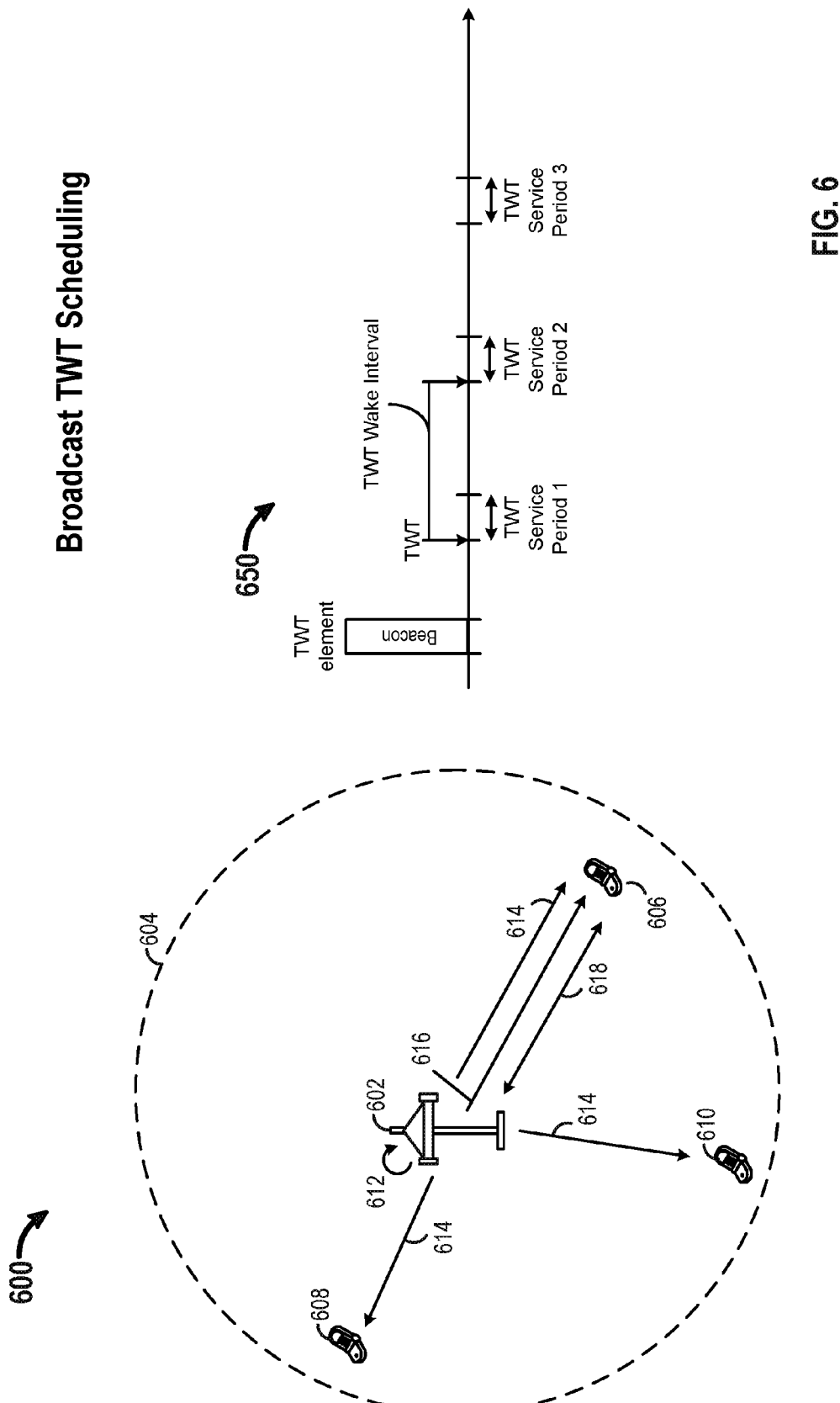
FIG. 6 is an exemplary diagram of a wireless network implementing broadcast TWT scheduling and an exemplary timing flow diagram for TWT operation.

FIG. 6 is an exemplary diagram 600 of a wireless network implementing broadcast TWT scheduling and an exemplary timing flow diagram 650 for TWT operation. The diagram illustrates an AP 602 broadcasting or transmitting within a BSA 604. STAs 606, 608, 610 are within the BSA 604 and are served by the AP 602. The STAs 606, 608, 610 and the AP 602 may perform non-negotiable TWT scheduling. In an aspect, wireless devices may optionally negotiate TBTTs during TWT setup.

In broadcast TWT scheduling, the delivery of TWT schedules may occur without a negotiation between devices. The AP 602 may determine 612 a TWT schedule for communicating with one or more STAs. The AP 602 may determine the TWT schedule by determining that the AP 602 has data to transmit to the STAs (e.g., buffer approaching capacity or buffered units available for delivery), that the STAs 606, 608, 610 have data to transmit to the AP 602, and/or that an access medium is available. Based on such buffer status and network conditions, the AP 602 may schedule one or more wake up times for the STAs 606, 608, 610 after which the AP 602 may transmit trigger frames to enable communication. The AP 602 may indicate an intention to transmit one or more trigger frames in a first message 614 (e.g., a beacon frame transmitted at or after a scheduled TBTT (in an aspect, the TBTT may be negotiated between wireless devices) or a management message intended for one or more STAs) that is received by the STAs 606, 608, 610 at a given instant of time. The TBTT may correspond to the time when a beacon carrying the TWT element containing a broadcast TWT is scheduled to be delivered. The first message 614 may include a TWT element (e.g., the TWT element 200 illustrated in FIG. 2). The first message 614 may include a first element ID identifying the TWT element 200 and one or more TWT parameter sets as described below (see, for example, FIG. 16). In the description below, details are provided to the signaling contained in one of these TWT parameter sets. The first message 614 may include a first TWT request field having a value of 0 to indicate that the TWT element is not a request (a TWT request field with a value of 0 indicates that the TWT element is a response or is not request). The first message 614 may indicate one or more scheduled TWTs (either explicitly or implicitly, as discussed above) that indicate when STAs should wake up. The one or more scheduled TWTs may not be part of a TWT negotiation; that is, the STAs 606, 608, 610, upon receiving the first message 614, may not be able to negotiate for a different scheduled TWT. Further, the STAs 606, 608, 610 may also not be able to negotiate other parameters within the TWT element. The one or more scheduled TWTs may be included in the TWT field(s) or other field(s) within the TWT element. The first message 614 may include a first trigger field with a value of 1 to indicate that one or more trigger frames will be sent during one or more TWT service periods associated with the one or more scheduled TWTs. In other words, the first message 614 may indicate to STAs that during the TWT service period 1, the STAs may have a scheduled TWT and a trigger frame may be sent at the scheduled TWT. The first message 614 may further indicate that other trigger frames may be sent during subsequent TWT service periods (e.g., TWT service period 2). The first message 614 may include a broadcast indicator/subfield), which may be a bit that is included in the control field or some other field within the TWT element. In one aspect, the broadcast indicator may be set to 1 to indicate the first message 614 includes a TWT element with non-negotiable parameters (e.g., the TWT element is a broadcast TWT element). In another aspect, the broadcast indicator may be set to 0 to indicate the first message 614 includes a TWT element with negotiable parameters, in which case the TWT element may be associated with a solicit TWT as discussed above. In another aspect, the broadcast indicator may be based on a value of the TWT setup command subfield of the request type field. For example, when the TWT setup command subfield is set to a certain value which is any value less than 3, and the TWT request field is set to 0, then the first message 614 is a non-negotiable TWT scheduling message.

Figure 16:
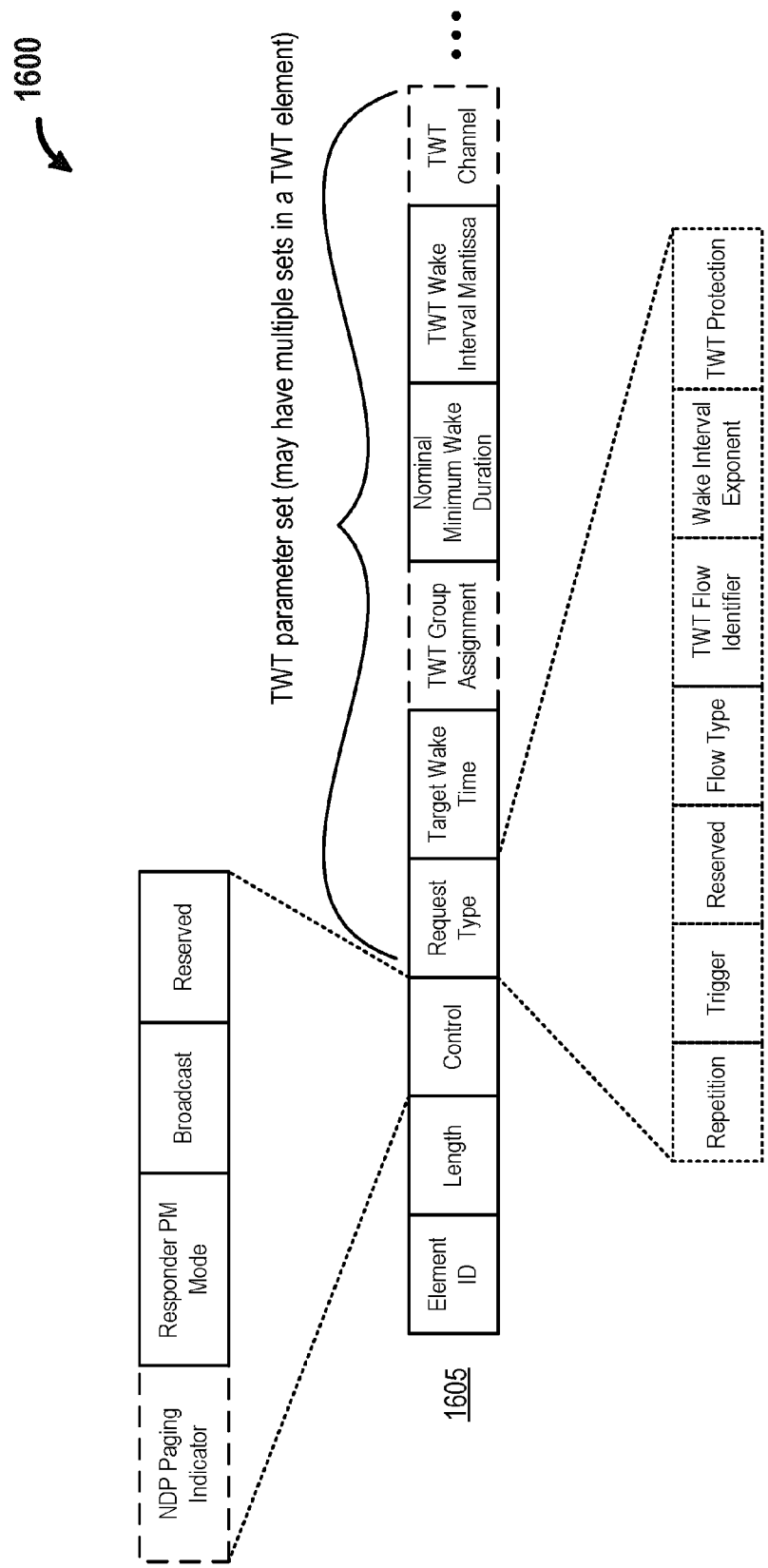
FIG. 16 illustrates an exemplary diagram of a second TWT element format.

When a TWT element is transmitted in the first message 614, the first message 614 may include any one of the fields in the TWT element (e.g., the TWT element 200 in FIG. 2). The TWT element may include multiple groups of fields (or TWT parameter sets), and each group of fields (or TWT parameter) may correspond to a single given scheduled TWT. For example, a TWT element may include multiple scheduled TWTs, and each TWT may be associated with a separate group of TWT fields (e.g., request type, target wake time, TWT group assignment field, etc.) as depicted in FIG. 16. In another aspect, instead of having two or more groups of fields within a single TWT element when multiple TWTs are transmitted within the first message 614, the AP 602 may include multiple TWT elements within the first message 614, and each TWT element may include one TWT and an associated group of TWT fields.

Referring to FIG. 2, the target wake time field may be 8 octets or less. In an aspect, when the AP 602 broadcasts the TWT element in the first message 614, the AP 602 may determine to use less than 8 octets to indicate the scheduled TWT to save space. In an aspect, assuming the AP 602 and the STAs 606, 608, 610 are already time synchronized (e.g., the beacon carrying the TWT element already carries the TSF timer in the timestamp field), the TWT field may indicate the least significant octets of the binary value that the timing synchronization function (TSF) timer will have at the scheduled TWT. For example, the TWT field may use the 3 least significant bytes to indicate the scheduled TWT. In another aspect, the TWT field may include even less bits if the AP 602 wants to provide less resolution for the TWT (e.g., 10 µs rather than 1 µs which would be the resolution of a generic TSF timer for wireless devices). In yet another aspect, the TWT field may be used to indicate an estimated time at which the trigger frame may be sent or an estimated time for the scheduled TWT relative to the end of the first message 614. For example, if the TWT field has a value of 100 ms, that may indicate to the STAs 606, 608, 610 to wake up 100 ms after the last field of the first message 614 is received, or may indicate to the STAs 606, 608, 610 that the trigger frame may be received by the STAs 606, 608, 610 approximately 100 ms after the STAs 606, 608, 610 received the entirety of first message 614. In yet another aspect, the subset of bits in the TWT field may be a shifted subset of the bits corresponding to the TSF timer. For example, assuming the TSF timer has 8 bytes. Instead of including the least significant 3 bytes, the subset may be shifted in which the TWT field includes the second, third, and fourth least significant bytes of the 8 byte representation of the TSF timer. In certain embodiments, the bit shifting may occur at the bit level rather than the byte level.

In another aspect, when the TWT element is included in the first message 614, the TWT wake interval may be valid only for the beacon interval that follows the first message 614 that is sent at the beginning of the beacon interval. In another aspect, the TWT wake interval may be valid for the delivery traffic indication map (DTIM) interval if the first message 614 that includes the TWT element is a DTIM beacon. In another aspect, the TWT wake interval may be valid for the duration of the existence of the basic service set. That is, the TWT wake interval may be valid so long as the STA remains associated with the AP.

In another aspect, the TWT element may include a flow identifier (e.g., one or more of the TWT flow identifier fields in the requests field or another field in the groups of fields of the TWT element) that indicates one or more types of allowed data flows. In one configuration, if the TWT flow identifier may have a value of 0, then the trigger frame associated with the first message 614 may be for wild card (or random) access from unassociated STAs. If an unassociated STA wants to send an association request or a probe request to the AP 602, for example, unassociated STAs may wake up at the scheduled TWT indicated in the first message 614 and randomly select a subchannel/subband to transmit the association request/probe request using on a random back off or another collision avoidance mechanism. If the TWT flow identifier has a value of 1, then the trigger frame associated with the first message 614 may be for wild card access from associated STAs. For example, if the STA 606 receives the first message 614 in a broadcast, the STA 606 may determine to wake up at the one or more scheduled TWTs indicated in the first message 614. The STA 606 may receive one or more trigger messages at the one or more scheduled TWTs and transmit uplink data to the AP 602 after receiving the one or more trigger messages. If the TWT flow identifier has a value of 2, associated STAs in power save mode may transmit upon receiving the trigger frame at the scheduled TWT. If the TWT flow identifier has a value of 3, associated STAs may transmit voice traffic upon receiving the trigger frame at the scheduled TWT. If the TWT flow identifier has a value of 4, associated STAs may transmit video traffic upon receiving the trigger frame at the scheduled TWT.

In another configuration, the types of allowed data indicated by the TWT flow identifier may include: multi-user OFDMA random access for unassociated STAs, multi-user OFDMA random access for associated STAs, multi-user downlink OFDMA scheduled access for TIM STAs, multi-user uplink OFDMA scheduled access for TIM STAs, multi-user uplink MIMO scheduled access for TIM STAs, and/or multi-user downlink MIMO scheduled access for TIM STAs.

In the first category, multi-user OFDMA random access for unassociated STAs, only unassociated STAs may transmit data to the AP 602 following the reception of the trigger frame sent at the one or more scheduled TWTs during the TWT service periods by the AP 602. The frames that can be sent by the unassociated STAs may include a probe request, an association request, a reassociation request, an authentication request, etc. The frames may be sent in any OFDMA resource following a random access procedure for selecting the OFDMA resource for transmission. Regarding the random access procedure, one or more unassociated STAs may randomly select an OFDMA channel for transmitting the frames. The unassociated STAs may coordinate with each other such that if two or more unassociated STAs randomly select the same OFDMA channel, the unassociated STAs will randomly select another OFDMA channel until each unassociated STA has selected a different OFDMA channel.

In the second category, multi-user OFDMA random access for associated STAs, only associated STAs (STAs 606, 608, 610) may transmit following the reception of a trigger frame sent by the AP 602 during a TWT service period associated with the one or more scheduled TWTs. The frames that can be sent by the associated STAs may be any frame. The frames may be PS-Poll or APSD trigger frames, or any other frame that can be used to indicate to the AP 602 that the buffer status and/or transmission preferences of the associated STAs. Transmission preferences may include a preferred MCS, bandwidth, subchannel, etc.

In the third category, multi-user downlink OFDMA scheduled access for TIM STAs, only STAs for which an association identifier (AID) corresponds to a value of 1 in a traffic information map (TIM) element bitmap included in a beacon message (e.g., the first message 614) carrying the TWT element may receive data from the AP 602 after receiving the trigger frame that is sent at the scheduled TWT or during the TWT service period. In certain embodiments, instead of transmitting a trigger frame, the AP 602 may transmit downlink data to the STAs in multi-user OFDMA. The AP 602 may also indicate in the trigger frame uplink OFDMA resources associated with each STA to be used within the same scheduled TWT or TWT service period.

In the fourth category, multi-user uplink OFDMA scheduled access for TIM STAs, only STAs for which an AID corresponds to a value of 1 in the TIM element bitmap included in a beacon message (e.g., the first message 614) carrying the TWT element may transmit data after receiving the trigger frame that is sent at the scheduled TWT during the TWT service period. The AP 602 may indicate that the TWT service period is allocated for uplink transmission only. The AP 602 may decide to transmit downlink data to the STAs after terminating the first trigger-enabled exchange.

In the fifth and sixth categories, multi-user uplink MIMO scheduled access for TIM STAs and multi-user downlink MIMO scheduled access for TIM STAs, APs and STAs whose AID bit is 1 in the TIM element may exchange downlink and uplink data using multi-user MIMO. As previously indicated other fields, not just the TWT flow identifier field, may indicate the allowed data categories. For example, the TWT wake interval exponent subfield may be overloaded to signal the allowed data types instead of the TWT flow identifier field.

In another aspect, a flow identifier may be used to indicate a traffic class or traffic identifier (TID) that identifies a type of traffic allowed to be exchanged during the TWT service period. For example, as discussed previously, the flow identifier may be used to indicate the types of flows that may be allowed in response to a trigger frame. The traffic type may include voice and video traffic.

When the STA 606 receives the first message 614, the STA 606 may determine whether to be awake during the one or more TWT service periods associated with the one or more scheduled TWTs included in the first message 614. The STA 606 may determine whether to be awake during the one or more TWT service periods by determining whether the STA 606 has data to transmit to the AP 602 and by determining whether the STA 606 expects to receive data from the AP 602.

During a TWT service period associated with the scheduled TWT included in the first message 614 in which a trigger frame is expected, the STAs 606, 608, 610 may not contend for access to the medium for data transmission. Instead, the STAs 606, 608, 610 may wait to receive a trigger frame 616 sent by the AP 602 that enables the STAs 606, 608, 610 to transmit data frames. The data frames may be sent in either single user or multi-user mode.

Assuming the STA 606 determines to participate in TWT scheduling, upon receiving the trigger frame 616, the STA 606 may transmit data 618 to or receive data 618 from the AP 602. The data 618 may be transmitted during the TWT service periods. STAs (e.g., the STA 606) that fail to transmit after the trigger frame 616 may transmit after the TWT service period ends. The transmission may be a retransmission of a failed transmission or it may be a resource allocation request.

Figure 7:
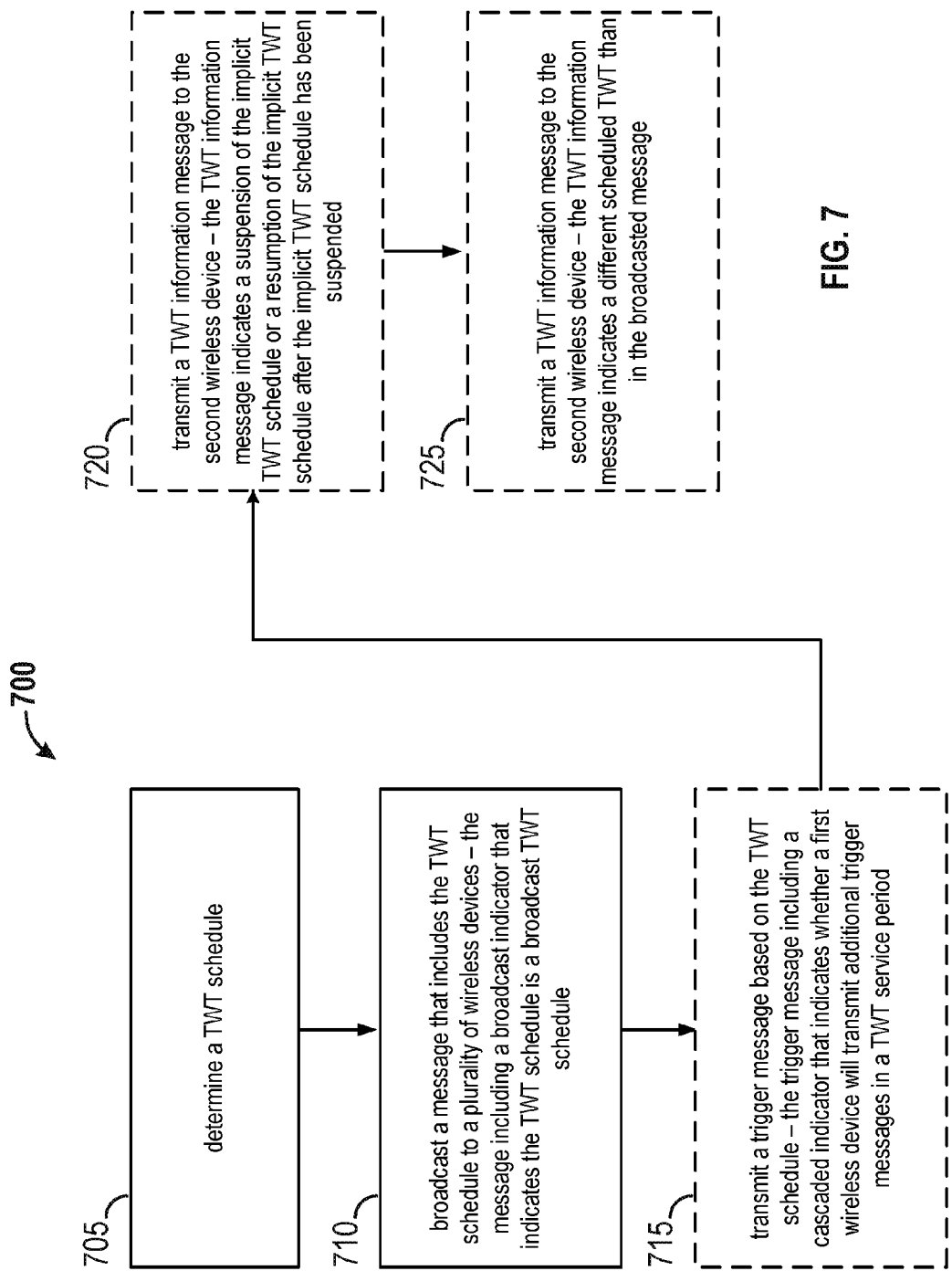
FIG. 7 is a flowchart of an example method of broadcast TWT scheduling.

FIG. 7 is a flowchart of an example method 700 of broadcast TWT scheduling. The method 700 may be performed using an apparatus (e.g., the AP 602, the STA 606, or the wireless device 1302, infra, for example). Although the method 700 is described below with respect to the elements of wireless device 1302 of FIG. 13, infra, other components may be used to implement one or more of the steps described herein.

At block 705, the apparatus may determine a TWT schedule for other wireless devices. The apparatus may determine the TWT schedule by determining one or more fields within the TWT element. In an aspect, the apparatus may determine network conditions (e.g., a number of wireless devices expected to communicate with the apparatus and/or an amount of traffic on the wireless medium). For example, referring to FIG. 6, the AP 602 may determine a broadcast TWT schedule for one or more STAs. The broadcast schedule may include non-negotiable TWT parameters for communicating with the AP 602. The AP 602 may determine the broadcast TWT schedule by determining whether to utilize an implicit TWT schedule or an explicit TWT schedule. Further, the one or more TWTs associated with the broadcast TWT schedule. The AP 602 may determine any of the other fields or parameters associated with the TWT element (e.g., the TWT element 200).

At block 710, the apparatus may broadcast a message that includes the TWT schedule to a plurality of wireless devices. The message may include a broadcast indicator that indicates the TWT schedule is a broadcast TWT schedule. In an aspect, the message may include a trigger field that indicates whether the apparatus will transmit a trigger message at a start of or during a TWT service period. The message may further include a TWT flow identifier that indicates a type of data flow allowed during the TWT service period. For example, referring to FIG. 6, apparatus may be the AP 602. The AP 602 may broadcast the first message 614 that includes a TWT schedule. The broadcast bit in the first message 614 may be set to 1, indicating that the TWT schedule is a broadcast TWT. The first message 614 may also include a trigger field set to 1, indicating that the AP 602 will transmit a trigger frame during the TWT service period. The first message 614 may include an implicit field set to 0, indicating that the TWT schedule is an explicit TWT schedule. The first message 614 may further include 4 scheduled TWTs associated with 4 TWT parameter sets. In an aspect, the first message 614 may include a repetition indicator that indicates that the TWT schedule is valid for 5 TWT service periods. In another aspect, the first message 614 may include a TWT protection indicator set to 1, indicating that messages exchanged between the STA 606 and the AP 602 are to be preceded by a RTS message from the transmitter and a CTS message from the receiver.

At block 715, the apparatus may transmit a trigger message based on the TWT schedule. The trigger message may include a cascaded indicator that indicates whether the apparatus will transmit additional trigger messages in a TWT service period. For example, referring to FIG. 6, the AP 602 may transmit the trigger frame 616. In an aspect, for MU operation, the AP 602 may transmit multiple trigger frames within a TWT service period to enable multiple STAs to transmit to the AP 602. As such, the AP 602 may transmit the trigger frame 616 addressed to STAs 606, 608 with a cascaded indicator set to 1 to indicate that the AP 302 will transmit another trigger frame within the same TWT service period. The STAs 606, 608 may transmit uplink data to the AP 602 based on the trigger frame 616. Subsequently, the AP 602 may transmit another trigger frame addressed to the STAs 608, 610 to indicate resources for another uplink transmission.

At 720, the apparatus may transmit a TWT information message to the second wireless device. The TWT information message may indicate a suspension of the implicit TWT schedule or a resumption of the implicit TWT schedule after the implicit TWT schedule has been suspended. For example, referring to FIG. 6, the AP 602 may transmit a TWT information message to the STAs 606, 608, 610 indicating a suspension of the broadcast TWT schedule indicated in the first message 614 if the broadcast TWT schedule is an implicit TWT schedule. In an aspect, the implicit TWT schedule may be suspended based on network conditions, lack of data for transmission, or to conserve power. In another aspect, to resume a previously suspended implicit TWT schedule, the AP 602 may transmit a TWT information message to the STAs 606, 608, 610 indicating a resumption of a suspended TWT schedule.

At block 725, the apparatus may transmit a TWT information message to the second wireless device. The TWT information message may indicate a different scheduled TWT than in the broadcasted message. For example, referring to FIG. 6, the AP 602 may transmit a TWT information message to the STAs 606, 608, 610 that indicates a different scheduled TWT than what has been implied in the implicit TWT schedule. In another example, if the TWT schedule is an explicit TWT schedule, then the TWT information message may include a different scheduled TWT than the TWTs indicated in the explicit TWT schedule in the first message 614.

Although the aforementioned example provides that an AP broadcasts a TWT schedule, the STA may broadcast a TWT schedule to an AP or to another STA.

Figure 8:
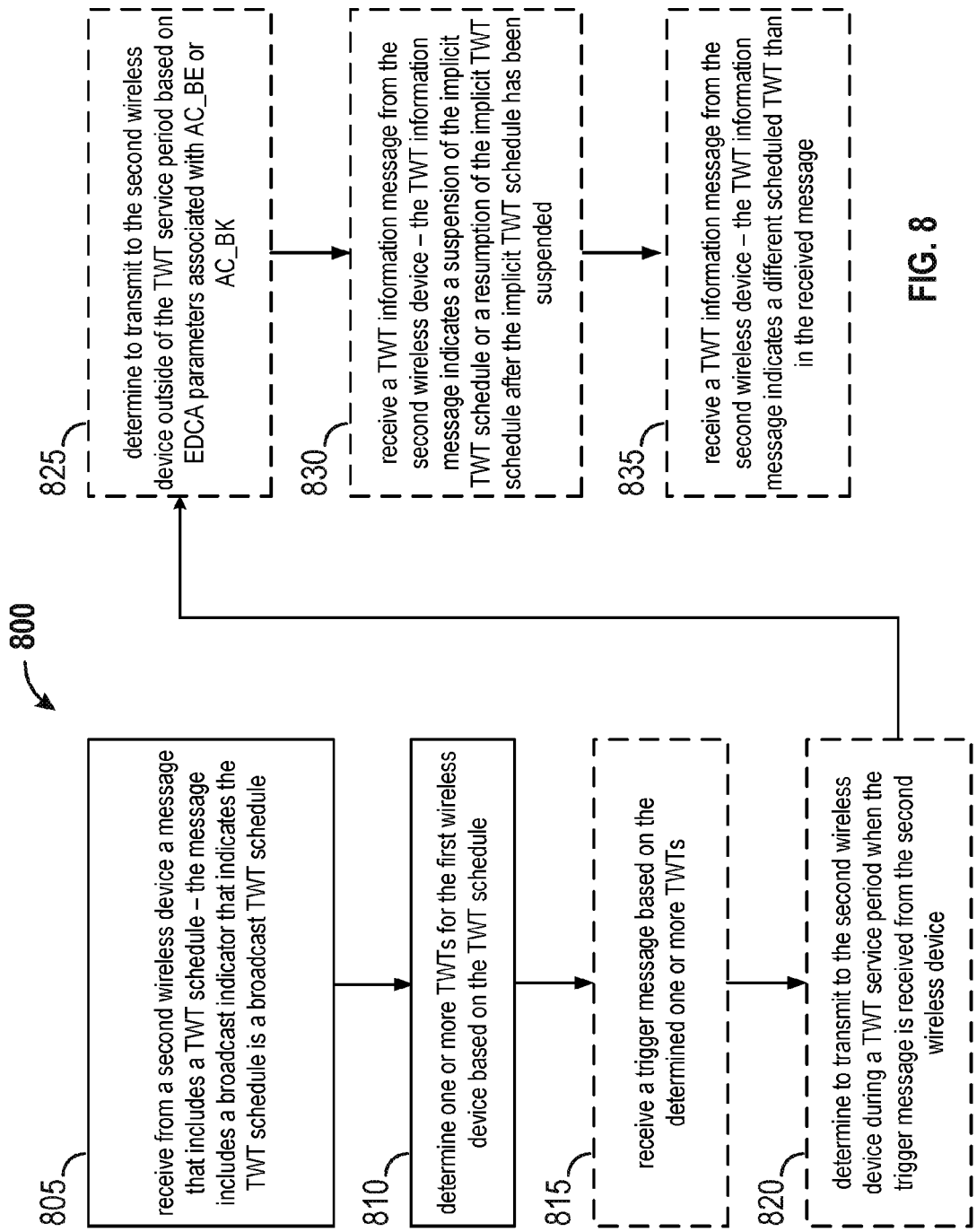
FIG. 8 is a flowchart of an example method of communicating based on broadcast TWT scheduling.

FIG. 8 is a flowchart of an example method 800 of communicating based on broadcast TWT scheduling. The method 500 may be performed using an apparatus (e.g., the STA 606, or the wireless device 1302, infra, for example). Although the method 800 is described below with respect to the elements of wireless device 1302 of FIG. 13, infra, other components may be used to implement one or more of the steps described herein.

At block 805, the apparatus may receive from a second wireless device a message that includes a TWT schedule. The message may include a broadcast indicator that indicates the TWT schedule is a broadcast TWT schedule. For example, referring to FIG. 6, the apparatus may be the STA 606. The STA 606 may receive from the AP 602 the first message 614 that include a TWT schedule. The first message 614 may include a broadcast indicator set to 1, indicating that the TWT schedule is a broadcast schedule. The first message 614 may include a trigger field set to 1, indicating that the AP 602 will transmit the trigger frame 616 at the start of or during the TWT service period. The first message 614 may further include a TWT flow identifier set to 1, indicating that there are no constraints on the types of frames or messages during the broadcast TWT service period.

At block 810, the apparatus may determine one or more TWTs for the apparatus based on the TWT schedule. The apparatus may determine one or more TWTs by determining if the TWT schedule is an implicit or explicit TWT schedule. If the TWT schedule is an implicit TWT schedule, then the apparatus may determine one or more TWTs based on the first TWT indicated in the TWT schedule. Subsequent TWT may be determined based on the TWT wake interval mantissa and on the wake interval exponent, which may be indicated in the message or preconfigured at the apparatus. If the TWT schedule is an explicit TWT schedule, then the apparatus may extract the one or more TWTs from the received message. For example, referring to FIG. 6, the STA 606 may determine whether the TWT schedule indicated in the first message 614 in an implicit or explicit TWT schedule, and either calculate or extract the TWT values based on the determination.

At block 815, the apparatus may receive a trigger message based on the determined one or more TWTs. For example, referring to FIG. 6, the STA 606 may receive the trigger frame 616 based on the determined one or more TWTs.

At block 820, the apparatus may determine to transmit to the second wireless device during a TWT service period when the trigger message is received from the second wireless device. For example, referring to FIG. 6, the STA 606 may determine to transmit to the AP 602 by determining that data is available for transmission to the AP 602, by determining that the data may be transmitted during the TWT service period, and by determining that the trigger frame 616 has been received from the AP 602.

At block 825, the apparatus may determine to transmit to the second wireless device outside of the TWT service period based on EDCA parameters associated with AC_BE or AC_BK. For example, referring to FIG. 6, the STA 606 may determine that data is available for transmission to the AP 602, and either no trigger frame has been received from the AP 602 or the data cannot wait for the next available TWT service period. As such, the STA 606 may determine to transmit to the AP 602 by contending for medium access based on a lower priority EDCA access category, AC_BE.

At block 830, the apparatus may receive a TWT information message from the second wireless device. The TWT information message may indicate a suspension of the implicit TWT schedule or a resumption of the implicit TWT schedule after the implicit TWT schedule has been suspended. For example, referring to FIG. 6, the STA 606 may receive a TWT information message from the AP 602, indicating a suspension of the implicit TWT schedule or a resumption of the suspended, implicit TWT schedule.

At block 835, the apparatus may receive a TWT information message from the second wireless device. The TWT information message may indicate a different scheduled TWT than in the received message. For example, referring to FIG. 6, the STA 606 may receive a TWT information message from the AP 602, and the TWT information message may indicating a different scheduled TWT than the TWT indicated in the first message 614.

TWT Power Save Mode

In future IEEE 802.11 standards, an AP may send trigger frames to solicit uplink data frames from and/or transmit downlink data frames to one or more STAs in multi-user mode. In general, trigger frames may be generated by the AP any time. A STA that intends to transmit uplink data may have to stay awake to receive the trigger frame intended for the STA. However, staying awake during periods when no trigger frame will be sent may lead to unnecessary power consumption as the AP can scheduled multiple trigger frames for multiple STAs. One way to resolve this issue is to allow the STA and the AP to negotiate target trigger transmit times, as discussed previously, so that the STA knows when the trigger frame(s) will arrive. These transmit times may be negotiated (solicit TWT or unsolicit TWT) to be periodic or aperiodic or may not be non-negotiated (broadcast TWT).

In certain instances, the scheduled TWTs may dynamically change between a periodic pattern to an aperiodic pattern based on a pattern indication by either the AP or the STA. The pattern indication may be indicated by an implicit field that is contained in the message carrying the trigger field. The implicit field may be set to 1 to indicate that the pattern is periodic and may be set to 0 to indicate that the pattern is aperiodic.

When the pattern is aperiodic, the next TWT may be explicitly signaled by a TWT responder (e.g., an AP). In an aspect, the TWT responder may transmit a TACK/STACK/BAT or TWT information frames to signal the next TWT. These frames may contain the value of the next TWT and the TWT flow identifier that identifies the TWT flow to which the next TWT corresponds to in the case of a solicit TWT agreement. The TWT requester may request a change of pattern for the next TWT by sending a TACK/STACK/BAT frame that carries a next TWT field. The TWT requester may confirm the new schedule in a successive frame that contains a Next TWT field (TACK/STACK/BAT etc).

When the pattern is periodic the TWT responder does not provide the next TWT during a current TWT service period. Instead the TWT requester implicitly calculates the next TWT every TWT service period based on the value of the TWT at the current TWT service period plus the value of the negotiated TWT wake interval as specified in the negotiation period of the TWT. During a periodic TWT (i.e., implicit TWT) either of the devices may request a rescheduling of the parameters for a given TWT flow. This may be performed by sending a request or response with updated parameters anytime during a TWT service period. The request or response in this case may have a dialog token that is equal to the dialog token value exchanged during the TWT setup. Similarly, the request or response may contain the TWT Flow Identifier for which the rescheduling is requested. The request may be confirmed, an alternative may be provided, or the request may be refused. In certain embodiments a response to re-negotiate the parameters may be non-negotiable and to take effect starting from the next TWT.

In certain cases, even though the AP and the STA may have an agreement (e.g., a schedule) for exchanging uplink/downlink frames following the trigger frame in a periodic pattern (e.g., during the TWT service periods), there may be periods of time where one of the STAs does not expect traffic for a long period of time. As such, a need exists to enable to STA to indicate a suspension of the agreed upon schedule for a given amount of time. This way, the STA does not need to wake up during certain TWT service periods at which the STA has no uplink data to transmit to the AP. Also in certain cases, the AP does not plan to use the full TWT service period for sending trigger frames, and, as such, the AP may want to indicate an early termination of a given TWT service period.

Figure 9:
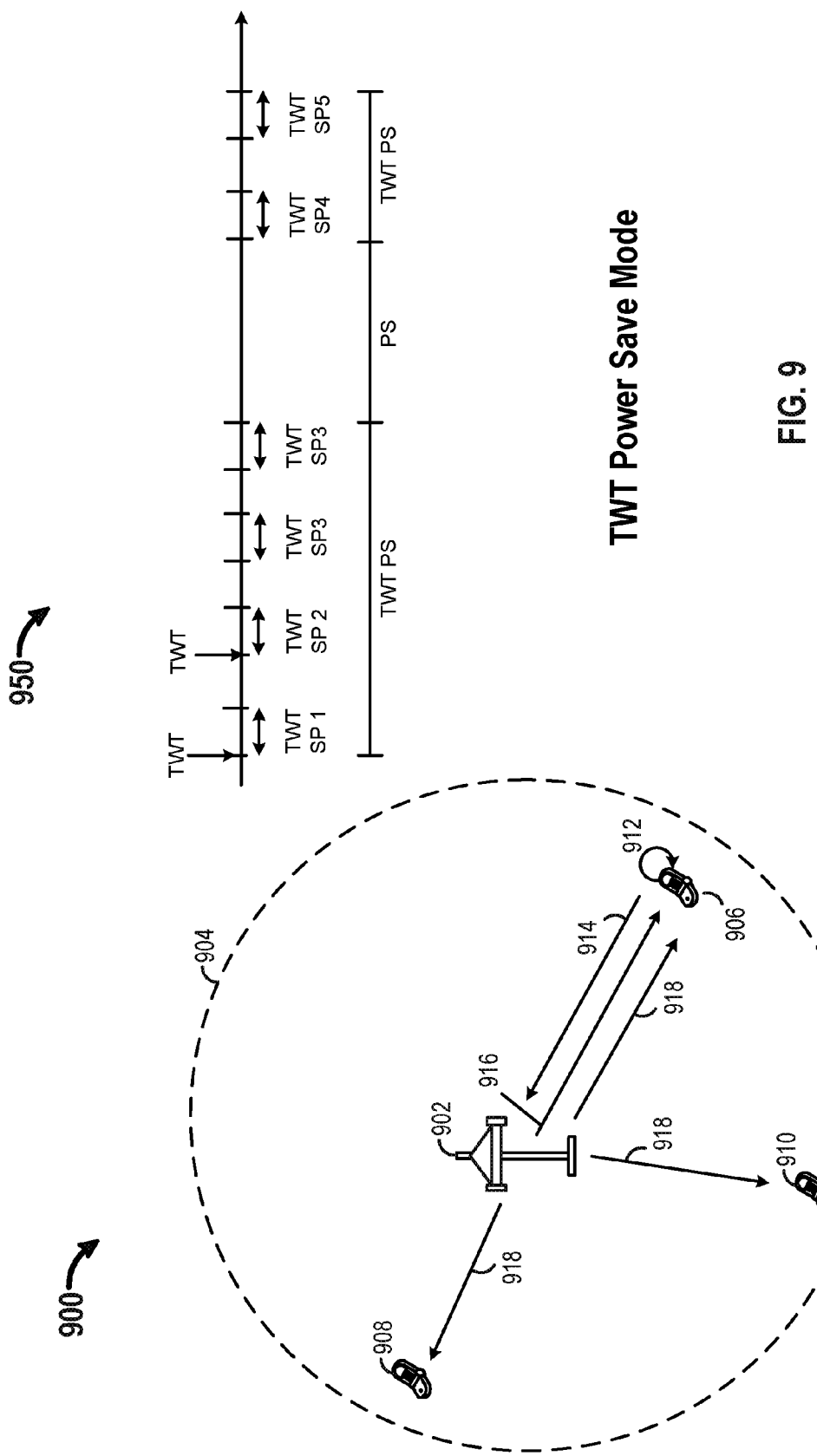
FIG. 9 is an exemplary diagram of a wireless network supporting power save modes for TWT scheduling and an exemplary timing flow diagram for TWT operation.

FIG. 9 is an exemplary diagram 900 of a wireless network supporting power save modes for TWT scheduling and an exemplary timing flow diagram 950 for TWT operation. The diagram illustrates an AP 902 broadcasting or transmitting within a BSA 904. STAs 906, 908, 910 are within the BSA 904 and are served by the AP 902.

In one configuration, the STA 906 (or any other STA) may be in one of two different power states: an awake state and a doze (or sleep) state. In the awake state, the STA is fully powered. In the doze state, the STA 906 may not able to transmit or receive data and may consume very little power. The STA 906 may transition between the awake state and the doze state based on power management modes—active mode (AM) and power save (PS) mode. In the active mode, the STA 906 may be in a continually awake state. In the PS mode, the STA 906 is in a doze state and may enter the awake state to receive selected beacons, to receive group addressed transmissions following certain received beacon frames, to receive transmissions during the service period of a scheduled groupcast with retries service period (GCR-SP), to transmit, or to wait for responses to transmitted PS-poll frames or to receive contention free (CF) transmission of data.

To change power management modes, the STA 906 may inform the AP 902 through a successful frame exchange that is initiated by the STA 906. The frame may be a management, extension, or data frame and may include an acknowledgment (ACK) or a BlockACK frame from the AP 902. The frame may include a power management subfield(s) in the frame control field, and the power management subfield may indicate the power management mode that the STA 906 may adopt upon successful completion of the entire frame exchange (e.g., frame and acknowledgment). The STA 906 may not change power management mode using a frame exchange that does not receive an ACK or a BlockACK frame from the AP 902, or using a BlockACKReq frame. When the AP 902 receives the frame from the STA 906 indicating a mode change, the AP 902 may store the new power management mode and transmit the ACK frame to the STA 906.

If the STA 906 has negotiated TWTs with the AP 902, the STA 906 may be in active mode at each scheduled TWT and for a certain period after that (e.g., during the TWT service periods associated with the scheduled TWTs), even though the STA 906 has no uplink data to transmit. This may be a burden for the STA 906 that has no more data to transmit to the AP 902. In an aspect, the STA 906 may use a TWT power save mode to conserve power.

In the TWT power save mode, the STA 906 may be in a doze state and may enter an awake state at the start of the scheduled TWT and may remain in the awake state for the duration of one or more TWT service periods associated with the scheduled TWT. In another aspect, the STA 906 may remain awake for a minimum time duration that is less than the TWT service period. During times outside of the TWT service periods, however, the STA 906 may enter a doze state. In the TWT power save mode, if there are additional TWT service periods associated with the scheduled TWT and the STA 906 has no more data left to transmit (and/or does not expect to receive any data from the AP 902), the STA 906 may want to enter the sleep state for the remaining TWT service periods (e.g., switch to power save mode). For this case, a power save move switch signaling is needed as described below. In one configuration, when the STA 906 is in the TWT power save mode, the STA 906 may additionally continue to satisfy the requirements of the existing PS mode (e.g., enter the awake state to receive selected beacons, to receive group addressed transmissions following certain received beacon frames, to receive transmission during the service period of a scheduled groupcast with retries service period (GCR-SP), to transmit, or to wait for responses to transmitted PS-poll frames or to receive contention free (CF) transmission of data.) In another configuration, the STA 906 may not satisfy the requirements of the PS mode and simply remain in a sleep state.

Referring to FIG. 9, when the STA 906 determines 912 to switch to a TWT power save mode, the STA 906 may transmit a message 914 (e.g., a frame) to the AP 902 indicating that the STA 906 intends to switch from an active mode to a TWT power save mode or from a PS mode to a TWT power save mode. The message 914 may include an indicator or field (e.g., an end of service period (EOSP) field) that indicates the power management mode that the STA 906 will adopt upon successful completion of the message/frame exchange. For example, if the field is set to 1 (e.g., EOSP is 1), then the message 914 may indicate that the STA 906 is switching from a TWT power save mode to PS mode. If the field is set to 0, then the message 914 indicates that the STA 906 is not switching from the TWT power save mode to the PS mode. In certain embodiments, any field in a frame exchanged with the AP 902 can signal this new state. In other embodiments, certain frame types may be used to signal the transition to or from the TWT power save mode. In an aspect, the STA 906 may only switch between the active mode and the TWT power save mode, or only between the PS mode and the TWT power save mode. In this aspect, the transition between states may be signaled by a 1-bit power management subfield in the message 914. When the power management subfield has 1 bit, the STA 906 may be able to switch between two modes—active mode and TWT power save mode or TWT power save mode and PS mode. In another aspect, the power management subfield may have 2 bits, which would enable the STA 906 to switch between all three modes. For example "00" could represent the PS mode, "01" could represent the TWT PS mode, and "10" could represent the active mode.

Upon receiving the message 914, the AP 902 may store the power management mode to which the STA 906 intends switch. For example, if the message 914 indicates that the STA 906 intends to switch to the TWT power save mode, then the AP 902 may store information indicating that the STA 906 is in a TWT power save mode. In this mode, the AP 902 may know not to transmit any data to the STA 906 outside of the TWT service periods in which the STA 906 is awake. Subsequently, the AP 902 may transmit an acknowledgment message 916 to the STA 906 indicating that the AP 902 received the message 914.

In an aspect, the AP 902 may transmit a second message 918 to the STA 906. The second message 918 may instruct the STA 906 to switch from a TWT power save mode to a PS mode using an EOSP field. For example, the AP 902 may set the EOSP field to 1 to instruct the STA 906 to switch from the TWT power save mode to the PS mode. The AP 902 may also transmit the second message 918 to other STAs 908, 910.

Once the STA 906 goes into PS mode, however, the AP 902 may not be able to indicate to the STA 906 to switch back to the TWT power save mode by sending a frame that is intended to indicate to the STA 906 to switch modes because the STA 906 may be in a sleep state for an extended period of time. However, the STA 906 may request to switch back to the TWT power save mode by sending a request to switch (e.g., a request similar to the message 914). For example, the STA 906 may transmit another message to the AP 902. The other message may include an EOSP field set to 0 to indicate that the STA 906 requests to switch back to the TWT power save mode. Otherwise, the STA 906 may set the EOSP to 1 to indicate that the STA 906 does not want to switch back to the TWT power save mode. In certain embodiments, the power management subfield may be used for similar signaling. In certain embodiments, the power management switch may be performed by sending a TWT request or an unsolicited TWT response. In certain embodiments, the AP 902 may selectively indicate to certain STAs to switch from PS mode to TWT power save mode by activating a bit in a traffic indication map element that may be included in a message frame (e.g., the second message 918). For example, the second message 918 may be a beacon message, and the second message 918 may include a TIM element that includes a bitmap. The STAs 906, 908, 910 may receive the second message 918 and determine whether to switch to a TWT power save mode based on the each AID position in the bitmap. For example, if a position in the bitmap corresponding to the AID of the STA 906 has a value of 0, then the STA 906 may switch to the TWT power save mode. In certain embodiments, the validity of the new mode is limited to the beacon interval that follows the beacon frame (e.g., the second message 918).

Figure 10:
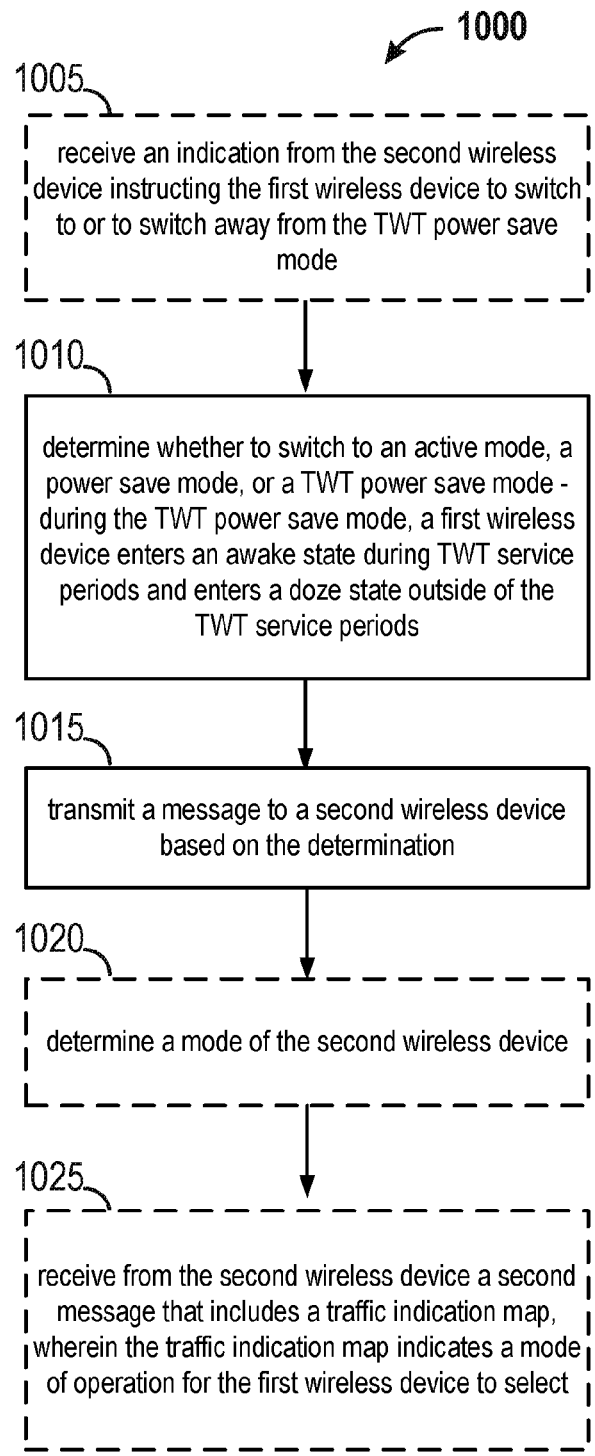
FIG. 10 is a flowchart of an example method of switching to or from a TWT power save mode.

FIG. 10 is a flowchart of an example method 1000 of switching to or from a TWT power save mode. The method 1000 may be performed using an apparatus (e.g., the STA 906, the AP, 902, or the wireless device 1302, infra, for example). Although the method 1000 is described below with respect to the elements of wireless device 1302 of FIG. 13, infra, other components may be used to implement one or more of the steps described herein.

At block 1005, the apparatus may receive an indication from the second wireless device instructing the apparatus to switch to or to switch away from the TWT power save mode. For example, referring to FIG. 9, the apparatus may be the STA 906, and the STA 906 may receive a message from the AP 902 instructing the STA 906 to switch to the TWT power save mode. In an aspect, the message may include an EOSP set to 1, indicating that the TWT service period is ending and no more data will be transmitted.

At block 1010, the apparatus may determine whether to switch to an active mode, a power save mode, or a TWT power save mode. In the TWT power save mode, the apparatus may enter an awake state during TWT service periods and enter a doze state outside of the TWT service periods. In one configuration, the apparatus may determine whether to switch by determining if there is additional data for transmission or reception by the apparatus. In another configuration, the apparatus may determine whether to switch modes by receiving a QoS message from the second wireless device and by determining whether the QoS message includes an EOSP indicator set to 0 or 1. In another configuration, the apparatus may determine whether to switch modes by receiving a trigger message from the second wireless device and by determining whether the trigger message includes a cascaded indicator set to 0 or 1 and by determining whether the trigger message is intended for the apparatus. For example, referring to FIG. 9, the STA 906 may determine to switch to the TWT power save mode based on the determination that a QoS message is received from the AP 902 indicating an EOSP set to 1.

At block 1015, the apparatus may transmit a message to a second wireless device based on the determination. For example, referring to FIG. 9, the STA 906 may transmit the message 914 to the AP 902 based on the determination to switch to the TWT power save mode. The message 914 may include a power management field set to 1, indicating that the STA 906 wants to switch to the TWT power save mode.

At block 1020, the apparatus may determine a mode of the second wireless device. In one configuration, the apparatus may determine the mode by receiving a second message from the second wireless device that includes a responder mode indicator. The apparatus may determine whether the responder mode indicator indicates whether the second wireless device is in the doze state outside of the TWT service periods. If so, then the second wireless device may be in the TWT power save mode; otherwise, the second wireless device may be in the active mode. In another configuration, the apparatus may determine the mode by receiving a trigger message from the second wireless device and by determining whether the trigger message includes resource allocations to any wireless devices. For example, referring to FIG. 9, the STA 906 may receive a message from the AP 902 that includes a responder PM mode indicator (e.g., in a control field). The responder PM mode indicator may be set to 1, indicating that the AP 902 is in the TWT power save mode.

At block 1025, the apparatus may receive from the second wireless device a second message that includes a traffic indication map. The traffic indication map may indicate a mode of operation for the first wireless device to select. For example, the STA 906 may receive from the AP 902 message that includes a TIM. The TIM may include a bit associated with the AID of the STA 906. If the bit is set to 1, then the STA 906 may expect to receive data and may enter into a TWT power save mode or an active mode, but if the bit is set to 0, then the STA 906 may not expect to receive data and may enter into a power save mode.

Figure 11:
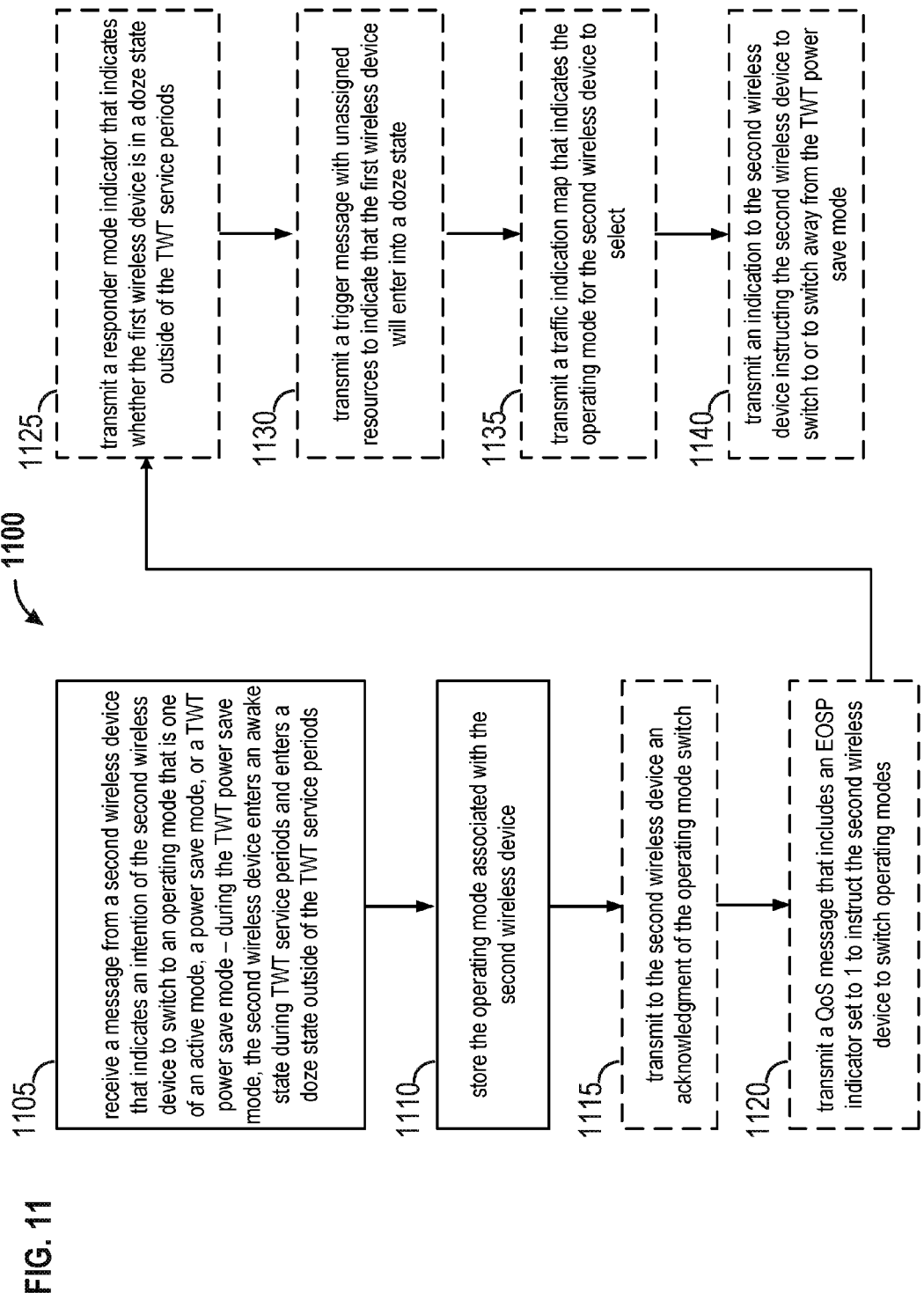
FIG. 11 is a flowchart of an example method of signaling for switching to a TWT power save mode.

FIG. 11 is a flowchart of an example method 1100 of signaling for switching to a TWT power save mode. The method 1100 may be performed using an apparatus (e.g., the AP 902, STA 906, or the wireless device 1302, infra, for example). Although the method 1100 is described below with respect to the elements of wireless device 1302 of FIG. 13, infra, other components may be used to implement one or more of the steps described herein.

At block 1105, the apparatus may receive a message from a second wireless device that indicates an intention of the second wireless device to switch to an operating mode that is one of an active mode, a power save mode, or a TWT power save mode. During the TWT power save mode, the second wireless device may enter an awake state during TWT service periods and enter a doze state outside of the TWT service periods. For example, referring to FIG. 9, the apparatus may be the AP 902. The AP 902 may receive the message 914 from the STA 906 indicating an intention of the STA 906 to switch to a TWT power save mode during which the STA 906 may enter an awake state during TWT service periods and may enter a doze state outside of the TWT service periods.

At block 1110, the apparatus may store the operating mode associated with the second wireless device. For example, referring to FIG. 9, the AP 902 may store information indicating that the STA 906 is in the TWT power save mode.

At block 1115, the apparatus may transmit to the second wireless device an acknowledgment of the operating mode switch. For example, referring to FIG. 9, the AP 902 may transmit the acknowledgment message 916 indicating that the AP 902 acknowledges the switch to the TWT power save mode by the STA 906.

At 1120, the apparatus may transmit a QoS message that includes an EOSP indicator set to 1 to instruct the second wireless device to switch operating modes. For example, referring to FIG. 9, the AP 902 may transmit a QoS frame to the STA 906 with an EOSP indicator set to 1, which instructs the STA 906 to switch operating modes.

At 1125, the apparatus may transmit a responder mode indicator that indicates whether the first wireless device is in a doze state outside of the TWT service periods. For example, referring to FIG. 9, the AP 902 may transmit a message that includes the responder PM mode indicator in a control field, and the responder PM mode indicator may be set to 1, indicating that the AP 902 is in TWT power save mode.

At 1130, the apparatus may transmit a trigger message with unassigned resources to indicate that the apparatus will enter into a doze state. For example, referring to FIG. 9, the AP 902 may transmit a trigger frame with unassigned resources to the STAs, which indicates that the AP 902 will enter into a doze state.

At 1135, the apparatus may transmit a traffic indication map that indicates the operating mode for the second wireless device to select. For example, referring to FIG. 9, the AP 902 may transmit the TIM with a bit set to 1 corresponding to the AID of the STA 906, which indicates that the STA 906 should be in the active mode.

At 1140, the apparatus may transmit an indication to the second wireless device instructing the second wireless device to switch to or to switch away from the TWT power save mode. For example, referring to FIG. 9, the AP 902 may transmit the second message 918 instructing the STA 906 to switch to a TWT power save mode from the active mode.

Additionally, during a TWT service period the AP may transmit one or more trigger frames and/or may not want to always use the full duration of the TWT service period. For example the AP may want to send a trigger frame to poll one or more STAs for feedback (e.g., PS-polls or resource requests), a trigger frame for UL data delivery from the one or more STAs, a trigger frame to exchange DL data with one or more STAs, etc. To allow the STAs determine the number of frames to expect or an early termination of the TWT service period the AP may indicate the number of trigger frames the AP intends to transmit in the TWT element itself. In another embodiment, the AP may indicate that the AP has more trigger frames to transmit in any frame the AP transmits during the TWT service period. For example, the AP may indicate that the AP intends to transmit at least another trigger frame following the current frame by setting a bit in the frame that is currently transmitting to 1. In one embodiment, the frame may be a trigger frame and the bit may be the More Data field in the Frame Control field, a newly defined field, or the AP may rely on the EOSP field signaling. In another embodiment, the frame can be any other frame sent by the AP. For example, the bit may be the power management field in the frame control field of a frame transmitted by the AP during the TWT service period. In another embodiment, any other field or value can be used for this purpose. For example an EOSP field can be set to 1 to indicate that the AP does not intend to transmit another (trigger) frame during this TWT service period. In another example, the More Data field, or the other fields described above, may be set to 0 to indicate that the AP intends to transmit another (trigger) frame during this TWT service period. Hence, STAs receiving this indication (that there are no more trigger frames during this TWT service period) may go to sleep earlier than the end of the scheduled TWT service period. The STAs that are addressed by the trigger frame may not go to sleep as they are scheduled to transmit UL frames as a response to the trigger frame. The rest of the STAs that went to sleep for the rest of the scheduled TWT service period may wake up in other TWTs (next TWTs) as negotiated or indicated by the AP in previous exchanges or schedules.

Figure 12:
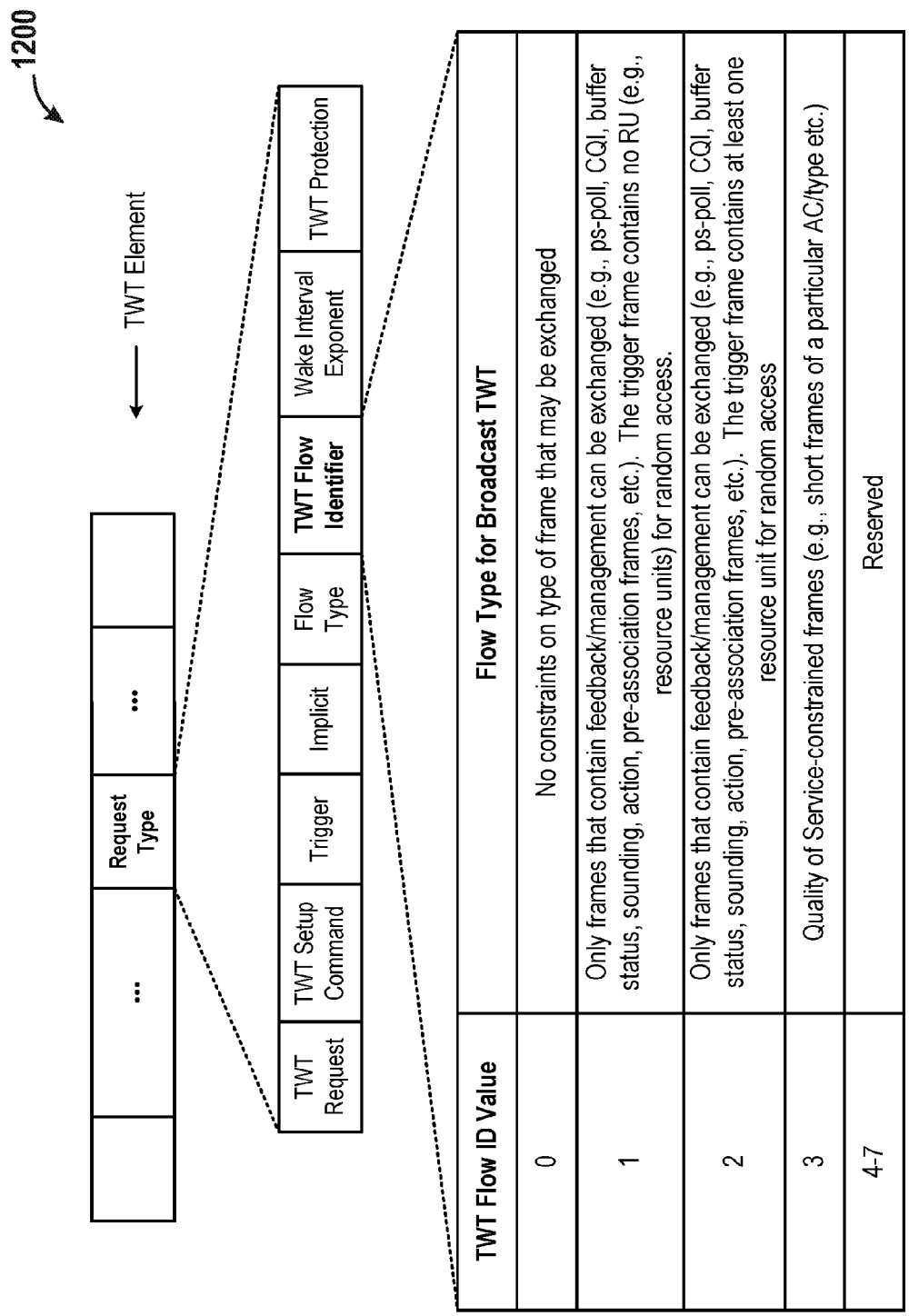
FIG. 12 is an exemplary diagram of a request type field within a TWT element for broadcast TWT.

FIG. 12 is an exemplary diagram of a request type field 1200 within a TWT element for broadcast TWT. Referring to FIG. 12, the request type field may contain a TWT flow identifier subfield, which may have various values as indicated in FIG. 12. The TWT flow identifier subfield may contain a 3-bit value that identifies specific information associated with a TWT request uniquely from other requests made between a same TWT requesting STA and a TWT responding STA pair. In broadcast TWT mode, there may not be a concept of a STA pair. As such, the TWT flow identifier subfield may be used to specify different flows (or the traffic class) that may be allowed for the broadcast TWT in a TWT service period.

Referring to FIG. 12, in one aspect, when the TWT flow ID is set to 0, then there may not be any constraints on the type of frame that can be exchanged during the scheduled TWT service period(s) specified by the TWT parameter set of the broadcast TWT containing the TWT Flow ID. In another aspect, when the TWT flow ID is set to 1, then only frames that contain feedback and/or management information may be exchanged (e.g., PS-Poll, CQI, buffer status, sounding information, action, etc.). In this aspect, the trigger frame may contain no RUs (e.g., resource units) for random access. In another aspect, when the TWT flow ID is set to 2, then only frames that contain feedback and/or management information may be exchanged (e.g., PS-Poll, CQI, buffer status, sounding information, action, pre-association frames, etc.). In this aspect, the trigger frame may contain at least one RU (or resource unit) for random access. In an aspect, QoS frames may also be exchanged when the TWT flow ID is set to 1 or 2. In yet another aspect, when the TWT flow ID is set to 3, quality of service constrained frames (e.g., short frames with payloads less than 256 or 128 bytes of a particular AC/type, etc.) may be exchanged.

In another aspect, the TWT flow identifier subfield may indicate that no transmissions are expected from any device (e.g., APs or STAs that may or may not be associated with the device transmitting the frame containing the TWT element). For example, when the TWT flow ID is set to 4 (or some other value), then no transmission are expected (i.e., a black out service period). In addition to helping STAs conserve power, this feature may also be used to cause STAs to enter or remain in a sleep mode in order to reserve a time duration for another device to communicate. This is beneficial also when the device transmitting this TWT element is aware of other devices (not associated to it) that intend to transmit to one or more other devices during a scheduled period of time (knowledge provided in some embodiments by the other devices via similar TWT elements or other means of schedule information exchange mechanisms).

Although the TWT flow ID values are provided in the TWT flow identifier subfield, similar values for purposes of identifying a flow type for a broadcast TWT may be provided in other fields within a TWT element or other parts of frames transmitted by the device providing the scheduling for one or more other devices.

Figure 13:
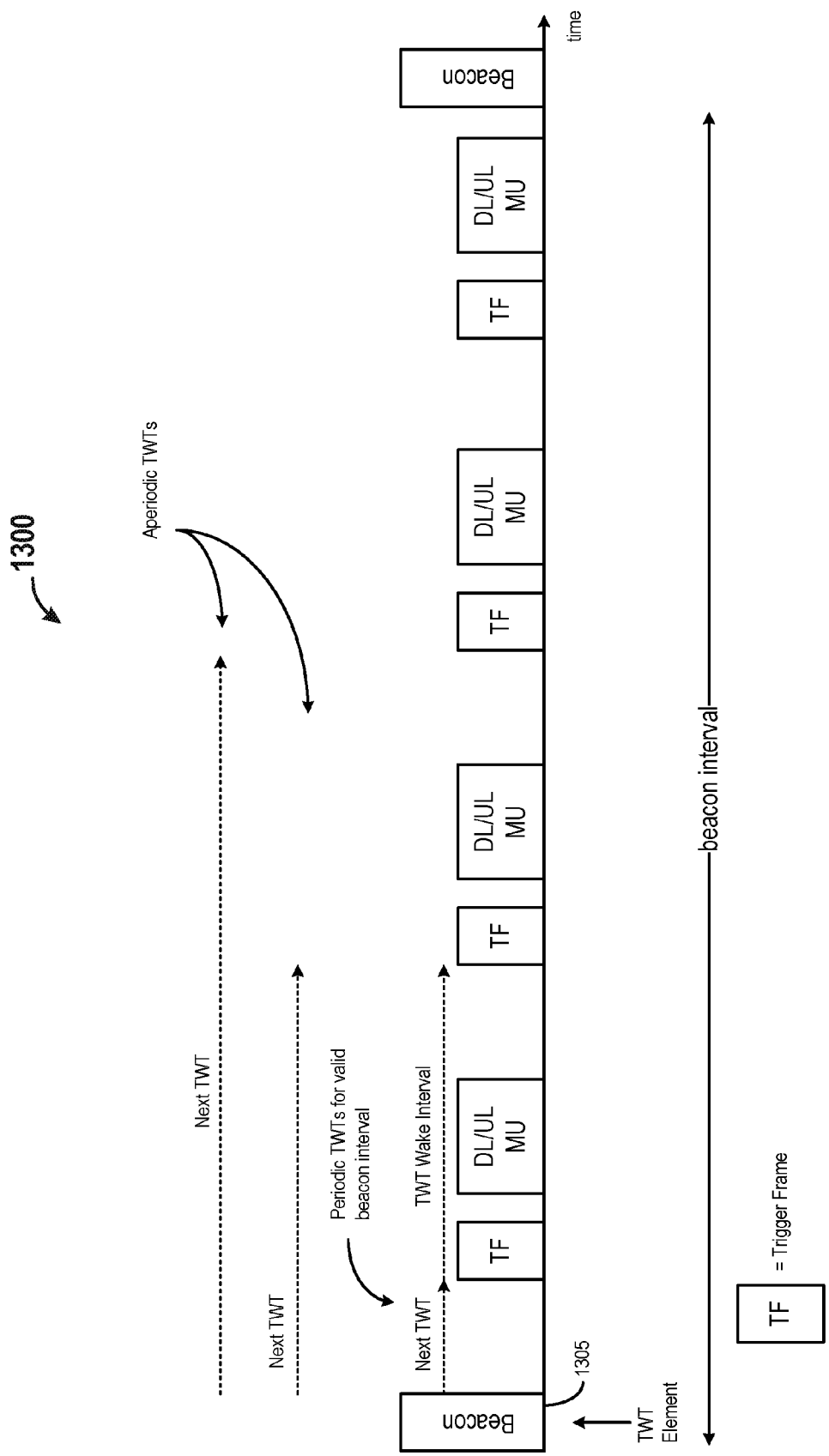
FIG. 13 illustrates a method of broadcasting TWTs for multiple TWTs.

FIG. 13 illustrates a method 1300 of broadcasting TWTs for multiple TWTs. Referring to FIG. 13, an AP may indicate a broadcast target trigger (wake) time(s) in an information element (e.g., a TWT element) included in a beacon 1305 or in any other management frame. In one aspect, the TWT pattern provided by the element may be periodic. As an example, in this aspect, a TWT element may contain a TWT field and a TWT wake interval which enables the periodic pattern. In another aspect, the pattern may be aperiodic. In this aspect, a TWT element may signal multiple aperiodic TWTs per beacon interval. This may allow for greater flexibility of target wake times within a beacon interval, DTIM interval, or through the lifetime of the operation.

To enable multiple aperiodic TWTs per beacon interval, etc, more than one TWT parameter set may be included in a beacon frame or another frame. In one aspect, more than one TWT information element may be included in a beacon. In another aspect, a TWT element may be modified such that the TWT element may carry multiple TWT parameter sets. For example, the TWT element may carry multiple occurrences of the fields following the control field of the element. The TWT parameter set may consist of one or more of the following fields: Request Type, TWT, TWT Grouping, Nominal Minimum Wake Duration, TWT Wake Interval Mantissa, TWT Channel, NDP Paging, etc. The length of the TWT elements may provide signaling to determine its content. As an example, if each TWT parameter set (which length is based on the signaling contained therein) is 7 bytes, then the length field of the TWT element may be equal to 15 bytes (7*2 plus one byte of Control field) if the TWT element contains 2 TWT parameter sets, and so on.

Figure 14:
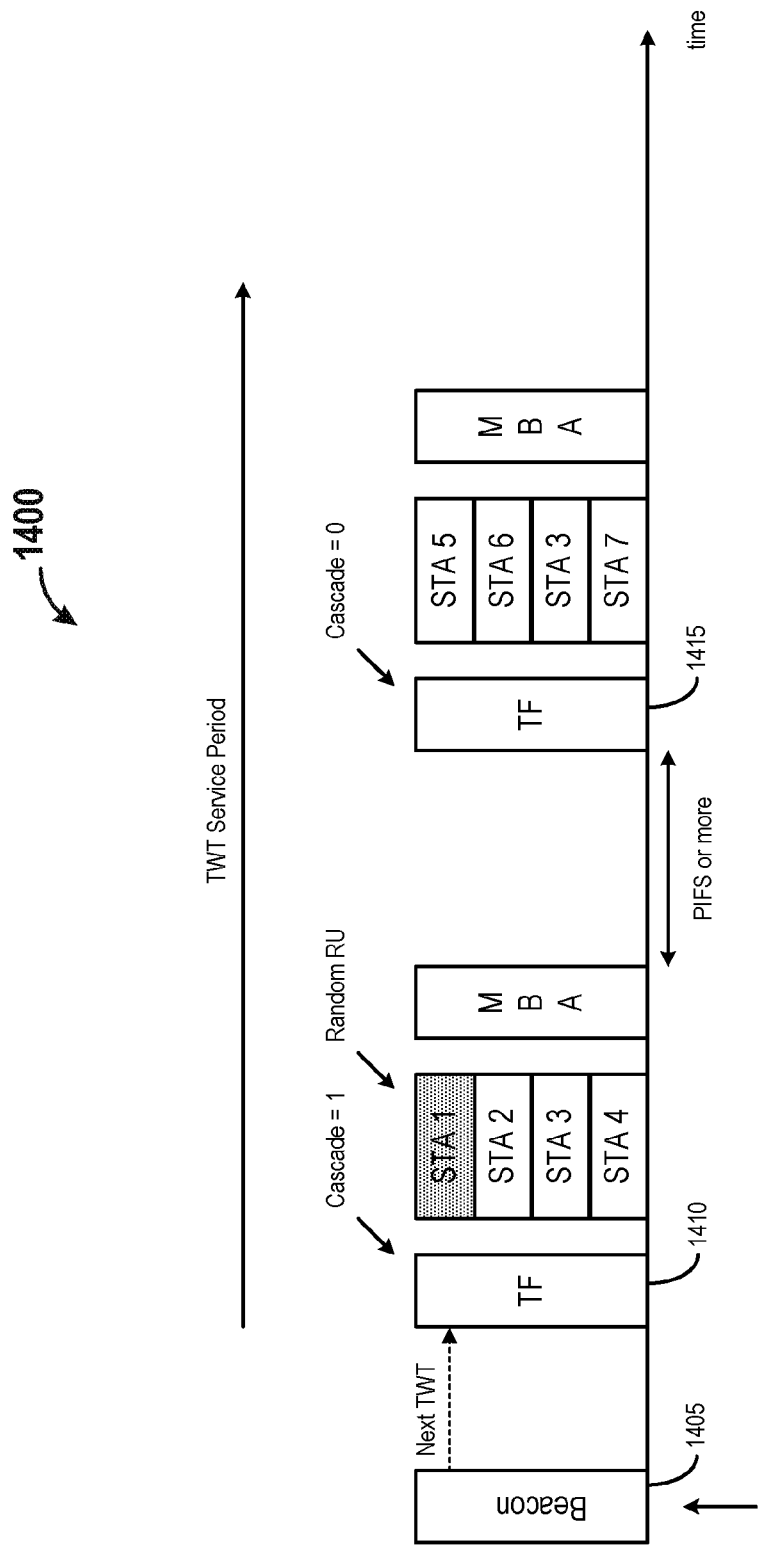
FIG. 14 illustrates a method of employing a cascaded field in a trigger frame within a TWT service period.

FIG. 14 illustrates a method 1400 of employing a cascaded field (earlier mentioned as more data, power management, etc.) in a trigger frame within a TWT service period. Referring to FIG. 14, an AP may notify the STAs expected to wake up at the TWT service period via an TWT information element included within a beacon 1405 or frame in general. In an aspect, the AP may overestimate a number of STAs to be allocated in a TWT service period. This is because in broadcast TWT, only a portion of STAs may likely be served (or expected to be awake, or able to successfully receive the frame carrying the TWT) during the TWT service period (this is also possible for solicited TWTs (or negotiated TWTs mentioned earlier)). As such, an AP may send a trigger frame 1410 at the start of a TWT service period. The trigger frame 1410 may contain a list of association identifiers (AIDs) (or other AP assigned identifiers) for STAs to enable uplink transmission. That is, each AID may identify a STA. The trigger frame 1410 may contain a cascaded subfield that indicates whether an additional trigger frame follows the trigger frame 1410 in the TWT service period. For example, if the cascaded subfield is set to 1, then another trigger frame (e.g., a second trigger frame 1415) follows the trigger frame 1410. However, if the cascaded subfield is set to 0, then no trigger frame will follow the trigger frame 1410 within the same TWT service period.

A non-AP STA that receives the trigger frame 1410 has several options. The STA may transmit an uplink frame as a response to the trigger frame 1410 that is intended for the STA (e.g., STAs 1, 2, 3, 4). If the cascaded field is set to 1 and the trigger frame 1410 is not intended for the STA, then the STA (e.g., STAs 5, 6, 7) may remain awake to receive the second trigger frame 1415, for example (though STAs may go to sleep for the duration of the UL PPDUs transmitted as a response to the current trigger frame). In another aspect, the STA may enter a sleep mode (or doze state) if the trigger frame 1410 was not intended for the STA and the cascaded field of the trigger frame 1410 was set to 0. After receiving the uplink transmissions from the various STAs, the AP may transmit an acknowledgment (e.g., a multi-block acknowledgment (MBA)). In another aspect, a STA may start contending independently to access the medium after the frame exchange enabled by a trigger frame with a cascaded field equal to 0. In certain embodiments, the STA should not start contending to access the medium after receiving a trigger frame that contains a cascaded field equal to 1.

Figure 15:
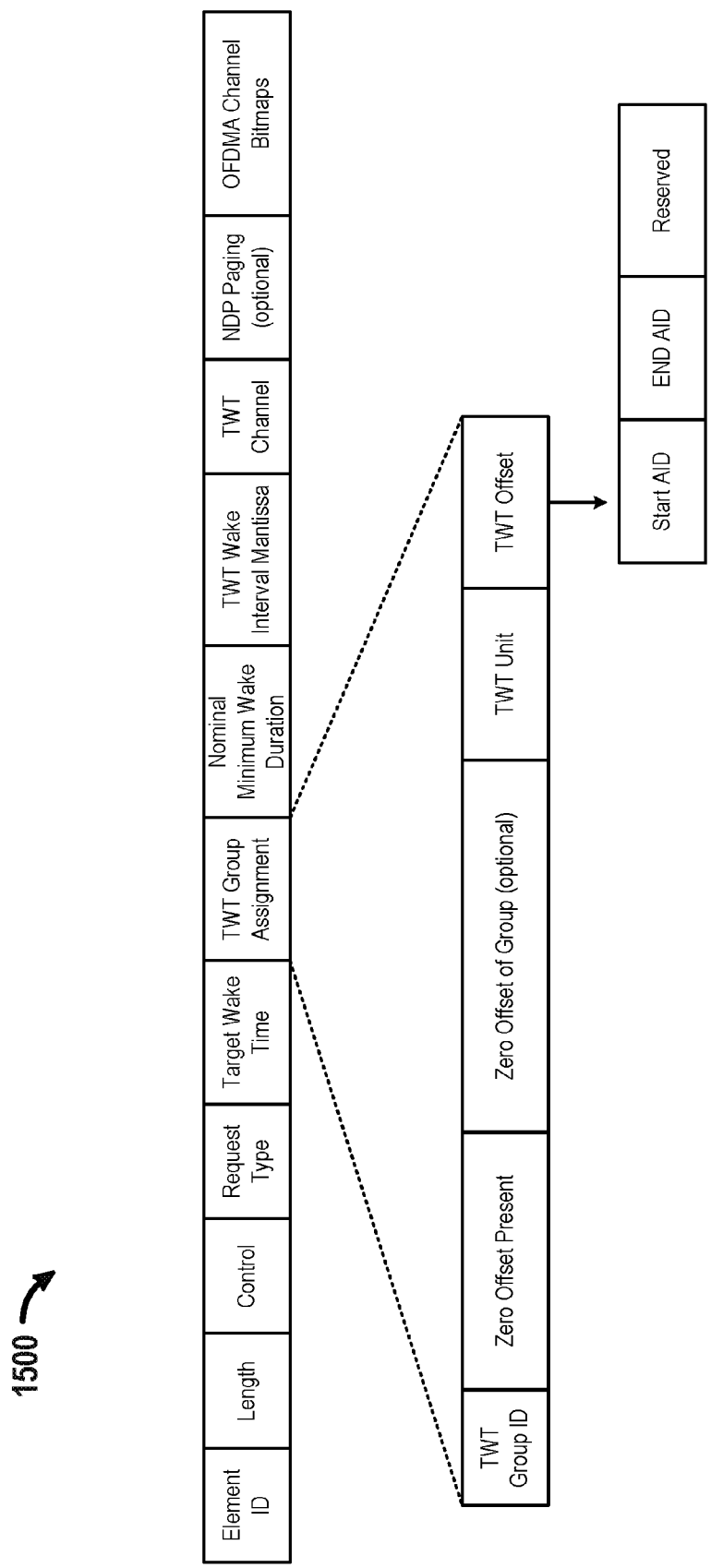
FIG. 15 is an exemplary diagram of a TWT group assignment field within a TWT element for a broadcast TWT for multiple STAs.

FIG. 15 is an exemplary diagram of a TWT group assignment field 1500 within a TWT element for a broadcast TWT for multiple STAs. Referring to FIG. 15, the TWT group ID subfield may have 7 bits (e.g., corresponding to B0 to B6), the zero offset present subfield may have 1 bit (e.g., corresponding to B7), the zero offset of group subfield may have 48 or 0 bits (e.g., corresponding to B8 to B55), the TWT unit subfield may have 4 bits (e.g., corresponding to B56 to B59), and the TWT offset subfield may have 12 bits (e.g., corresponding to B60 to B71). Within the TWT offset subfield, there may be a start AID subfield, an end AID subfield, and a reserved subfield. The start AID subfield may have 5 bits, the end AID subfield may have 5 bits, and the reserve subfield may have 2 bits. Although FIG. 15 depicts start AID and end AID subfields, other IDs assigned by an AP aside from AIDs may also be used.

The TWT group assignment field may be negotiated and used by an AP to allocate TWTs for STAs within a group. For each STA in the group identified by the TWT group ID, the TWT group assignment subfield may provide information for staggered (offset) TWTs within the group itself. In an aspect, the TWT group assignment subfield may be used when the AP wants to stagger UL single user transmissions from multiple STAs of a group. In another aspect, the TWT group assignment subfield may be used to specify the group of STAs to wake up at a TWT. For example, the TWT group assignment field may identify the range of STAs that are scheduled to wake up at the specified TWT.

In an aspect, when the trigger field within the request type field is set to 1, the TWT group ID may specify the 7 most significant bits of the AID (or another AP assigned ID) of each of the STAs that belong to the group that is to wake up at a certain TWT. The TWT unit may be reserved, for example, to indicate an offset of uplink transmissions from the first TWT is not needed since uplink transmissions may be trigger after an XIFS, in which the XIFS may be a short interframe space (SIFS) or a point coordination function (PCF) interframe space (PIFS)). The TWT offset field may contain the 5 least significant bits of the start AID and the 5 least significant bits of the end AID of the group.

In another aspect, when the zero offset present is set to 1, the zero offset of group field may specify the TWT if the TWT wake time field is not present. In another aspect, for the basic broadcast TWT case, the TIM element may also provide a list of STAs to be polled by triggers. In an aspect, a broadcast TWT that supports multiple STAs may improve signaling for purposes of identifying a group of STAs for multi-user operation in a TWT element.

FIG. 16 illustrates an exemplary diagram of a second TWT element format 1600. Referring to FIG. 16, a TWT element 1605 may include an element ID field (e.g., 1 octet in length), a length field (e.g., 1 octet in length), a control field (e.g., 1 octet in length), a request type field (e.g., 2 octets in length), a target wake time field (e.g., 2, 4, 6, or 8 octets in length), a TWT group assignment field (optional), a nominal minimum wake duration field (e.g., 1 octet in length), a TWT wake interval mantissa field (e.g., 2 octet in length), a TWT channel (optional), and/or an NDP paging field (optional as well). The one or more of the request type field, target wake time field, TWT group assignment field, nominal minimum wake duration field, TWT wake interval mantissa field, and/or TWT channel field may make up a TWT set or equivalently TWT parameter set. The TWT element 1605 may have one or more TWT parameter sets, which may be used to indicate different TWT service period(s).

The control field may have multiple subfields, such as a NDP paging indicator subfield (e.g., 1 bit), a broadcast subfield (e.g., 1 bit), a responder PM (passive mode) mode subfield (e.g., 1 bit), and/or a reserved subfield (e.g., 5 bits). The broadcast bit may be used to indicate whether the TWT element 1605 is a broadcast TWT, in which target wake times may not be negotiated between an AP and a STA, or whether the TWT element 1605 is a solicited TWT, in which target wake times may be negotiated between an AP and a STA or between a STA and another STA. For example, when the broadcast bit is set to 1, then the TWT element 1605 may be a broadcast TWT, and when the broadcast bit is set to 0, then the TWT element 1605 may be a solicited TWT. The broadcast bit may also be referred to as a non-negotiable indication. In one configuration, the responder PM mode subfield may indicate that a TWT responder may be in a doze state outside of the TWT SPs (e.g., for a broadcast TWT, the TWT responder may be the AP). In one option, the AP may set the responder PM mode subfield to 1 to indicate that the AP may be in a doze state outside of the TWT SPs. Alternatively, the AP may set the responder PM mode subfield to 0 if the AP is not allowed to enter into a power save mode. In another configuration, the AP may indicate that the AP is in power save mode by transmitting one or more trigger frames, which may include resource allocations (e.g., resource units) not allocated to any STAs during a TWT service period during which the AP intends to enter power save mode.

The length field may indicate the length of the TWT element 1605 and may be used to determine the number of TWT parameter sets within the TWT element 1605. For example, if the length field indicates that the TWT element 1605 is 8 bytes, then the TWT element 1605 may have one TWT parameter set (e.g., 7 bytes of fields for the one set and one byte of Control field). If the length field indicates 15 bytes, then the TWT element 1605 may have two TWT parameter sets. As such, the length field may indicate the number of TWT sets.

The request type field may have one or more of the following subfields, such as a repetition subfield, a trigger subfield, a reserved subfield, a flow type subfield, a TWT flow identifier subfield, a wake interval exponent subfield, and/or a TWT protection subfield. In an aspect, the request type field may be 1 byte in length and include a repetition subfield (e.g., 2 bits), a trigger subfield (e.g., 1 bit), a TWT flow identifier subfield (e.g., 3 bits), and a wake interval exponent (e.g., 2 bits). In another aspect, the request type field may not include the wake interval exponent subfield, whose value may be preconfigured within a device (e.g., a device may have a preconfigured value of 10 with respect to the wake interval exponent field). If the TWT is periodic (e.g., the TWT set may contain a non-zero value of the TWT wake interval mantissa field), then the repetition subfield may indicate the number of valid TWT service periods associated with the TWT minus 1 specified by the TWT parameter set. The "minus 1" accounts for the TWT indicated in the target wake time field. For example, if the TWT is valid for 6 TWT service periods, then the repetition field may be set to 5. In an aspect, if the TWT wake interval mantissa subfield is set to 0, then the TWT is not periodic. By contrast, if the TWT interval mantissa subfield has a non-zero value, then the TWT may be periodic and may repeat for as many times as specified by the value indicated in the repetition subfield. The TWT Wake Interval may be determined based on a product of the TWT wake interval mantissa and 2 elevated to the power of the value indicated in the wake interval exponent (period=TWT Wake Interval Mantissa$\times 2^{Wake\ Interval\ Exponent}$). In another aspect, a repetition subfield set to 0 may indicate an aperiodic TWT.

The trigger subfield indicates whether a trigger (e.g., a trigger frame) will be sent at the start of a target wake time(s) specified by the TWT set. In such embodiment this field may be set to 1. Otherwise it may be set to 0 to indicate that there will be no trigger frame sent at the start of the target wake time(s). The TWT flow identifier subfield indicates the type of data flow expected during the TWT service period(s) specified by the TWT set. The TWT flow identifier subfield may be associated with values indicated in FIG. 12. The target wake time subfield may include the 2 least significant bytes of the value that the TSF timer (as contained in the timestamp field of a beacon frame transmitted in that instant of time) will have at the first (if periodic) or only TWT (if aperiodic). In another aspect, the target wake time subfield may include a shifted subset of the 2 least significant bytes of the TSF timer. For example, assuming the TSF timer has 8 bytes, instead of including the least significant 2 bytes, the subset may be shifted in which the TWT field includes the second and third least significant bytes of the 8 byte representation of the TSF timer, in which case the time resolution may not be of say 1 microsecond, but rather 256 microseconds. By doing so the 2 byte TWT field may indicate larger time values (while losing some resolution). In certain embodiments, the bit shifting may occur at the bit level rather than the byte level.

The TWT protection subfield may indicate that the TWT service period(s) specified by a corresponding TWT parameter set may be protected or not (or asked to be protected or not in a TWT request). In one aspect, when the TWT protection subfield is set to 0, then the TWT service period(s) may not be protected. In another aspect, when the TWT protection subfield is set to 1, the subfield may indicate that STAs associated with the AP sending the TWT element 1605 and that have read the frame carrying the TWT element 1605 should not contend to access the medium for the specified duration of the TWT service period(s) indicated in the corresponding TWT set. In another embodiment, only STAs that have traffic that is allowed by the AP to be delivered during the TWT service period(s) may contend to access the medium. For example, when the AP sends a TWT element that indicates that there is no trigger frame at the start of the TWT, and the TWT is an announced TWT (e.g., STAs should send a frame to the AP), then only the STAs that may have certain type of traffic (e.g., PS-Polls or U-APSD trigger frames) may access the medium to transmit their frames. In another aspect, when the TWT protection subfield is set to 1, the subfield may indicate that STAs that are not associated with the AP and that have read the frame carrying the TWT element 1605 should not contend to access the medium for the specified durations of the TWT service period(s). The AP that set the TWT protection subfield to 1 may also indicate that the AP intends to transmit NAV setting frames at the start of the TWT service period(s) to protect at least a part of the duration of the TWT service period(s). If the TWT element 1605 contains a list of STAs for which the TWT element 1605 is intended, the intended STA recipients of the TWT element 1605 may discard the NAV setting frame sent by the AP at the start of the TWT service period(s) and access the medium, or transmit to any frame that is sent by the AP immediately (e.g., in SIFS time). In another aspect, the AP that set the TWT protection subfield to 1 may indicate that scheduled data exchanges during the TWT SP may be preceded by a multi-user (MU) request to send (RTS) and clear to send (CTS) message exchange.

In an aspect, another AP that has set up another BSS and is within range of the AP that sent the TWT element 1605 (e.g., is able to read the frame carrying the TWT element 1605) may not allocate resources to any of the STAs associated with the another AP during the TWT service period(s) so as to minimize the risk of inter-BSS collisions.

In the foregoing description, unless expressly indicated, methods, functions, protocols, and techniques described with respect to a STA may also be applicable to an AP, and vice versa.

Figure 17:
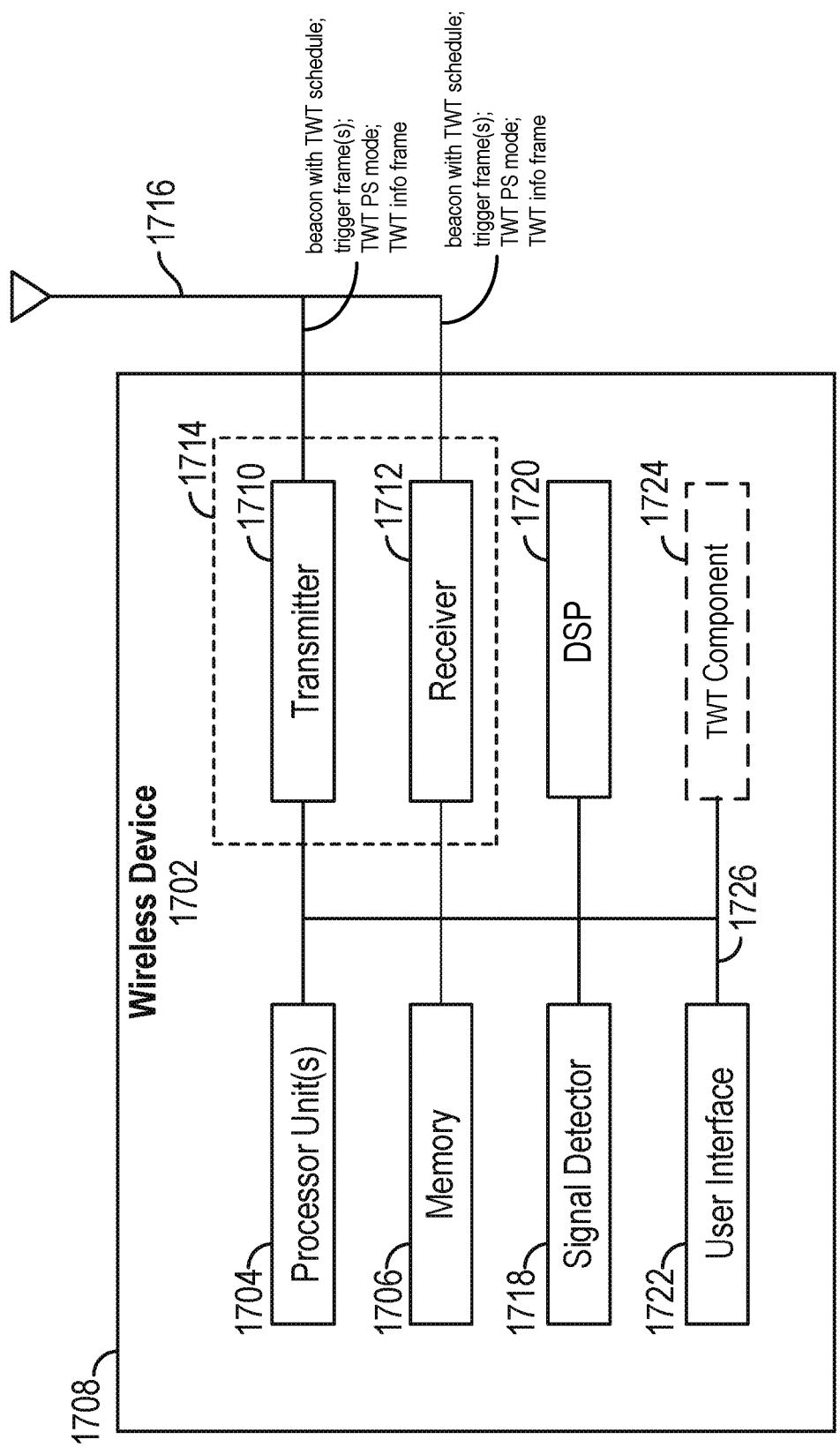
FIG. 17 shows an example functional block diagram of a wireless device that may perform TWT scheduling within the wireless communication system of FIG. 1.

FIG. 17 shows an example functional block diagram of a wireless device 1702 that may perform TWT scheduling within the wireless communication system 100 of FIG. 1. The wireless device 1702 is an example of a device that may be configured to implement the various methods described herein. For example, the wireless device 1702 may comprise one of the APs 104, 302, 602, 902 or one of the STAs 112, 114, 116, 118, 306, 308, 310, 606, 608, 610, 906, 908, 910.

The wireless device 1702 may include a processor 1704 which controls operation of the wireless device 1702. The processor 1704 may also be referred to as a central processing unit (CPU). Memory 1706, which may include both read-only memory (ROM) and random access memory (RAM), may provide instructions and data to the processor 1704. A portion of the memory 1706 may also include non-volatile random access memory (NVRAM). The processor 1704 typically performs logical and arithmetic operations based on program instructions stored within the memory 1706. The instructions in the memory 1706 may be executable (by the processor 1704, for example) to implement the methods described herein.

The processor 1704 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 1702 may also include a housing 1708, and the wireless device 1702 may include a transmitter 1710 and/or a receiver 1712 to allow transmission and reception of data between the wireless device 1702 and a remote device. The transmitter 1710 and the receiver 1712 may be combined into a transceiver 1714. An antenna 1716 may be attached to the housing 1708 and electrically coupled to the transceiver 1714. The wireless device 1702 may also include multiple transmitters, multiple receivers, multiple transceivers, and/or multiple antennas.

The wireless device 1702 may also include a signal detector 1718 that may be used to detect and quantify the level of signals received by the transceiver 1714 or the receiver 1712. The signal detector 1718 may detect such signals as total energy, energy per subcarrier per symbol, power spectral density, and other signals. The wireless device 1702 may also include a digital signal processor (DSP) 1720 for use in processing signals. The DSP 1720 may be configured to generate a packet for transmission. In some aspects, the packet may comprise a PPDU.

The wireless device 1702 may further comprise a user interface 1722 in some aspects. The user interface 1722 may comprise a keypad, a microphone, a speaker, and/or a display. The user interface 1722 may include any element or component that conveys information to a user of the wireless device 1702 and/or receives input from the user.

When the wireless device 1702 is implemented as a STA (e.g., the STAs 306, 606, 906) or as an AP (e.g., the APs 302, 602, 902), the wireless device 1702 may also comprise a TWT component 1724.

In one configuration, the wireless device 1702 may be a TWT requester for solicit TWTs. In this configuration, the TWT component 1724 may be configured to transmit a first message that includes a first trigger field to a second wireless device (e.g., a TWT responder). The first trigger field may indicate whether the first message includes a request for a trigger message to be sent by the second wireless device at a start of a TWT service period. The TWT component 1724 may be configured to receive a second message from the second wireless device. The second message may include a second trigger field based on the first message. The second trigger field may indicate whether the second wireless device will transmit the trigger message at the start of the TWT service period. In an aspect, the first message may include a requested TWT, the first trigger field may be set to 1, and the first message may request the trigger message to be sent at the requested TWT. In another aspect, the second message may include a scheduled TWT, the second trigger field may be set to 1, and the second message may indicate that the second wireless device may transmit the trigger message at the scheduled TWT. In another aspect, the scheduled TWT may be different from a requested TWT included in the first message. In one embodiment, the TWT component 1724 may be configured to determine a TWT schedule based on the received second message and to determine whether to transmit to the second wireless device based on the determined TWT schedule. In this embodiment, the TWT component 1724 may be configured to determine the TWT schedule by determining whether the TWT schedule is an implicit TWT schedule or an explicit TWT schedule based on the received second message and by determining one or more TWTs associated with the TWT schedule based on the received second message. In another embodiment, the TWT component 1724 may be configured to determine whether to transmit by determining to transmit during the TWT service period when a trigger message is received from the second wireless device or by determining to transmit outside of the TWT service period based on EDCA parameters associated with AC_BE or AC_BK. In another aspect, the TWT component 1724 may determine to transmit during the TWT service period based on the received trigger message, and the transmission may not based on EDCA contention. In another embodiment, the TWT component 1724 may be configured to receive a trigger message based on the determined TWT schedule. The trigger message may include a cascaded indicator that indicates whether the second wireless device will transmit another trigger message after the trigger message in the TWT service period. In another embodiment, the TWT component 1724 may be configured to receive a TWT information message from the second wireless device, and the TWT information message may include a next TWT value. The TWT component 1724 may be configured to update the TWT schedule based on the received TWT information message. In another embodiment, the TWT schedule may be the implicit TWT schedule, and the TWT component 1724 may be configured to transmit a TWT information message to the second wireless device. The TWT information message may indicate a suspension of the implicit TWT schedule or a resumption of the implicit TWT schedule after the implicit TWT schedule has been suspended. In another aspect, the first message may include a TWT channel indicator that indicates a channel and a channel width that the TWT component 1724 may use for communicating with the second wireless device during the TWT service period. In another aspect, the first message may include an OFDMA bitmap that indicates one or more OFDMA channels and channel widths to be used for communicating with the second wireless device.

In another configuration, the wireless device 1702 may be a TWT responder for solicit TWTs. In this configuration, the TWT component 1724 may be configured to receive, from a second wireless device, a first message that includes a first trigger field. The first trigger field may indicate whether the first message includes a request for a trigger message to be sent by the wireless device 1702 at a start of a TWT service period. The TWT component 1724 may be configured to determine a TWT schedule based on the received first message. The TWT component 1724 may be configured to transmit a second message to the second wireless device. The second message may include the TWT schedule and a second trigger field based on the determined TWT schedule. The second trigger field may indicate whether the wireless device 1702 may transmit the trigger message at the start of the TWT service period. In an aspect, the first message may include a requested TWT, the first trigger field may be set to 1, and the first message may request the trigger message to be sent at the requested TWT. In another aspect, the second message may include a scheduled TWT, the second trigger field may be set to 1, and the second message may indicate that the wireless device 1702 will transmit the trigger message at the scheduled TWT. In another aspect, the scheduled TWT may be different from a requested TWT included in the first message. In an embodiment, the TWT component 1724 may be configured to determine the TWT schedule by determining if the first trigger field includes the request for the trigger message and by scheduling one or more TWTs for the second wireless device if the first trigger field includes the request for the trigger message. In another embodiment, the TWT component 1724 may be configured to transmit a TWT information message that includes a next TWT value that is different from all TWT values associated with the TWT schedule included in the second message. In another embodiment, the TWT schedule may be an implicit TWT schedule, and the TWT component 1724 may be configured to receive a TWT information message from the second wireless device. The TWT information message may indicate a suspension of the implicit TWT schedule or a resumption of the implicit TWT schedule after the implicit TWT schedule has been suspended. In another aspect, the second message may include a TWT channel indicator that indicates a channel and a channel width to be used for communicating between the wireless device 1702 and the second wireless device during the TWT service period. In another embodiment, the TWT component 1724 may be configured to transmit a trigger message that includes a cascaded indicator. The cascaded indicator may indicate whether the wireless device 1702 will transmit another trigger message after the trigger message in the TWT service period. In another aspect, the second message may include a TWT protection indicator that indicates whether message exchanged with the wireless device 1702 based on the TWT schedule are to be preceded by an RTS and a CTS message exchange.

In another configuration, the wireless device 1702 may broadcast TWTs to other wireless devices. In this configuration, the TWT component 1724 may be configured to determine a TWT schedule and to broadcasting a message that includes the TWT schedule to other wireless devices. The message may include a broadcast indicator that indicates the TWT schedule is a broadcast TWT schedule. In an aspect, the broadcast TWT schedule may include non-negotiable TWT parameters for communicating between the wireless device 1702 and at least one wireless device of the wireless devices. In another aspect, the message may further include a trigger field that indicates whether the wireless device 1702 will transmit a trigger message at a start of a TWT service period. In another aspect, the message may include a TWT flow identifier field that indicates a type of data flow allowed during a TWT service period. In another aspect, the type of data flow allowed may include MU OFDMA random access for wireless devices unassociated with the wireless device 1702, MU OFDMA random access for wireless devices associated with the wireless device 1702, MU DL OFDMA scheduled access for wireless devices indicated in a TIM, MU UL OFDMA scheduled access for wireless devices indicated in the TIM, MU UL MIMO scheduled access for wireless devices indicated in the TIM, MU DL MIMO scheduled access for wireless devices indicated in the TIM. In another aspect, the TWT flow identifier field may indicates one of the following types of allowed data flows: no constraints on a type of message to be exchanged with the wireless device 1702, messages containing feedback information or management information can be exchanged with the wireless device 1702 and trigger messages from the wireless device 1702 do not include resource units for random access, messages containing feedback information or management information can be exchanged with the wireless device 1702 and trigger messages from the wireless device 1702 include resource units for random access, messages containing quality of service information can be exchanged with the wireless device 1702, or no traffic is expected to be communicated to or from the wireless device 1702. In another aspect, the TWT schedule may be an implicit TWT schedule or an explicit TWT schedule. In another aspect, the TWT schedule may be an explicit TWT schedule, the TWT schedule may includes one or more TWT parameter sets, and each TWT parameter set may correspond to a scheduled TWT. In another embodiment, the TWT schedule may be an implicit TWT schedule, and the TWT component 1724 may be configured to transmit a TWT information message to the second wireless device. The TWT information message may indicate a suspension of the implicit TWT schedule or a resumption of the implicit TWT schedule after the implicit TWT schedule has been suspended. In another embodiment, the TWT component 1724 may be configured to transmit a TWT information message to the second wireless device, and the TWT information message may indicate a different scheduled TWT than in the TWT schedule in the broadcasted message. In another embodiment, the TWT component 1724 may be configured to transmit a trigger message based on the TWT schedule. The trigger message may include a cascaded indicator that indicates whether the wireless device 1702 will transmit additional trigger messages in the TWT service period. In another aspect, the message may include a TWT group assignment field, and the TWT group assignment field may include a range of identifiers that identifies a group of wireless devices scheduled to wake up at a TWT during a TWT service period. In another aspect, the message may include a repetition indicator, and the repetition indicator may indicate a number of TWT service periods for which a scheduled TWT indicated in the message are valid. In another aspect, the message may include a TWT protection indicator that indicates whether messages exchanged with the wireless device 1702 based on the TWT schedule are to be preceded by an RTS and a CTS message exchange.

In another configuration, the wireless device 1702 may receive broadcast TWTs and determine whether to join the broadcast TWT. In this configuration, the TWT component 1724 may be configured to receive from a second wireless device a message that includes a TWT schedule. The message may include a broadcast indicator that indicates the TWT schedule is a broadcast TWT schedule. The TWT component 1724 may be configured to determine one or more TWTs for the wireless device 1702 based on the TWT schedule. In an aspect, the broadcast TWT schedule may include non-negotiable TWT parameters for communicating between the wireless device 1702 and the second wireless device. In another aspect, the message may include a trigger field that indicates whether the second wireless device will transmit a trigger message at a start of a TWT service period. In another aspect, the message may include a TWT flow identifier field that indicates a type of data flow allowed during a TWT service period. In another aspect, the TWT flow identifier field may indicate one of the following: no constraints on a type of message to be exchanged with the second wireless device, messages containing feedback information or management information can be exchanged with the second wireless device and trigger messages from the second wireless device do not include resource units for random access, messages containing feedback information or management information can be exchanged with the second wireless device and trigger messages from the second wireless device include resource units for random access, messages containing quality of service information can be exchanged with the second wireless device, or no traffic is expected to be communicated to or from the second wireless device. In another aspect, the TWT schedule may be an implicit TWT schedule or an explicit TWT schedule. In another aspect, the TWT schedule may be an explicit TWT schedule, the TWT schedule may include one or more TWT parameter sets, and each TWT parameter set may correspond to a scheduled TWT. In another aspect, the TWT schedule may be an implicit TWT schedule, and the TWT component 1724 may be configured to receive a TWT information message from the second wireless device. The TWT information message may indicate a suspension of the implicit TWT schedule or a resumption of the implicit TWT schedule after the implicit TWT schedule has been suspended. In another embodiment, the TWT component 1724 may be configured to receive a TWT information message from the second wireless device. The TWT information message may indicate a different scheduled TWT than in the received message. In another aspect, the message may include a repetition indicator, and the repetition indicator may indicate a number of TWT service periods for which a scheduled TWT indicated in the message are valid. In another embodiment, the TWT component 1724 may be configured to receive a trigger message based on the determined one or more TWTs. In another aspect, the trigger message may include a cascaded indicator that indicates whether the second wireless device will transmit additional trigger messages after the trigger message in a TWT service period. In another embodiment, the TWT component 1724 may be configured to determine to transmit to the second wireless device during a TWT service period when the trigger message is received from the second wireless device and to determine to transmit to the second wireless device outside of the TWT service period based on EDCA parameters associated with an AC_BE or an AC_BK.

In another configuration, the wireless device 1702 may be a TWT requester determining whether to switch operating modes. In this configuration, the TWT component 1724 may be configured to determine whether to switch to an active mode, a power save mode, or a TWT power save mode. During the TWT power save mode, the wireless device 1702 may enter an awake state during TWT service periods and may enter a doze state outside of the TWT service periods. The TWT component 1724 may be configured to transmit a message to a second wireless device based on the determination. In another aspect, the TWT service periods may be identified based on a TWT schedule associated with the wireless device 1702. In another aspect, the message may include a power management indicator that indicates a mode to which the wireless device 1702 intends switch. In another embodiment, the TWT component 1724 may be configured to receive an indication from the second wireless device instructing the wireless device 1702 to switch to or to switch away from the TWT power save mode. In another aspect, the indication may include an EOSP indicator set to 1. In another embodiment, the TWT component 1724 may be configured to determine whether to switch by determining if there is additional data for transmission or reception, by receiving from the second wireless device a QoS message with an EOSP indicator set to 1, or by receiving from the second wireless device a trigger message with a cascaded indicator set to 0 in which the trigger message is not intended for the wireless device 1702. In another embodiment, the TWT component 1724 may be configured to determine a mode of the second wireless device. In another embodiment, the TWT component 1724 may be configured to determine the mode of the second wireless device by receiving a second message from the second wireless device, in which second message may include a responder mode indicator that indicates whether the second wireless device is in a doze state outside of the TWT service periods. The determination of the mode of the second wireless device may be based on the responder mode indicator. In another embodiment, the TWT component 1724 may be configured to determine the mode of the second wireless device by receiving a trigger message from the second wireless device. The determination of the mode of the second wireless device may be based on whether the trigger message includes resource allocations to any wireless devices. In another embodiment, the TWT component 1724 may be configured to receive from the second wireless device a second message that includes a traffic indication map, and the traffic indication map may indicate a mode of operation for the wireless device 1702 to select.

In another configuration, the wireless device 1702 may be a TWT responder with respect to operating modes. In this configuration, the TWT component 1724 may be configured to receive a message from a second wireless device that indicates an intention of the second wireless device to switch to an operating mode that is one of an active mode, a power save mode, or a TWT power save mode. During the TWT power save mode, the second wireless device may enter an awake state during TWT service periods and may enter a doze state outside of the TWT service periods. The TWT component 1724 may be configured to store the operating mode associated with the second wireless device and to transmit to the second wireless device an acknowledgment of the operating mode switch. In an aspect, the TWT service periods may be identified based on a TWT schedule associated with the second wireless device. In another aspect, the message may include a power management indicator that indicates the operating mode to which the second wireless device intends to switch. In another embodiment, the TWT component 1724 may be configured to transmit a QoS message that may include an EOSP indicator set to 1 to instruct the second wireless device to switch operating modes. In another embodiment, the TWT component 1724 may be configured to transmit a responder mode indicator that indicates whether the wireless device 1702 is in a doze state outside of the TWT service periods. In another embodiment, the TWT component 1724 may be configured to transmit a trigger message with unassigned resources to indicate that the wireless device 1702 will enter into a doze state. In another embodiment, the TWT component 1724 may be configured to transmit a traffic indication map that indicates the operating mode for the second wireless device to select. In another embodiment, the TWT component 1724 may be configured to transmit an indication to the second wireless device instructing the second wireless device to switch to or to switch away from the TWT power save mode.

The various components of the wireless device 1702 may be coupled together by a bus system 1726. The bus system 1726 may include a data bus, for example, as well as a power bus, a control signal bus, and a status signal bus in addition to the data bus. Components of the wireless device 1702 may be coupled together or accept or provide inputs to each other using some other mechanism.

Although a number of separate components are illustrated in FIG. 17, one or more of the components may be combined or commonly implemented. For example, the processor 1704 may be used to implement not only the functionality described above with respect to the processor 1704, but also to implement the functionality described above with respect to the signal detector 1718, the DSP 1720, the user interface 1722, and/or the TWT component 1724. Further, each of the components illustrated in FIG. 17 may be implemented using a plurality of separate elements.

Figure 18:
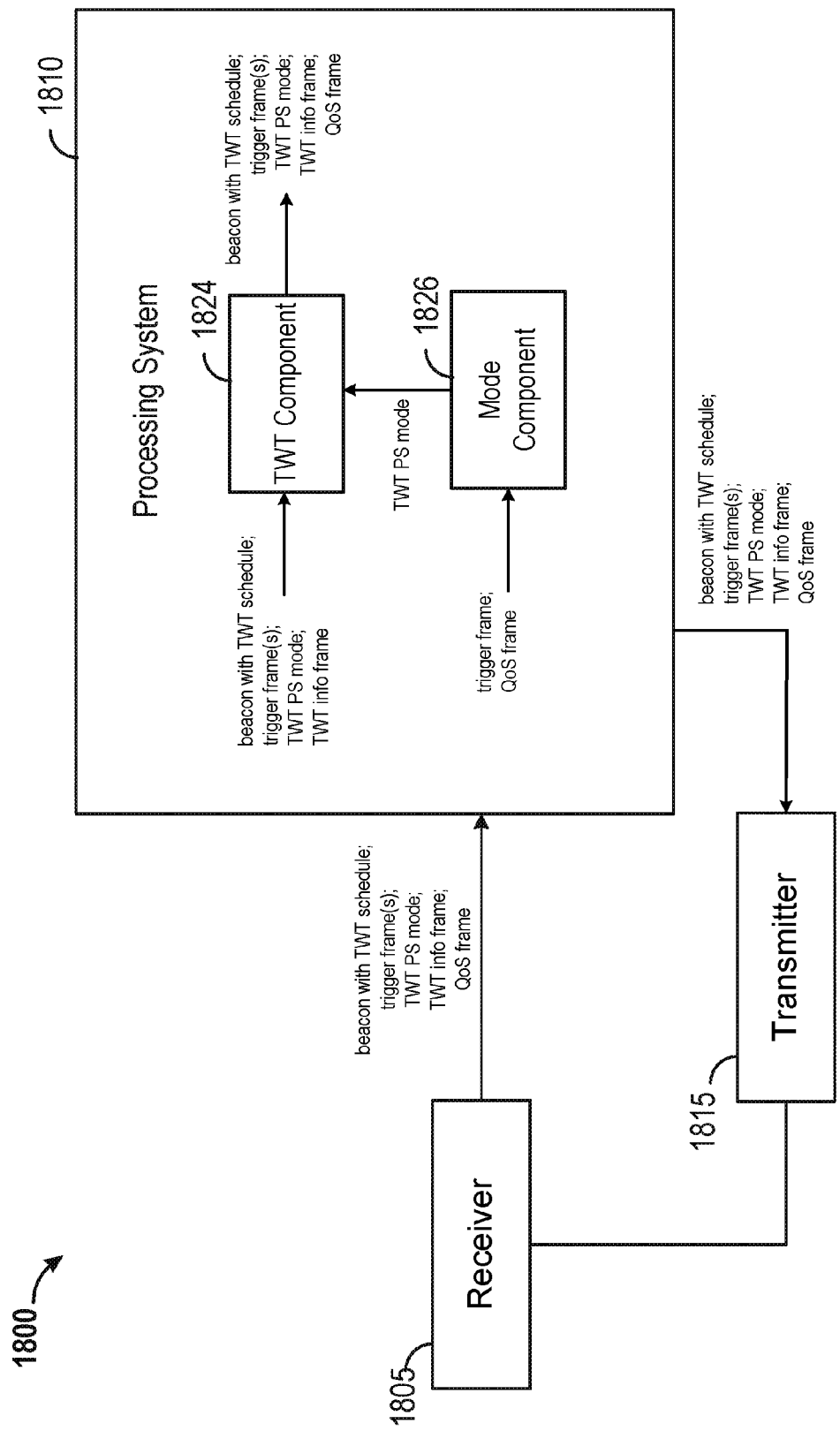
FIG. 18 is a functional block diagram of an example wireless communication device that performs TWT scheduling.

FIG. 18 is a functional block diagram of an example wireless communication device 1800 that performs TWT scheduling. The wireless communication device 1800 may include a receiver 1805, a processing system 1810, and a transmitter 1815. The processing system 1810 may include a TWT component 1824 and a mode component 1826.

In one configuration, the wireless communication device 1800 may be a TWT requester for solicit TWTs. In this configuration, the processing system 1810, the TWT component 1824, and/or the transmitter 1815 may be configured to transmit a first message that includes a first trigger field to a second wireless device (e.g., a TWT responder). The first trigger field may indicate whether the first message includes a request for a trigger message to be sent by the second wireless device at a start of a TWT service period. The processing system 1810, the TWT component 1824, and/or the receiver 1805 may be configured to receive a second message from the second wireless device. The second message may include a second trigger field based on the first message. The second trigger field may indicate whether the second wireless device will transmit the trigger message at the start of the TWT service period. In an aspect, the first message may include a requested TWT, the first trigger field may be set to 1, and the first message may request the trigger message to be sent at the requested TWT. In another aspect, the second message may include a scheduled TWT, the second trigger field may be set to 1, and the second message may indicate that the second wireless device may transmit the trigger message at the scheduled TWT. In another aspect, the scheduled TWT may be different from a requested TWT included in the first message. In one embodiment, the processing system 1810 and/or the TWT component 1824 may be configured to determine a TWT schedule based on the received second message and to determine whether to transmit to the second wireless device based on the determined TWT schedule. In this embodiment, the processing system 1810 and/or the TWT component 1824 may be configured to determine the TWT schedule by determining whether the TWT schedule is an implicit TWT schedule or an explicit TWT schedule based on the received second message and by determining one or more TWTs associated with the TWT schedule based on the received second message. In another embodiment, the processing system 1810 and/or the TWT component 1824 may be configured to determine whether to transmit by determining to transmit during the TWT service period when a trigger message is received from the second wireless device or by determining to transmit outside of the TWT service period based on EDCA parameters associated with AC_BE or AC_BK. In another aspect, the processing system 1810 and/or the TWT component 1824 may determine to transmit during the TWT service period based on the received trigger message, and the transmission may not based on EDCA contention. In another embodiment, the processing system 1810, the TWT component 1824, and/or the receiver 1805 may be configured to receive a trigger message based on the determined TWT schedule. The trigger message may include a cascaded indicator that indicates whether the second wireless device will transmit another trigger message after the trigger message in the TWT service period. In another embodiment, the processing system 1810, the TWT component 1824, and/or the receiver 1805 may be configured to receive a TWT information message from the second wireless device, and the TWT information message may include a next TWT value. The processing system 1810 and/or The TWT component 1824 may be configured to update the TWT schedule based on the received TWT information message. In another embodiment, the TWT schedule may be the implicit TWT schedule, and the processing system 1810, the TWT component 1824, and/or the transmitter 1815 may be configured to transmit a TWT information message to the second wireless device. The TWT information message may indicate a suspension of the implicit TWT schedule or a resumption of the implicit TWT schedule after the implicit TWT schedule has been suspended. In another aspect, the first message may include a TWT channel indicator that indicates a channel and a channel width that the TWT component 1824 may use for communicating with the second wireless device during the TWT service period. In another aspect, the first message may include an OFDMA bitmap that indicates one or more OFDMA channels and channel widths to be used for communicating with the second wireless device.

In another configuration, the wireless communication device 1800 may be a TWT responder for solicit TWTs. In this configuration, the processing system 1810, the TWT component 1824, and/or the receiver 1805 may be configured to receive, from a second wireless device, a first message that includes a first trigger field. The first trigger field may indicate whether the first message includes a request for a trigger message to be sent by the wireless communication device 1800 at a start of a TWT service period. The processing system 1810 and/or The TWT component 1824 may be configured to determine a TWT schedule based on the received first message. The TWT component 1824, the processing system 1810, and/or the transmitter 1815 may be configured to transmit a second message to the second wireless device. The second message may include the TWT schedule and a second trigger field based on the determined TWT schedule. The second trigger field may indicate whether the wireless communication device 1800 may transmit the trigger message at the start of the TWT service period. In an aspect, the first message may include a requested TWT, the first trigger field may be set to 1, and the first message may request the trigger message to be sent at the requested TWT. In another aspect, the second message may include a scheduled TWT, the second trigger field may be set to 1, and the second message may indicate that the wireless communication device 1800 will transmit the trigger message at the scheduled TWT. In another aspect, the scheduled TWT may be different from a requested TWT included in the first message. In an embodiment, the processing system 1810 and/or the TWT component 1824 may be configured to determine the TWT schedule by determining if the first trigger field includes the request for the trigger message and by scheduling one or more TWTs for the second wireless device if the first trigger field includes the request for the trigger message. In another embodiment, the processing system 1810, the TWT component 1824, and/or the transmitter 1815 may be configured to transmit a TWT information message that includes a next TWT value that is different from all TWT values associated with the TWT schedule included in the second message. In another embodiment, the TWT schedule may be an implicit TWT schedule, and the processing system 1810, the TWT component 1824, and/or the receiver 1805 may be configured to receive a TWT information message from the second wireless device. The TWT information message may indicate a suspension of the implicit TWT schedule or a resumption of the implicit TWT schedule after the implicit TWT schedule has been suspended. In another aspect, the second message may include a TWT channel indicator that indicates a channel and a channel width to be used for communicating between the wireless communication device 1800 and the second wireless device during the TWT service period. In another embodiment, the processing system 1810, the TWT component 1824, and/or the transmitter 1815 may be configured to transmit a trigger message that includes a cascaded indicator. The cascaded indicator may indicate whether the wireless communication device 1800 will transmit another trigger message after the trigger message in the TWT service period. In another aspect, the second message may include a TWT protection indicator that indicates whether message exchanged with the wireless communication device 1800 based on the TWT schedule are to be preceded by an RTS and a CTS message exchange.

In another configuration, the wireless communication device 1800 may broadcast TWTs to other wireless devices. In this configuration, the processing system 1810 and/or the TWT component 1824 may be configured to determine a TWT schedule and to broadcast a message that includes the TWT schedule to other wireless devices. The message may include a broadcast indicator that indicates the TWT schedule is a broadcast TWT schedule. In an aspect, the broadcast TWT schedule may include non-negotiable TWT parameters for communicating between the wireless communication device 1800 and at least one wireless device of the wireless devices. In another aspect, the message may further include a trigger field that indicates whether the wireless communication device 1800 will transmit a trigger message at a start of a TWT service period. In another aspect, the message may include a TWT flow identifier field that indicates a type of data flow allowed during a TWT service period. In another aspect, the type of data flow allowed may include MU OFDMA random access for wireless devices unassociated with the wireless communication device 1800, MU OFDMA random access for wireless devices associated with the wireless communication device 1800, MU DL OFDMA scheduled access for wireless devices indicated in a TIM, MU UL OFDMA scheduled access for wireless devices indicated in the TIM, MU UL MIMO scheduled access for wireless devices indicated in the TIM, MU DL MIMO scheduled access for wireless devices indicated in the TIM. In another aspect, the TWT flow identifier field may indicates one of the following types of allowed data flows: no constraints on a type of message to be exchanged with the wireless communication device 1800, messages containing feedback information or management information can be exchanged with the wireless communication device 1800 and trigger messages from the wireless communication device 1800 do not include resource units for random access, messages containing feedback information or management information can be exchanged with the wireless communication device 1800 and trigger messages from the wireless communication device 1800 include resource units for random access, messages containing quality of service information can be exchanged with the wireless communication device 1800, or no traffic is expected to be communicated to or from the wireless communication device 1800. In another aspect, the TWT schedule may be an implicit TWT schedule or an explicit TWT schedule. In another aspect, the TWT schedule may be an explicit TWT schedule, the TWT schedule may includes one or more TWT parameter sets, and each TWT parameter set may correspond to a scheduled TWT. In another embodiment, the TWT schedule may be an implicit TWT schedule, and the processing system 1810, the TWT component 1824, and/or the transmitter 1815 may be configured to transmit a TWT information message to the second wireless device. The TWT information message may indicate a suspension of the implicit TWT schedule or a resumption of the implicit TWT schedule after the implicit TWT schedule has been suspended. In another embodiment, the processing system 1810, the TWT component 1824, and/or the transmitter 1815 may be configured to transmit a TWT information message to the second wireless device, and the TWT information message may indicate a different scheduled TWT than in the TWT schedule in the broadcasted message. In another embodiment, the processing system 1810, the TWT component 1824, and/or the transmitter 1815 may be configured to transmit a trigger message based on the TWT schedule. The trigger message may include a cascaded indicator that indicates whether the wireless communication device 1800 will transmit additional trigger messages in the TWT service period. In another aspect, the message may include a TWT group assignment field, and the TWT group assignment field may include a range of identifiers that identifies a group of wireless devices scheduled to wake up at a TWT during a TWT service period. In another aspect, the message may include a repetition indicator, and the repetition indicator may indicate a number of TWT service periods for which a scheduled TWT indicated in the message are valid. In another aspect, the message may include a TWT protection indicator that indicates whether messages exchanged with the wireless communication device 1800 based on the TWT schedule are to be preceded by an RTS and a CTS message exchange.

In another configuration, the wireless communication device 1800 may receive broadcast TWTs and determine whether to join the broadcast TWT. In this configuration, the processing system 1810, the TWT component 1824, and/or the receiver 1805 may be configured to receive from a second wireless device a message that includes a TWT schedule. The message may include a broadcast indicator that indicates the TWT schedule is a broadcast TWT schedule. The processing system 1810 and/or the TWT component 1824 may be configured to determine one or more TWTs for the wireless communication device 1800 based on the TWT schedule. In an aspect, the broadcast TWT schedule may include non-negotiable TWT parameters for communicating between the wireless communication device 1800 and the second wireless device. In another aspect, the message may include a trigger field that indicates whether the second wireless device will transmit a trigger message at a start of a TWT service period. In another aspect, the message may include a TWT flow identifier field that indicates a type of data flow allowed during a TWT service period. In another aspect, the TWT flow identifier field may indicate one of the following: no constraints on a type of message to be exchanged with the second wireless device, messages containing feedback information or management information can be exchanged with the second wireless device and trigger messages from the second wireless device do not include resource units for random access, messages containing feedback information or management information can be exchanged with the second wireless device and trigger messages from the second wireless device include resource units for random access, messages containing quality of service information can be exchanged with the second wireless device, or no traffic is expected to be communicated to or from the second wireless device. In another aspect, the TWT schedule may be an implicit TWT schedule or an explicit TWT schedule. In another aspect, the TWT schedule may be an explicit TWT schedule, the TWT schedule may include one or more TWT parameter sets, and each TWT parameter set may correspond to a scheduled TWT. In another aspect, the TWT schedule may be an implicit TWT schedule, and the processing system 1810, the TWT component 1824, and/or the receiver 1805 may be configured to receive a TWT information message from the second wireless device. The TWT information message may indicate a suspension of the implicit TWT schedule or a resumption of the implicit TWT schedule after the implicit TWT schedule has been suspended. In another embodiment, the processing system 1810, the TWT component 1824, and/or the receiver 1805 may be configured to receive a TWT information message from the second wireless device. The TWT information message may indicate a different scheduled TWT than in the received message. In another aspect, the message may include a repetition indicator, and the repetition indicator may indicate a number of TWT service periods for which a scheduled TWT indicated in the message are valid. In another embodiment, the processing system 1810, the TWT component 1824, and/or the receiver 1805 may be configured to receive a trigger message based on the determined one or more TWTs. In another aspect, the trigger message may include a cascaded indicator that indicates whether the second wireless device will transmit additional trigger messages after the trigger message in a TWT service period. In another embodiment, the processing system 1810 and/or the TWT component 1824 may be configured to determine to transmit to the second wireless device during a TWT service period when the trigger message is received from the second wireless device and to determine to transmit to the second wireless device outside of the TWT service period based on EDCA parameters associated with an AC_BE or an AC_BK.

In another configuration, the wireless communication device 1800 may be a TWT requester determining whether to switch operating modes. In this configuration, the processing system 1810, the mode component 1826, and/or the TWT component 1824 may be configured to determine whether to switch to an active mode, a power save mode, or a TWT power save mode. During the TWT power save mode, the wireless communication device 1800 may enter an awake state during TWT service periods and may enter a doze state outside of the TWT service periods. The processing system 1810, the TWT component 1824, the mode component 1826, and/or the transmitter 1815 may be configured to transmit a message to a second wireless device based on the determination. In another aspect, the TWT service periods may be identified based on a TWT schedule associated with the wireless communication device 1800. In another aspect, the message may include a power management indicator that indicates a mode to which the wireless communication device 1800 intends switch. In another embodiment, the processing system 1810, the TWT component 1824, the mode component 1826, and/or the receiver 1805 may be configured to receive an indication from the second wireless device instructing the wireless communication device 1800 to switch to or to switch away from the TWT power save mode. In another aspect, the indication may include an EOSP indicator set to 1. In another embodiment, the processing system 1810, the TWT component 1824, and/or the mode component 1826 may be configured to determine whether to switch by determining if there is additional data for transmission or reception, by receiving from the second wireless device a QoS message with an EOSP indicator set to 1, or by receiving from the second wireless device a trigger message with a cascaded indicator set to 0 in which the trigger message is not intended for the wireless communication device 1800. In another embodiment, the processing system 1810, the TWT component 1824, and/or the mode component 1826 may be configured to determine a mode of the second wireless device. In another embodiment, the processing system 1810, the TWT component 1824, and/or the mode component 1826 may be configured to determine the mode of the second wireless device by receiving a second message from the second wireless device, in which second message may include a responder mode indicator that indicates whether the second wireless device is in a doze state outside of the TWT service periods. The determination of the mode of the second wireless device may be based on the responder mode indicator. In another embodiment, the processing system 1810, the TWT component 1824, and/or the mode component 1826 may be configured to determine the mode of the second wireless device by receiving a trigger message from the second wireless device. The determination of the mode of the second wireless device may be based on whether the trigger message includes resource allocations to any wireless devices. In another embodiment, the processing system 1810, the TWT component 1824, the mode component 1826, and/or the receiver 1805 may be configured to receive from the second wireless device a second message that includes a traffic indication map, and the traffic indication map may indicate a mode of operation for the wireless communication device 1800 to select.

In another configuration, the wireless communication device 1800 may be a TWT responder with respect to operating modes. In this configuration, the processing system 1810, the TWT component 1824, the mode component 1826, and/or the receiver 1805 may be configured to receive a message from a second wireless device that indicates an intention of the second wireless device to switch to an operating mode that is one of an active mode, a power save mode, or a TWT power save mode. During the TWT power save mode, the second wireless device may enter an awake state during TWT service periods and may enter a doze state outside of the TWT service periods. The processing system 1810, the TWT component 1824, and/or the mode component 1826 may be configured to store the operating mode associated with the second wireless device and to transmit to the second wireless device an acknowledgment of the operating mode switch. In an aspect, the TWT service periods may be identified based on a TWT schedule associated with the second wireless device. In another aspect, the message may include a power management indicator that indicates the operating mode to which the second wireless device intends to switch. In another embodiment, the processing system 1810, the TWT component 1824, the mode component 1826, and/or the transmitter 1815 may be configured to transmit a QoS message that may include an EOSP indicator set to 1 to instruct the second wireless device to switch operating modes. In another embodiment, the processing system 1810, the TWT component 1824, the mode component 1826, and/or the transmitter 1815 may be configured to transmit a responder mode indicator that indicates whether the wireless communication device 1800 is in a doze state outside of the TWT service periods. In another embodiment, the processing system 1810, the TWT component 1824, the mode component 1826, and/or the transmitter 1815 may be configured to transmit a trigger message with unassigned resources to indicate that the wireless communication device 1800 will enter into a doze state. In another embodiment, the processing system 1810, the TWT component 1824, the mode component 1826, and/or the transmitter 1815 may be configured to transmit a traffic indication map that indicates the operating mode for the second wireless device to select. In another embodiment, the processing system 1810, the TWT component 1824, the mode component 1826, and/or the transmitter 1815 may be configured to transmit an indication to the second wireless device instructing the second wireless device to switch to or to switch away from the TWT power save mode.

The receiver 1805, the processing system 1810, the TWT component 1824, the mode component 1826, and/or the transmitter 1815 may be configured to perform one or more functions discussed above with respect to blocks 405, 410, 415, 420, 425, 430, 435, and 440 of FIG. 4; blocks 505, 510, 515, 520, 525, and 530 of FIG. 5; blocks 705, 710, 715, 720, and 725 of FIG. 7; blocks 805, 810, 815, 820, 825, 830, and 835 of FIG. 8; blocks 1005, 1010, 1015, 1020, and 1025 of FIG. 10; and blocks 1105, 1110, 1115, 1120, 1125, 1130, 1135, and 1140 of FIG. 11. The receiver 1805 may correspond to the receiver 1712. The processing system 1810 may correspond to the processor 1704. The transmitter 1815 may correspond to the transmitter 1710. The TWT component 1824 may correspond to the TWT component 126, the TWT component 124, and/or the TWT component 1724.

In one configuration, the wireless communication device 1800 may be a TWT requester for solicit TWTs. In this configuration, the wireless communication device 1800 may include means for transmitting a first message that includes a first trigger field to a second wireless device (e.g., a TWT responder). The first trigger field may indicate whether the first message includes a request for a trigger message to be sent by the second wireless device at a start of a TWT service period. The wireless communication device 1800 may include means for receiving a second message from the second wireless device. The second message may include a second trigger field based on the first message. The second trigger field may indicate whether the second wireless device will transmit the trigger message at the start of the TWT service period. In an aspect, the first message may include a requested TWT, the first trigger field may be set to 1, and the first message may request the trigger message to be sent at the requested TWT. In another aspect, the second message may include a scheduled TWT, the second trigger field may be set to 1, and the second message may indicate that the second wireless device may transmit the trigger message at the scheduled TWT. In another aspect, the scheduled TWT may be different from a requested TWT included in the first message. In one embodiment, the wireless communication device 1800 may include means for determining a TWT schedule based on the received second message and means for determining whether to transmit to the second wireless device based on the determined TWT schedule. In this embodiment, the means for determining the TWT schedule may be configured to determine whether the TWT schedule is an implicit TWT schedule or an explicit TWT schedule based on the received second message and to determine one or more TWTs associated with the TWT schedule based on the received second message. In another embodiment, the means for determining whether to transmit may be configured to determine to transmit during the TWT service period when a trigger message is received from the second wireless device or to determine to transmit outside of the TWT service period based on EDCA parameters associated with AC_BE or AC_BK. In another aspect, the wireless communication device 1800 may determine to transmit during the TWT service period based on the received trigger message, and the transmission may not based on EDCA contention. In another embodiment, the wireless communication device 1800 may include means for receiving a trigger message based on the determined TWT schedule. The trigger message may include a cascaded indicator that indicates whether the second wireless device will transmit another trigger message after the trigger message in the TWT service period. In another embodiment, the wireless communication device 1800 may include means for receiving a TWT information message from the second wireless device, and the TWT information message may include a next TWT value. The wireless communication device 1800 may include means for updating the TWT schedule based on the received TWT information message. In another embodiment, the TWT schedule may be the implicit TWT schedule, and the wireless communication device 1800 may include means for transmitting a TWT information message to the second wireless device. The TWT information message may indicate a suspension of the implicit TWT schedule or a resumption of the implicit TWT schedule after the implicit TWT schedule has been suspended. In another aspect, the first message may include a TWT channel indicator that indicates a channel and a channel width that the wireless communication device 1800 may use for communicating with the second wireless device during the TWT service period. In another aspect, the first message may include an OFDMA bitmap that indicates one or more OFDMA channels and channel widths to be used for communicating with the second wireless device.

In another configuration, the wireless communication device 1800 may be a TWT responder for solicit TWTs. In this configuration, the wireless communication device 1800 may include means for receiving, from a second wireless device, a first message that includes a first trigger field. The first trigger field may indicate whether the first message includes a request for a trigger message to be sent by the wireless communication device 1800 at a start of a TWT service period. The wireless communication device 1800 may include means for determining a TWT schedule based on the received first message. The wireless communication device 1800 may include means for transmitting a second message to the second wireless device. The second message may include the TWT schedule and a second trigger field based on the determined TWT schedule. The second trigger field may indicate whether the wireless communication device 1800 may transmit the trigger message at the start of the TWT service period. In an aspect, the first message may include a requested TWT, the first trigger field may be set to 1, and the first message may request the trigger message to be sent at the requested TWT. In another aspect, the second message may include a scheduled TWT, the second trigger field may be set to 1, and the second message may indicate that the wireless communication device 1800 will transmit the trigger message at the scheduled TWT. In another aspect, the scheduled TWT may be different from a requested TWT included in the first message. In an embodiment, the means for determining the TWT schedule may be configured to determine if the first trigger field includes the request for the trigger message and to schedule one or more TWTs for the second wireless device if the first trigger field includes the request for the trigger message. In another embodiment, the wireless communication device 1800 may include means for transmitting a TWT information message that includes a next TWT value that is different from all TWT values associated with the TWT schedule included in the second message. In another embodiment, the TWT schedule may be an implicit TWT schedule, and the wireless communication device 1800 may include means for receiving a TWT information message from the second wireless device. The TWT information message may indicate a suspension of the implicit TWT schedule or a resumption of the implicit TWT schedule after the implicit TWT schedule has been suspended. In another aspect, the second message may include a TWT channel indicator that indicates a channel and a channel width to be used for communicating between the wireless communication device 1800 and the second wireless device during the TWT service period. In another embodiment, the wireless communication device 1800 may include means for transmitting a trigger message that includes a cascaded indicator. The cascaded indicator may indicate whether the wireless communication device 1800 will transmit another trigger message after the trigger message in the TWT service period. In another aspect, the second message may include a TWT protection indicator that indicates whether message exchanged with the wireless communication device 1800 based on the TWT schedule are to be preceded by an RTS and a CTS message exchange.

In another configuration, the wireless communication device 1800 may broadcast TWTs to other wireless devices. In this configuration, the wireless communication device 1800 may include means for determining a TWT schedule and means for broadcasting a message that includes the TWT schedule to other wireless devices. The message may include a broadcast indicator that indicates the TWT schedule is a broadcast TWT schedule. In an aspect, the broadcast TWT schedule may include non-negotiable TWT parameters for communicating between the wireless communication device 1800 and at least one wireless device of the wireless devices. In another aspect, the message may further include a trigger field that indicates whether the wireless communication device 1800 will transmit a trigger message at a start of a TWT service period. In another aspect, the message may include a TWT flow identifier field that indicates a type of data flow allowed during a TWT service period. In another aspect, the type of data flow allowed may include MU OFDMA random access for wireless devices unassociated with the wireless communication device 1800, MU OFDMA random access for wireless devices associated with the wireless communication device 1800, MU DL OFDMA scheduled access for wireless devices indicated in a TIM, MU UL OFDMA scheduled access for wireless devices indicated in the TIM, MU UL MIMO scheduled access for wireless devices indicated in the TIM, MU DL MIMO scheduled access for wireless devices indicated in the TIM. In another aspect, the TWT flow identifier field may indicates one of the following types of allowed data flows: no constraints on a type of message to be exchanged with the wireless communication device 1800, messages containing feedback information or management information can be exchanged with the wireless communication device 1800 and trigger messages from the wireless communication device 1800 do not include resource units for random access, messages containing feedback information or management information can be exchanged with the wireless communication device 1800 and trigger messages from the wireless communication device 1800 include resource units for random access, messages containing quality of service information can be exchanged with the wireless communication device 1800, or no traffic is expected to be communicated to or from the wireless communication device 1800. In another aspect, the TWT schedule may be an implicit TWT schedule or an explicit TWT schedule. In another aspect, the TWT schedule may be an explicit TWT schedule, the TWT schedule may includes one or more TWT parameter sets, and each TWT parameter set may correspond to a scheduled TWT. In another embodiment, the TWT schedule may be an implicit TWT schedule, and the wireless communication device 1800 may include means for transmitting a TWT information message to the second wireless device. The TWT information message may indicate a suspension of the implicit TWT schedule or a resumption of the implicit TWT schedule after the implicit TWT schedule has been suspended. In another embodiment, the wireless communication device 1800 may include means for transmitting a TWT information message to the second wireless device, and the TWT information message may indicate a different scheduled TWT than in the TWT schedule in the broadcasted message. In another embodiment, the wireless communication device 1800 may include means for transmitting a trigger message based on the TWT schedule. The trigger message may include a cascaded indicator that indicates whether the wireless communication device 1800 will transmit additional trigger messages in the TWT service period. In another aspect, the message may include a TWT group assignment field, and the TWT group assignment field may include a range of identifiers that identifies a group of wireless devices scheduled to wake up at a TWT during a TWT service period. In another aspect, the message may include a repetition indicator, and the repetition indicator may indicate a number of TWT service periods for which a scheduled TWT indicated in the message are valid. In another aspect, the message may include a TWT protection indicator that indicates whether messages exchanged with the wireless communication device 1800 based on the TWT schedule are to be preceded by an RTS and a CTS message exchange.

In another configuration, the wireless communication device 1800 may receive broadcast TWTs and determine whether to join the broadcast TWT. In this configuration, the wireless communication device 1800 may include means for receiving from a second wireless device a message that includes a TWT schedule. The message may include a broadcast indicator that indicates the TWT schedule is a broadcast TWT schedule. The wireless communication device 1800 may include means for determining one or more TWTs for the wireless communication device 1800 based on the TWT schedule. In an aspect, the broadcast TWT schedule may include non-negotiable TWT parameters for communicating between the wireless communication device 1800 and the second wireless device. In another aspect, the message may include a trigger field that indicates whether the second wireless device will transmit a trigger message at a start of a TWT service period. In another aspect, the message may include a TWT flow identifier field that indicates a type of data flow allowed during a TWT service period. In another aspect, the TWT flow identifier field may indicate one of the following: no constraints on a type of message to be exchanged with the second wireless device, messages containing feedback information or management information can be exchanged with the second wireless device and trigger messages from the second wireless device do not include resource units for random access, messages containing feedback information or management information can be exchanged with the second wireless device and trigger messages from the second wireless device include resource units for random access, messages containing quality of service information can be exchanged with the second wireless device, or no traffic is expected to be communicated to or from the second wireless device. In another aspect, the TWT schedule may be an implicit TWT schedule or an explicit TWT schedule. In another aspect, the TWT schedule may be an explicit TWT schedule, the TWT schedule may include one or more TWT parameter sets, and each TWT parameter set may correspond to a scheduled TWT. In another aspect, the TWT schedule may be an implicit TWT schedule, and the wireless communication device 1800 may include means for receiving a TWT information message from the second wireless device. The TWT information message may indicate a suspension of the implicit TWT schedule or a resumption of the implicit TWT schedule after the implicit TWT schedule has been suspended. In another embodiment, the wireless communication device 1800 may include means for receiving a TWT information message from the second wireless device. The TWT information message may indicate a different scheduled TWT than in the received message. In another aspect, the message may include a repetition indicator, and the repetition indicator may indicate a number of TWT service periods for which a scheduled TWT indicated in the message are valid. In another embodiment, the wireless communication device 1800 may include means for receiving a trigger message based on the determined one or more TWTs. In another aspect, the trigger message may include a cascaded indicator that indicates whether the second wireless device will transmit additional trigger messages after the trigger message in a TWT service period. In another embodiment, the wireless communication device 1800 may include means for determining to transmit to the second wireless device during a TWT service period when the trigger message is received from the second wireless device and means for determining to transmit to the second wireless device outside of the TWT service period based on EDCA parameters associated with an AC_BE or an AC_BK.

In another configuration, the wireless communication device 1800 may be a TWT requester determining whether to switch operating modes. In this configuration, the wireless communication device 1800 may include means for determining whether to switch to an active mode, a power save mode, or a TWT power save mode. During the TWT power save mode, the wireless communication device 1800 may enter an awake state during TWT service periods and may enter a doze state outside of the TWT service periods. The wireless communication device 1800 may include means for transmitting a message to a second wireless device based on the determination. In another aspect, the TWT service periods may be identified based on a TWT schedule associated with the wireless communication device 1800. In another aspect, the message may include a power management indicator that indicates a mode to which the wireless communication device 1800 intends switch. In another embodiment, the wireless communication device 1800 may include means for receiving an indication from the second wireless device instructing the wireless communication device 1800 to switch to or to switch away from the TWT power save mode. In another aspect, the indication may include an EOSP indicator set to 1. In another embodiment, the means for determining whether to switch may be configured to determine if there is additional data for transmission or reception, to receive from the second wireless device a QoS message with an EOSP indicator set to 1, or to receive from the second wireless device a trigger message with a cascaded indicator set to 0 in which the trigger message is not intended for the wireless communication device 1800. In another embodiment, the wireless communication device 1800 may include means for determining a mode of the second wireless device. In another embodiment, the means for determining the mode of the second wireless device may be configured to receive a second message from the second wireless device, in which second message may include a responder mode indicator that indicates whether the second wireless device is in a doze state outside of the TWT service periods. The determination of the mode of the second wireless device may be based on the responder mode indicator. In another embodiment, the means for determining the mode of the second wireless device may be configured to receive a trigger message from the second wireless device. The determination of the mode of the second wireless device may be based on whether the trigger message includes resource allocations to any wireless devices. In another embodiment, the wireless communication device 1800 may include means for receiving from the second wireless device a second message that includes a traffic indication map, and the traffic indication map may indicate a mode of operation for the wireless communication device 1800 to select.

In another configuration, the wireless communication device 1800 may be a TWT responder with respect to operating modes. In this configuration, the wireless communication device 1800 may include means for receiving a message from a second wireless device that indicates an intention of the second wireless device to switch to an operating mode that is one of an active mode, a power save mode, or a TWT power save mode. During the TWT power save mode, the second wireless device may enter an awake state during TWT service periods and may enter a doze state outside of the TWT service periods. The wireless communication device 1800 may include means for storing the operating mode associated with the second wireless device and means for transmitting to the second wireless device an acknowledgment of the operating mode switch. In an aspect, the TWT service periods may be identified based on a TWT schedule associated with the second wireless device. In another aspect, the message may include a power management indicator that indicates the operating mode to which the second wireless device intends to switch. In another embodiment, the wireless communication device 1800 may include means for transmitting a QoS message that may include an EOSP indicator set to 1 to instruct the second wireless device to switch operating modes. In another embodiment, the wireless communication device 1800 may include means for transmitting a responder mode indicator that indicates whether the wireless communication device 1800 is in a doze state outside of the TWT service periods. In another embodiment, the wireless communication device 1800 may include means for transmitting a trigger message with unassigned resources to indicate that the wireless communication device 1800 will enter into a doze state. In another embodiment, the wireless communication device 1800 may include means for transmitting a traffic indication map that indicates the operating mode for the second wireless device to select. In another embodiment, the wireless communication device 1800 may include means for transmitting an indication to the second wireless device instructing the second wireless device to switch to or to switch away from the TWT power save mode.

For example, means for transmitting may include the processing system 1810, the TWT component 1824, and/or the transmitter 1815. Means for receiving may include the processing system 1810, the TWT component 1824, and/or the receiver 1805. Means for determining a TWT schedule based on the received second message may include the processing system 1810 and/or the TWT component 1824. Means for determining whether to transmit to the second wireless device based on the determined TWT schedule may include the processing system 1810 and/or the TWT component 1824. Means for updating may include the processing system 1810 and/or the TWT component 1824. Means for determining a TWT schedule based on the received first message may include the processing system 1810 and/or the TWT component 1824. Means for determining the TWT schedule may include the processing system 1810 and/or the TWT component 1824. Means for broadcasting may include the processing system 1810, the TWT component 1824, and/or the transmitter 1815. Means for determining one or more TWTs may include the processing system 1810 and/or the TWT component 1824. Means for determining to transmit to the second wireless device during a TWT service period may include the processing system 1810 and/or the TWT component 1824. Means for determining to transmit to the second wireless device outside of the TWT service period may include the processing system 1810 and/or the TWT component 1824. Means for determining whether to switch may include the processing system 1810, the mode component 1826, and/or the TWT component 1824. Means for determining a mode of the second wireless device may include the processing system 1810, the TWT component 1824, and/or the mode component 1826. Means for storing may include the processing system 1810, the TWT component 1824, and/or the mode component 1826.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an ASIC, an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

What is claimed is:

1. A method of wireless communication by a first wireless device, comprising:
   determining whether to switch to an active mode, a power save mode, or a target wake time (TWT) power save mode, wherein, during the TWT power save mode, the first wireless device enters an awake state during TWT service periods and enters a doze state outside of the TWT service periods, wherein the determining comprises:
      determining if there is additional data for transmission or reception;
      receiving from a second wireless device a quality of service (QoS) message with an end of service period (EOSP) indicator set to 1; or
      receiving from the second wireless device a trigger message with a cascaded indicator set to 0 and the trigger message is not intended for the first wireless device; and
   transmitting a message to a second wireless device indicating a mode to which the first wireless device will switch based on the determination.

2. The method of claim 1, wherein the TWT service periods are identified based on a TWT schedule associated with the first wireless device.

3. The method of claim 1, wherein the message includes a power management indicator that indicates the mode to which the first wireless device intends to switch.

4. The method of claim 1, further comprising receiving an indication from the second wireless device instructing the first wireless device to switch to or to switch away from the TWT power save mode, wherein the determination is further based on the received indication.

5. The method of claim 4, wherein the indication includes the EOSP indicator set to 1.

6. The method of claim 1, further comprising determining a mode of the second wireless device.

7. The method of claim 6, wherein the determining the mode of the second wireless device comprises receiving a second message from the second wireless device, wherein second message includes a responder mode indicator that indicates whether the second wireless device is in a doze state outside of the TWT service periods, and the determination of the mode of the second wireless device is based on the responder mode indicator.

8. The method of claim 6, wherein the determining the mode of the second wireless device comprises receiving a trigger message from the second wireless device, wherein the determination of the mode of the second wireless device is based on whether the trigger message includes resource allocations to any wireless devices.

9. The method of claim 1, further comprising receiving from the second wireless device a second message that includes a traffic indication map, wherein the traffic indication map indicates a mode of operation for the first wireless device to select, and wherein the determination is further based on the second message.

10. The method of claim 1, wherein the first wireless device is configured to switch from the TWT power save mode to the power save mode when there is no additional data for transmission or reception.

11. The method of claim 1, wherein the first wireless device is configured to switch from the TWT power save mode to the power save mode after receiving from the second wireless device the QoS message with the EOSP indicator set to 1.

12. An apparatus for wireless communication, the apparatus being a first wireless device, comprising:
   means for determining whether to switch to an active mode, a power save mode, or a target wake time (TWT) power save mode, wherein, during the TWT power save mode, the first wireless device enters an awake state during TWT service periods and enters a doze state outside of the TWT service periods, the means for determining being configured to:
      determine if there is additional data for transmission or reception;
      receive from a second wireless device a quality of service (QoS) message with an end of service period (EOSP) indicator set to 1; or
      receive from the second wireless device a trigger message with a cascaded indicator set to 0 and the trigger message is not intended for the first wireless device; and
   means for transmitting a message to a second wireless device indicating a mode to which the first wireless device will switch based on the determination.

13. The apparatus of claim 12, wherein the TWT service periods are identified based on a TWT schedule associated with the first wireless device.

14. The apparatus of claim 12, wherein the message includes a power management indicator that indicates the mode to which the first wireless device intends to switch.

15. The apparatus of claim 12, further comprising means for receiving an indication from the second wireless device instructing the first wireless device to switch to or to switch away from the TWT power save mode, wherein the determination is further based on the received indication.

16. The apparatus of claim 15, wherein the indication includes the EOSP indicator set to 1.

17. The apparatus of claim 12, further comprising means for determining a mode of the second wireless device.

18. The apparatus of claim 17, wherein the means for determining the mode of the second wireless device is configured to receive a second message from the second wireless device, wherein second message includes a responder mode indicator that indicates whether the second wireless device is in a doze state outside of the TWT service periods, and the determination of the mode of the second wireless device is based on the responder mode indicator.

19. The apparatus of claim 17, wherein the means for determining the mode of the second wireless device is configured to receive a trigger message from the second wireless device, and wherein the determination of the mode of the second wireless device is based on whether the trigger message includes resource allocations to any wireless devices.

20. The apparatus of claim 12, further comprising means for receiving from the second wireless device a second message that includes a traffic indication map, wherein the traffic indication map indicates a mode of operation for the first wireless device to select, and wherein the determination is further based on the second message.

21. The apparatus of claim 12, wherein the first wireless device is configured to switch from the TWT power save mode to the power save mode when there is no additional data for transmission or reception.

22. The apparatus of claim 12, wherein the first wireless device is configured to switch from the TWT power save mode to the power save mode after receiving from the second wireless device the QoS message with the EOSP indicator set to 1.

23. An apparatus for wireless communication, the apparatus being a first wireless device, comprising:
a memory; and
at least one processor coupled to the memory and configured to:
determine whether to switch to an active mode, a power save mode, or a target wake time (TWT) power save mode, wherein, during the TWT power save mode, the first wireless device enters an awake state during TWT service periods and enters a doze state outside of the TWT service periods, the at least one processor being configured to determine by:
determining if there is additional data for transmission or reception;
receiving from a second wireless device a quality of service (QoS) message with an end of service period (EOSP) indicator set to 1; or
receiving from the second wireless device a trigger message with a cascaded indicator set to 0 and the trigger message is not intended for the first wireless device; and
transmit a message to a second wireless device indicating a mode to which the first wireless device will switch based on the determination.

24. The apparatus of claim 23, wherein the TWT service periods are identified based on a TWT schedule associated with the first wireless device.

25. The apparatus of claim 23, wherein the message includes a power management indicator that indicates the mode to which the first wireless device intends to switch.

26. The apparatus of claim 23, wherein the at least one processor is further configured to receive an indication from the second wireless device instructing the first wireless device to switch to or to switch away from the TWT power save mode, wherein the determination is further based on the received indication.

27. The apparatus of claim 26, wherein the indication includes the EOSP indicator set to 1.

28. The apparatus of claim 23, wherein the at least one processor is configured to determine a mode of the second wireless device.

29. The apparatus of claim 28, wherein the at least one processor is configured to determine the mode of the second wireless device by receiving a second message from the second wireless device, wherein second message includes a responder mode indicator that indicates whether the second wireless device is in a doze state outside of the TWT service periods, and the determination of the mode of the second wireless device is based on the responder mode indicator.

30. The apparatus of claim 28, wherein the at least one processor is configured to determine the mode of the second wireless device by receiving a trigger message from the second wireless device, wherein the determination of the mode of the second wireless device is based on whether the trigger message includes resource allocations to any wireless devices.

31. The apparatus of claim 23, wherein the at least one processor is further configured to receive from the second wireless device a second message that includes a traffic indication map, wherein the traffic indication map indicates a mode of operation for the first wireless device to select, and wherein the determination is further based on the second message.

32. The apparatus of claim 23, wherein the first wireless device is configured to switch from the TWT power save mode to the power save mode when there is no additional data for transmission or reception.

33. The apparatus of claim 23, wherein the first wireless device is configured to switch from the TWT power save mode to the power save mode after receiving from the second wireless device the QoS message with the EOSP indicator set to 1.

34. A non-transitory computer-readable medium of a first wireless device storing computer-executable code, comprising code to:
determine whether to switch to an active mode, a power save mode, or a target wake time (TWT) power save mode, wherein, during the TWT power save mode, the first wireless device enters an awake state during TWT service periods and enters a doze state outside of the TWT service periods, wherein the code to determine comprises code to:
determine if there is additional data for transmission or reception;
receive from a second wireless device a quality of service (QoS) message with an end of service period (EOSP) indicator set to 1; or
receive from the second wireless device a trigger message with a cascaded indicator set to 0 and the trigger message is not intended for the first wireless device; and
transmit a message to a second wireless device indicating a mode to which the first wireless device will switch based on the determination.

35. The non-transitory computer-readable medium of claim 34, wherein the TWT service periods are identified based on a TWT schedule associated with the first wireless device.

36. The non-transitory computer-readable medium of claim 34, wherein the message includes a power management indicator that indicates the mode to which the first wireless device intends to switch.

37. The non-transitory computer-readable medium of claim 34, further comprising code to receive an indication from the second wireless device instructing the first wireless device to switch to or to switch away from the TWT power save mode, wherein the determination is further based on the received indication.

38. The non-transitory computer-readable medium of claim 37, wherein the indication includes the EOSP indicator set to 1.

39. The non-transitory computer-readable medium of claim 34, further comprising code to determine a mode of the second wireless device.

40. The non-transitory computer-readable medium of claim 39, wherein the code to determine the mode of the second wireless device comprises code to receive a second message from the second wireless device, wherein second message includes a responder mode indicator that indicates whether the second wireless device is in a doze state outside of the TWT service periods, and the determination of the mode of the second wireless device is based on the responder mode indicator.

41. The non-transitory computer-readable medium of claim 39, wherein the code to determine the mode of the second wireless device comprises code to receive a trigger message from the second wireless device, wherein the determination of the mode of the second wireless device is based on whether the trigger message includes resource allocations to any wireless devices.

42. The non-transitory computer-readable medium of claim 34, further comprising code to receive from the second wireless device a second message that includes a traffic indication map, wherein the traffic indication map indicates a mode of operation for the first wireless device to select, and wherein the determination is further based on the second message.

43. The non-transitory computer-readable medium of claim 34, wherein the first wireless device is configured to switch from the TWT power save mode to the power save mode when there is no additional data for transmission or reception.

44. The non-transitory computer-readable medium of claim 34, wherein the first wireless device is configured to switch from the TWT power save mode to the power save mode after receiving from the second wireless device the QoS message with the EOSP indicator set to 1.

* * * * *